(12) United States Patent  (10) Patent No.: US 6,671,134 B1
Sasaki  (45) Date of Patent: Dec. 30, 2003

(54) THIN FILM MAGNETIC HEAD AND METHOD OF MANUFACTURING THE SAME

(75) Inventor: Yoshitaka Sasaki, Chuo-Ku (JP)

(73) Assignee: TDK Corporation, Tokyo (JP)

( * ) Notice: Subject to any disclaimer, the term of this patent is extended or adjusted under 35 U.S.C. 154(b) by 361 days.

(21) Appl. No.: 09/610,880

(22) Filed: Jan. 22, 2001

(30) Foreign Application Priority Data

Jul. 16, 1999 (JP) .......................................... 11-203817
Jun. 27, 2000 (JP) ....................................... 2000-192410

(51) Int. Cl.⁷ .............................. G11B 5/48; G11B 5/39
(52) U.S. Cl. .................................... 360/317; 360/234.5
(58) Field of Search ................................ 360/317, 316, 360/318, 314, 126, 234.5, 245.8

(56) References Cited

U.S. PATENT DOCUMENTS

| 2,915,866 | A |   | 12/1959 | Bartlo |   |
|---|---|---|---|---|---|
| 3,070,931 | A |   | 1/1963 | Zwight |   |
| 5,001,591 | A | * | 3/1991 | Nakashima | 360/126 |
| 5,218,497 | A | * | 6/1993 | Tanabe et al. | 360/315 |
| 5,486,968 | A | * | 1/1996 | Lee et al. | 360/126 |
| 5,622,032 | A |   | 4/1997 | Ryan |   |
| 5,796,549 | A | * | 8/1998 | Sedbrook et al. | 360/234.5 |
| 5,808,834 | A | * | 9/1998 | Jurgenson | 360/234.5 |
| 5,821,494 | A | * | 10/1998 | Albrecht et al. | 219/121.64 |
| 5,896,249 | A | * | 4/1999 | Fontana et al. | 360/234.5 |
| 5,995,343 | A | * | 11/1999 | Imamura | 360/126 |
| 6,317,288 | B1 | * | 11/2001 | Sasaki | 360/126 |
| 6,320,726 | B1 | * | 11/2001 | Sasaki | 360/126 |
| 6,324,036 | B1 | * | 11/2001 | Dill, Jr. et al. | 360/320 |
| 6,385,012 | B1 | * | 5/2002 | Sasaki | 360/234.5 |

* cited by examiner

Primary Examiner—David L. Ometz
(74) Attorney, Agent, or Firm—Oliff & Berridge PLC

(57) ABSTRACT

Three thin film magnetic head elements 111–113 are formed on a slider at a center and both ends thereof, a wiring pattern for connecting these thin film magnetic head elements selectively to first to fourth contact pads 141–144 is formed to have a multi-layer structure including a plurality of crossing connecting conductors 121–124, 131–134, 161–164, and upper level connecting conductors and lower level connecting conductors are electrically coupled with each other at given cross points determined in accordance with specifications of a thin film magnetic head such that for each of four kinds of thin film magnetic heads of center element- and up-type, center element- and down-type, side element- and up-type and side element- and down-type, normal-type thin film magnetic head and cross-type thin film magnetic head with respect to a connection of a thin film coil can be selectively manufactured. Thin film magnetic heads having desired specifications such as side element-type, center element-type, up-type and down-type can be manufactured promptly with a low cost by common manufacturing process.

46 Claims, 51 Drawing Sheets

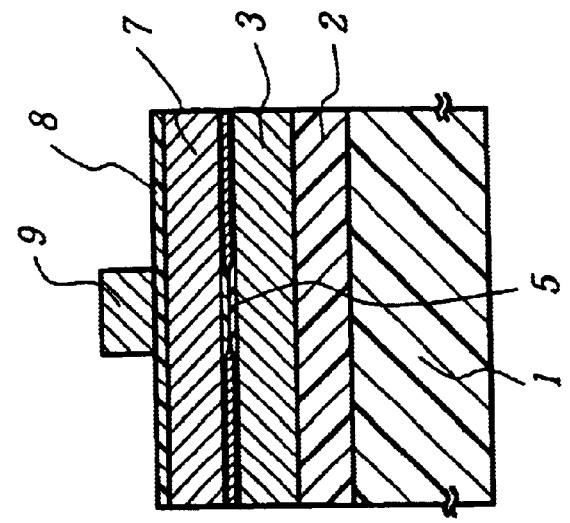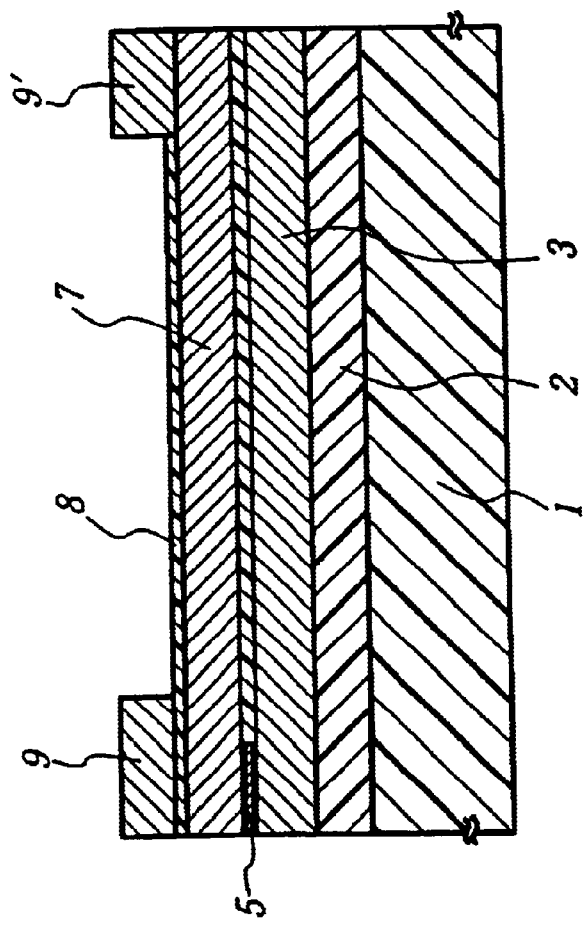

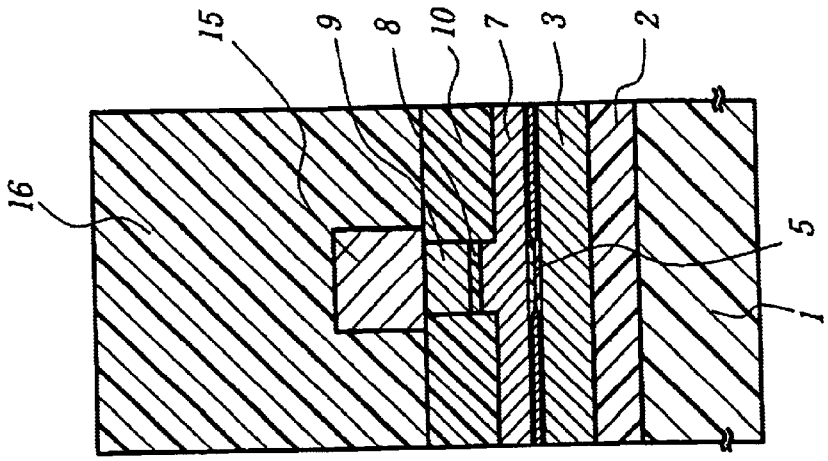
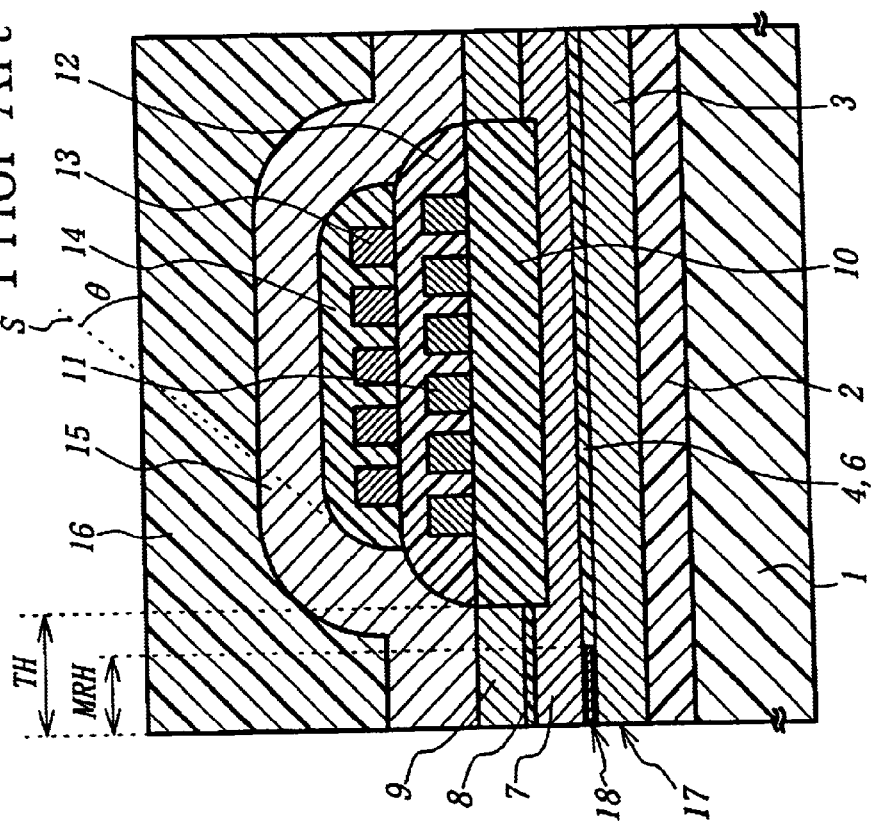

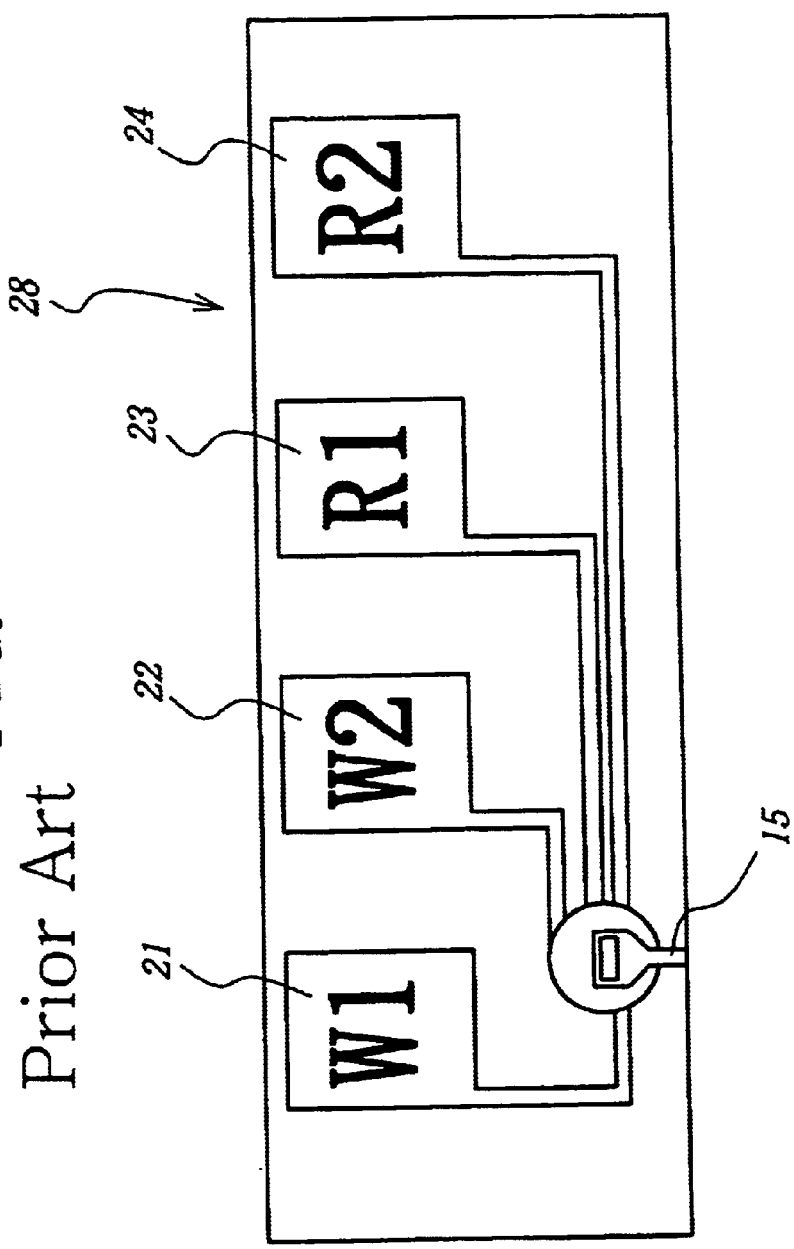

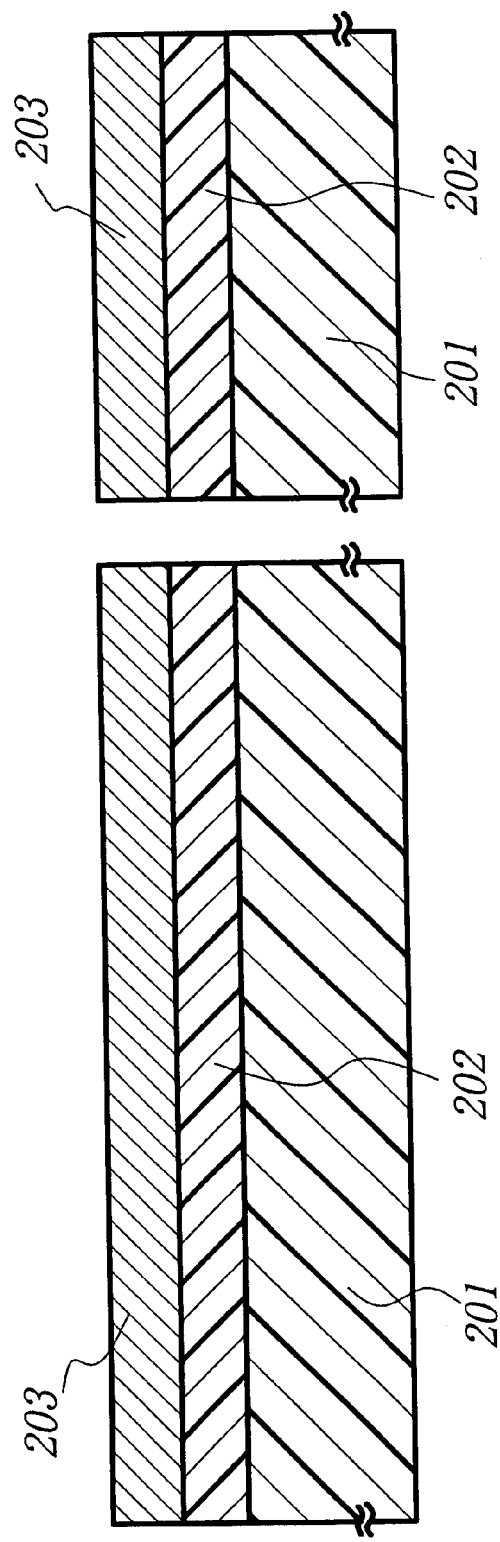

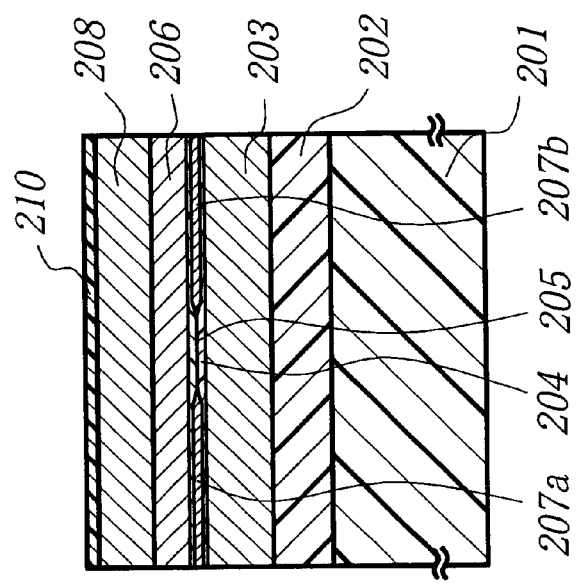
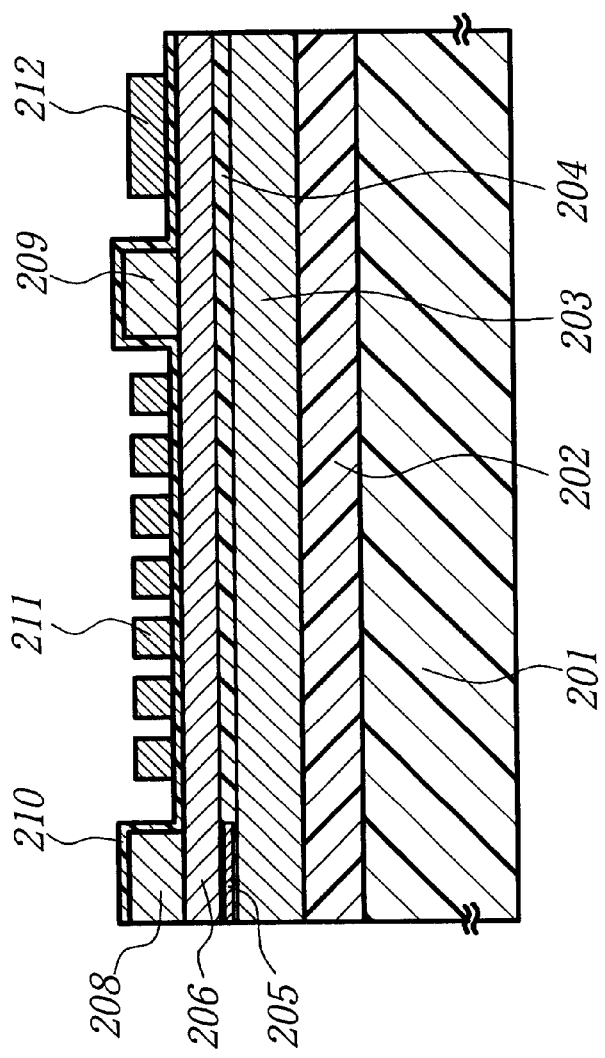
FIG. 27B
FIG. 27A

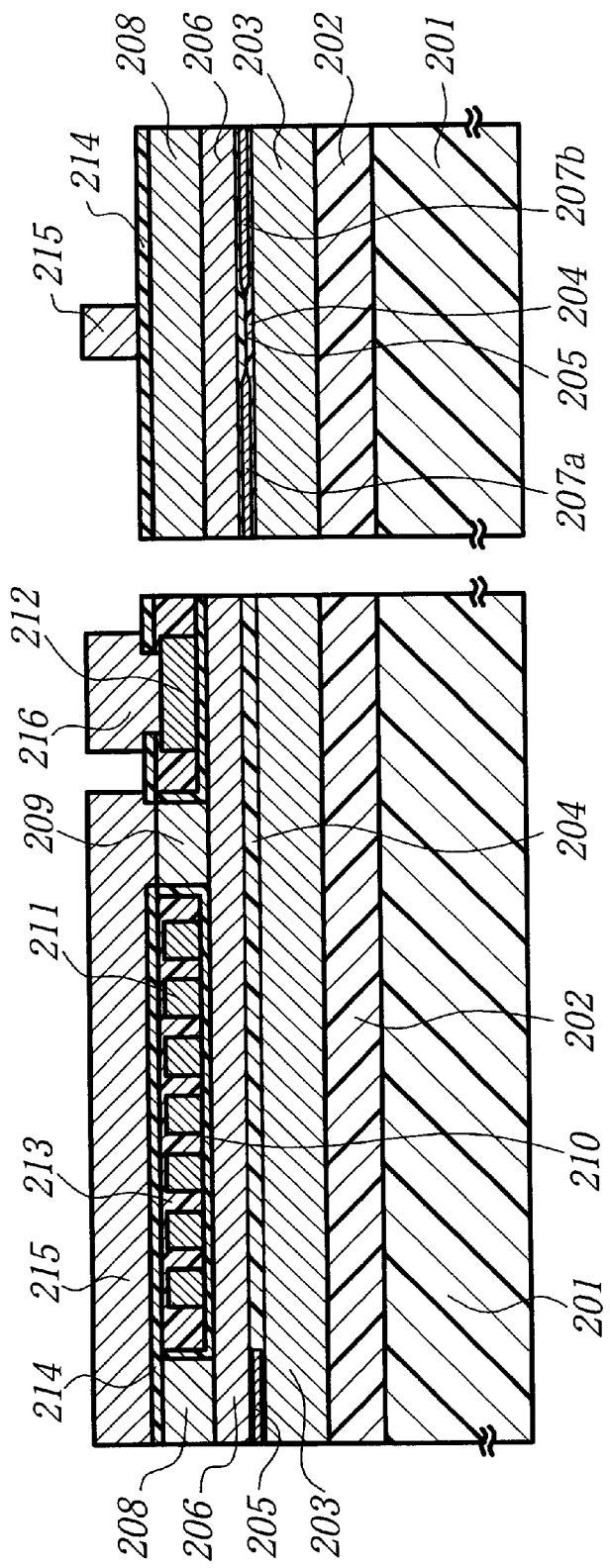

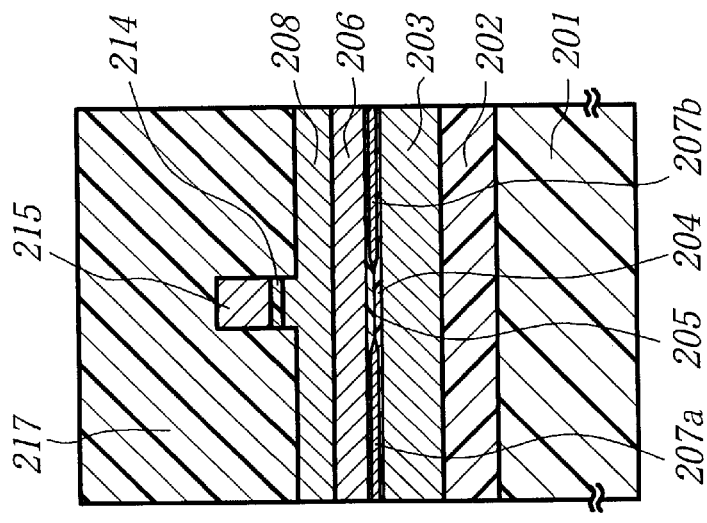
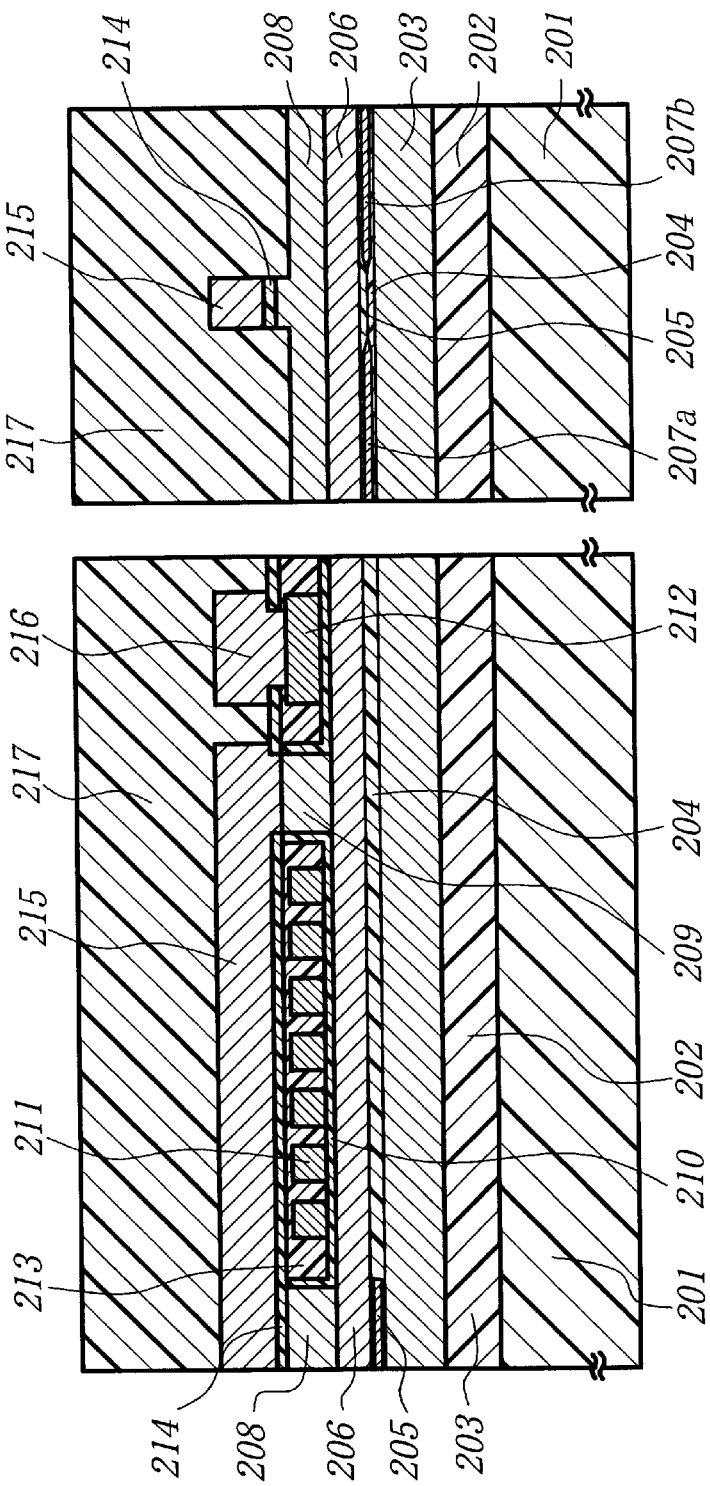

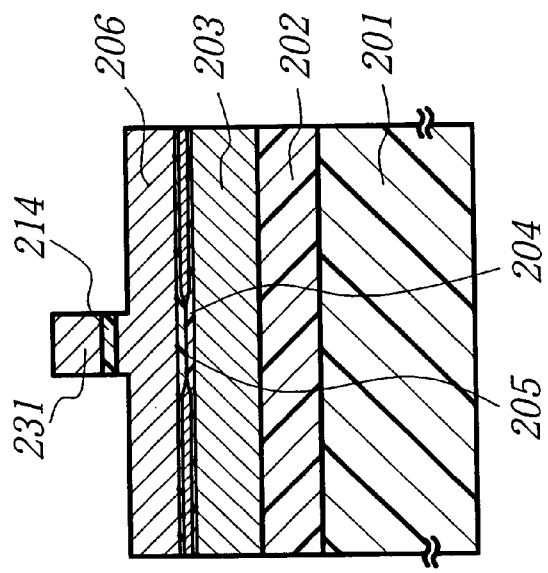
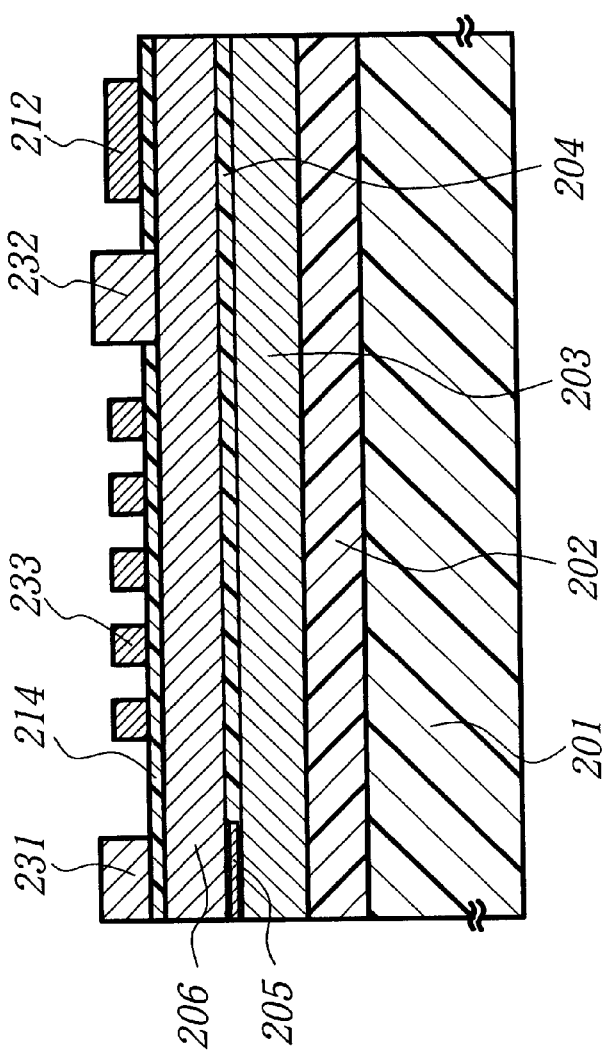
FIG. 34A
FIG. 34B

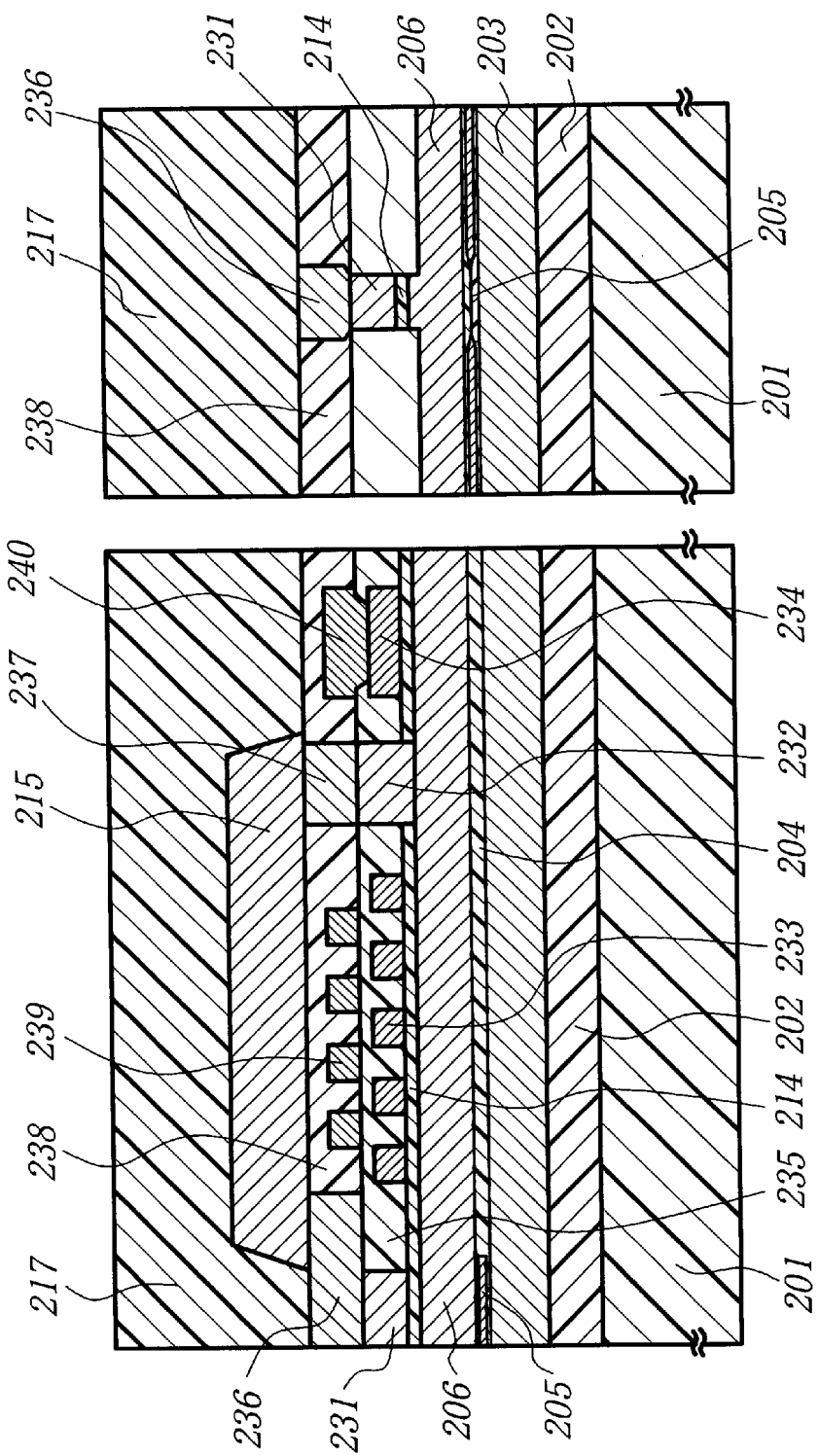

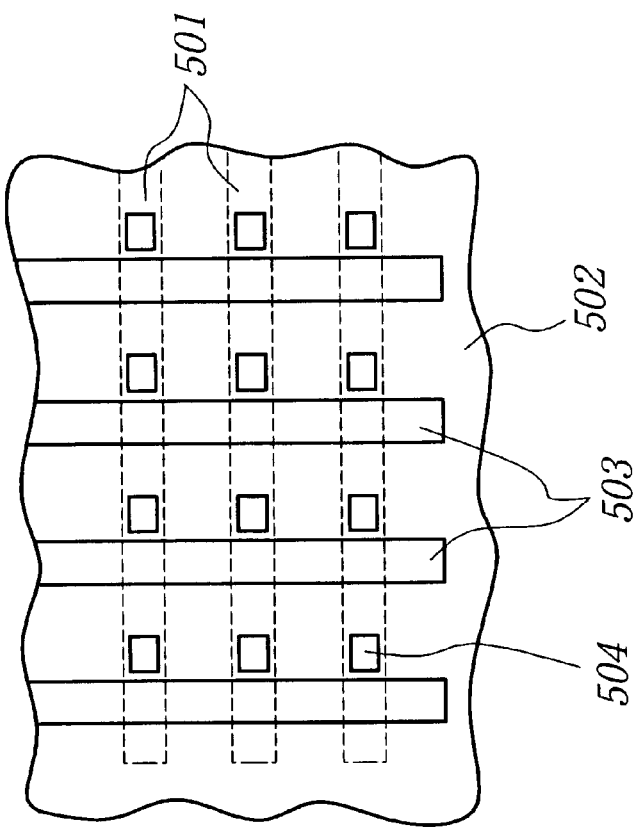
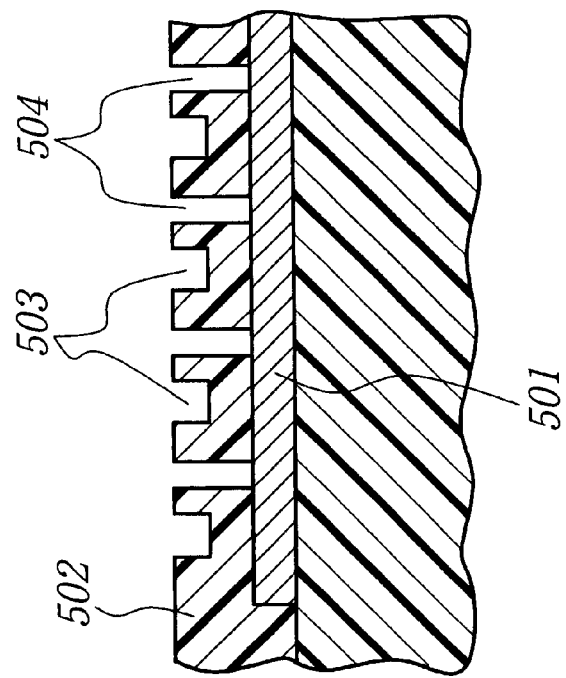

THIN FILM MAGNETIC HEAD AND METHOD OF MANUFACTURING THE SAME

BACKGROUND OF THE INVENTION

1. Field of the Invention

The present invention relates to a thin film magnetic head comprising at least one of an inductive type thin film magnetic head for writing and a magnetoresistive type thin film magnetic head for reading, and also relates to a method of manufacturing such a thin film magnetic head. Particularly, the present invention relates to a combination type thin film magnetic head comprising an inductive type thin film magnetic head for writing and a magnetoresistive type thin film magnetic head for reading which are supported by a substrate in a stacked manner.

2. Description of the Related Art

Recently a surface recording density of a hard disc device has been improved, and it has been required to develop a thin film magnetic head having an improved performance accordingly. There has been proposed and actually used a combination type thin film magnetic head including an inductive type thin film magnetic head for writing and a magnetoresistive type magnetic head for reading, said magnetic heads being supported by a substrate in a stacked fashion. As the reading magnetic head utilizing the magnetoresistive effect, there has been generally used a reading magnetic head utilizing an anisotropic magnetoresistive (AMR) effect, but there has been also developed a magnetic head utilizing a giant magnetoresistive (GMR) effect having a resistance change ratio higher than the normal anisotropic magnetoresistive effect by several times. In the present specification, these AMR and GMR elements are termed as a magnetoresistive type thin film magnetic head or simply MR reproducing element.

By using the AMR element, a very high surface recording density of several gigabits per a unit square inch has been realized, and a surface recording density can be further increased by using the GMR element. By increasing a surface recording density in this manner, it is possible to realize a hard disc device which has a very large storage capacity of more than 10 gigabytes and is still small in size.

A height (MR Height) of a magnetoresistive reproducing element is one of factors which determine a performance of a reproducing head including a magnetoresistive reproducing element. This MR height is a distance measured from an air bearing surface on which one edge of the magnetoresistive reproducing element is exposed to the other edge of the element remote from the air bearing surface. During a manufacturing process of the magnetic head, a desired MR height is obtained by controlling an amount of polishing the air bearing surface.

At the same time, a performance of a recording head has been also required to be improved in accordance with the improvement of the reproducing head. In order to increase a surface recording density, it is necessary to make a track density on a magnetic record medium as high as possible. For this purpose, a width of a pole portion at the air bearing surface has to be reduced to a value within a range from several micron meters to several sub-micron meters. In order to satisfy such a requirement, the semiconductor manufacturing process has been adopted for manufacturing the thin film magnetic head.

One of factors determining a performance of an inductive type thin film magnetic film for writing is a throat height (TH). This throat height is a distance of a pole portion measured from the air bearing surface to an edge of an insulating layer which serves to separate electrically a thin film coil from the air bearing surface. It has been required to shorten this distance as small as possible. Also this throat height is determined by an amount of polishing the air bearing surface.

In order to improve the performance of the combination type thin film magnetic head including a stack of an inductive type thin film magnetic head for writing and a magnetoresistive type thin film magnetic head for reading, it is important that the inductive type thin film magnetic head for writing and magnetoresistive type thin film magnetic head for reading are formed with a good balance.

FIGS. 1–6 show successive steps of manufacturing a known typical thin film magnetic head, in which A represents a cross sectional view cut along a plane perpendicular to the air bearing surface and B denotes a cross sectional view cut along a plane parallel with the air bearing surface. FIG. 7 is a plan view illustrating a whole structure of the known thin film magnetic head. This magnetic head belongs to a combination type thin film magnetic head which is constructed by stacking an inductive type thin film writing magnetic head and a magnetoresistive type thin film reading magnetic head one on the other.

At first, as illustrated in FIG. 1, on a substrate 1 made of, for instance aluminum-titan-carbon (AlTiC), is deposited an insulating layer 2 made of alumina ($Al_2O_3$) and having a thickness of about 5–10 μm. A first magnetic layer 3 serving as a magnetic shield for protecting the MR element of the reading head from an external magnetic field is formed with a thickness of 3 μm Then, after depositing by sputtering an insulating layer 4 serving as a shield gap layer made of an alumina with a thickness of 100–150 nm as shown in FIG. 2, a magnetoresistive layer 5 having a thickness not larger than 10 nm and being made of a material having the magnetoresistive effect, and the magnetoresistive layer is shaped into a desired pattern by a highly precise mask alignment. Next, an insulating layer 6 serving as a second shield gap layer is formed to embed the magnetoresistive layer 5 within the shield gap layer consisting of the insulating layers 4 and 6.

Next, as shown in FIG. 3, a second magnetic layer 7 made of a permalloy and having a thickness of 3 μm is formed. This second magnetic layer 7 serves not only as the other shield layer for magnetically shielding the MR reproducing element together with the above mentioned first magnetic layer 3, but also as one of poles of the inductive type writing thin film magnetic head to be manufactured later.

Next, after forming, on the second magnetic layer 7, a write gap layer 8 made of a nonmagnetic material such as alumina to have a thickness of about 200 nm, a magnetic layer made of a magnetic material having a high saturation magnetic flux density such as permalloy (Ni 50 wt %: Fe 50 wt %) and iron nitride (FeN), and this magnetic layer is shaped into a given pattern by a highly precise mask alignment to form a pole chip 9. A width W of the pole chip 9 defines a track width. Therefore, in order to attain the high surface recording density, it is necessary to narrow the width W of the pole chip 9 as small as possible. During the formation of the pole chip 9, a dummy pattern 9' for connecting the second magnetic layer 7 with a third magnetic layer constituting the other pole is formed. This dummy pattern makes the formation of a through hole easy after mechanical polishing or chemical-mechanical polishing (CMP).

Then, in order to prevent an increase of an effective track width, that is, in order to prevent a spread of a magnetic flux at the lower pole during a writing operation, the gap layer 8 and second magnetic layer 7 constituting the other pole are removed by an ion beam etching such as an ion milling, while the pole chip 9 is utilized as a mask. The thus formed structure is called a trim structure, and the trim structure constitutes a pole portion of the second magnetic layer.

Furthermore, as depicted in FIG. 4, after forming a depression in a surface of the second insulating layer 7, an insulating layer 10 made of an alumina is formed to have a thickness of about 3 μm. Then, a first layer thin film coil 11 made of, for instance a copper is formed on the insulating layer 10 as shown in FIG. 5, and assembly is flattened by CMP. Then, after forming an electrically insulating photoresist layer 12, a surface of the photoresist layer is flattened by baking at a temperature of, for instance 250–300° C.

Next, on the flat surface of the photoresist layer 12, a second layer thin film coil 13 is formed. This second layer thin film coil 13 is connected to the first layer thin film coil 11 and these first and second layer thin film coils constituting a thin film coil. However, a connecting portion of these thin film coils is not shown in the drawing. Then, after forming a photoresist layer 14 on the second layer thin film coil 13 with a highly precise mask alignment, the photoresist layer is baked at 250° C. to be reflowed. A reason for forming the photoresist layers 12 and 14 with a highly precise mask alignment is that the throat height and MR height are determined with respect to edges of these photoresist layers on a side of the pole portion.

Next, a third magnetic layer 15 made of, for instance a permalloy is formed selectively on the pole chip 9 and photoresist layers 12 and 14 such that the third magnetic layer has a thickness of 3 μm and is shaped into a desired pattern. The third magnetic layer 15 is brought into contact with the first magnetic layer 7 at a position remote from the pole portion by means of the dummy pattern 9', and therefore the thin film coil 11, 13 pass through a closed magnetic path constituted by the second magnetic layer, pole chip and third magnetic layer.

Furthermore, after depositing an overcoat layer 16 made of an alumina on an exposed surface of the third magnetic layer 15 as illustrated in FIG. 6, a wafer is cut into bars and a side wall of a bar at which the magnetoresistive layer 5 and gap layer 8 are formed is polished to form an air bearing surface (ABS) 17. During the formation of the air bearing surface 17, the magnetoresistive layer 5 is also polished to obtain an MR reproducing element 18. In this manner, the above mentioned throat height TH and MR height MRH are determined by the polishing. This condition is shown in FIG. 10. In an actual manufacturing process, contact pads for establishing electrical connections to the thin film coils 11, 13 and MR reproducing element 18 are formed, but these contact pads will be explained later.

As shown in FIG. 6, an angle θ (Apex angle) between a straight line S connecting side edges of the photoresist layers 12, 14 isolating the thin film coils 11, 13 and an upper surface of the third magnetic layer 15 is one of important factors for determining a property of the thin film magnetic head together with the throat height TH and MR height MRH.

Furthermore, as shown in the plan view of FIG. 7, the width W of the pole chip 9 and pole portion 19 of the third magnetic layer 15 determines a width of tracks recorded on a record medium, and therefore it is necessary to make this width W as small as possible in order to realize a high surface recording density. It should be noted that in the drawing, the thin film coils 11, 13 are denoted to be concentric for the sake of simplicity.

The above mentioned combination type thin film magnetic head is practically used in a hard disk device, in which in order to prevent the head from being worn by contact with a surface of a record medium, it is necessary to separate the head from the record medium during the operation. At the same time, in order to increase the record density, it is required to bring the head and record medium close to each other as far as possible. In the known thin film magnetic head, in order to solve the above mentioned contradict problems, the surface of the head opposing to the record medium is formed as the air bearing surface 17 and a very thin air layer of several tens nano meters is produced therebetween by the rotation of the record medium. For producing the stable air layer, projections are generally formed in the air bearing surface 17 in accordance with a given pattern.

FIG. 8 is a plan view showing the air bearing surface 17. In this figure, a dimension A is equal to a thickness of the AlTiC substrate 1. An arrow B denotes a rotating direction of the record medium. In the air bearing surface 17, there is formed a projections 20 for generating a stable air layer. For the sake of clarity, portions of the air bearing surface except for the projections, i.e. depressed portions are denoted by hatching. A whole assembly in which the thin film magnetic head is installed and the projections 20 are formed in the air bearing surface 17 is generally called a slider.

FIG. 9 shows a side surface of the slider on which the thin film magnetic head is installed. In the combination type thin film magnetic head, the inductive type thin film magnetic head for writing and magnetoresistive type thin film magnetic head for reading are provided in a stacked fashion, and there are provided two contact pads 21 and 22 (W1 and W2) for connecting the thin film coils 11, 13 of the inductive type thin film magnetic head to a recording circuit and two contact pads 23 and 24 (R1 and R2) for connected either ends of the magnetoresistive element 18 of the magnetoresistive type thin film magnetic head to a reading circuit.

When the slider having the above mentioned combination type thin film magnetic head is installed in a hard disk device, the slider 28 is fixed, with an adhesive, to a flexure portion 27 formed at a front end of a suspension 26 which is formed by a resilient strip such as stainless steel foil. At a front end of the flexure portion 27, there are formed four interconnecting contact pads 31–34 to which the contact pads 22–25 formed on the slider 28 are connected by means of contact tips called apple bond.

As illustrated in FIG. 10, the interconnecting contact pads 31–34 provided on the flexure portion 27 of the suspension 26 are connected, via wiring patterns 35–38, to external contact pads 41–44, respectively in a vicinity of a mount plate 39 of the suspension 26, said external contact pads being connected to the externally provided writing circuit and reading circuit. In order to avoid undesired crossings of the wiring patterns 35–38, the interconnecting contact pads 31–34 have different aligning order than the external contact pads 40–43.

The above explained combination type thin film magnetic head is manufactured by various processes including photomask process, plating process, sputtering process, etching process, ion milling process and flattening process such as CMP. Combination type thin film magnetic heads having various performances and properties can be obtained by changing a track width and a thickness of the magnetoresistive element 18 of the magnetoresistive type thin film magnetic head as well as a track width of the inductive type thin film magnetic head defined by a width of pole portion 19. On the other hand, in accordance with the diversification of hard disk devices, combination type thin film magnetic heads having various properties have been required. In order to obtain such customer orientated combination type thin film magnetic heads, the magnetoresistive layer 5 and pole tip 9 are formed to be coincided with a required track width and the air bearing surface 17 is polished to attain required throat height TH and MR height MR. In this manner, customer oriented combination type thin film magnetic heads having performances and properties required by customers are prepared by changing various parameters in the manufacturing processes. Therefore, it takes a rather long time to make a delivery of customer oriented thin film magnetic heads.

Furthermore, customers have required not only a variety of the above mentioned performances and properties which are determined by the manufacturing processes, but also a variety of sliders 28 flying above record surfaces of hard disks. For instance, FIG. 9 shows a center element type slider in which the thin film magnetic head is provided at a center of the slider viewed from the traveling direction of the record medium, and FIG. 11 illustrates a side element type slider, in which a thin film magnetic head is provided near a side of the slider.

It should be noted that the center element type slider having the thin film magnetic head provided at a center and the side element type slider having the thin film magnetic head situating near a side of the slider could not be manufactured by the same process. Therefore, a customer orientated slider having desired type, performance and property could not be delivered within a short time.

A record capacity of a hard disk device has been increased, and two, three or four hard disks are used in a stacked fashion and magnetic heads are provided on either surfaces of a hard disk. Therefore, there are provided an up-type slider which is arranged above a hard disk and a down-type slider which is arranged below a hard disk. The slider shown in FIG. 9 is a center element type slider of up-type, and the slider illustrated in FIG. 11 is a side element type slider of up-type. These up-type sliders are arranged above a hard disk. In the above explanation, hard disk is arranged horizontally, but in actual hard disk devices, hard disks are arranged vertically. In this case, sliders are arranged on right and left sides of the hard disk. However, in the present specification, these sliders are also called up-type slider and down-type slider for the sake of explanation.

In order to shorten a time for delivery, one may consider common use of a same slider. However, when the up-type slider is used as the down-type slider, a position of a magnetic head might be deviated (for instance, if the head is positioned right side in the up-type, the head becomes left side in the down-type). Therefore, in general, a single side element type slider could not be commonly used as the up-type slider and down-type slider. Although the center type slider does not have such a problem, a positional relationship of contact pads becomes problem.

In the up-type slider shown in FIG. 9, the left hand two contact pads 21 and 22 are connected to either ends of the thin film coils 11, 13 of the inductive type writing thin film magnetic head, and right hand two contact pads 23 and 24 are connected to either ends of the magnetoresistive element 18 of the magnetoresistive type reading thin film magnetic head. These contact pads are connected to the interconnecting contact pads 31–34, respectively provided on the flexure portion 27 the suspension 26. When this slider is used as the down-type slider, the two contact pads 21 and 22 connected to the thin film coils 11, 13 become right hand contact pads and the two contact pads 23 and 24 connected to the magnetoresistive element 18 become left hand contact pads.

It should be noted that the position of the external contact pads 41–44 provided on the suspension 26 supporting the slider is not changed when the slider is used as the up-type or down-type slider. Therefore, when the slider is used as the up-type one, the contact pads 23 and 24 connected to the magnetoresistive element 18 are connected to the interconnecting contact pads 31 and 32, respectively which are connected to the externally connecting contact pads 41 and 42, respectively, and at the same time, the contact pads 21 and 22 connected to the thin film coils 11, 13 are connected to the interconnecting contact pads 33 and 34, respectively which are connected to the externally connecting contact pads 43 and 44, respectively. That is to say, the magnetoresistive element 18 is connected to the external contact pads 41 and 42 situating near the mount plate 39 and the thin film coils 11, 13 are connected to the external contact pads 43 and 44 remote from the mount plate.

When the slider is used as the down-type one, the contact pads 21 and 22 connected to the thin film coils 11, 13 are connected to the interconnecting contact pads 34 and 33, respectively which are connected to the externally connecting contact pads 41 and 42, respectively, and at the same time, the contact pads 23 and 24 connected to the magnetoresistive element 18 are connected to the interconnecting contact pads 32 and 31, respectively which are connected to the externally connecting contact pads 43 and 44, respectively. In this manner, in contradict to the above mentioned up-type slider use, the thin film coils 11, 13 are connected to the external contact pads 43 and 44 situating near the mount plate 39 and the magnetoresistive element 18 is connected to the external contact pads 41 and 42 remote from the mount plate.

As explained above, when the known center element type slider is used as both the up-type and down-type, the positional relationship of the magnetoresistive element 18 and thin film coils 11, 13 connected to the externally connecting contact pads 41–44 provided in the vicinity of the mount plate 39 of the suspension 26 supporting the slider becomes reversed. Therefore, in the up-type use, the two inner contact pads 41 and 42 near the mount plate 39 have to be connected to the writing circuit and the two outer contact pads 43 and 44 have to be connected to the reading circuit, whilst in the down-type use, the two inner contact pads 41 and 42 near the mount plate 39 have to be connected to the reading circuit and the two outer contact pads 43 and 44 have to be connected to the writing circuit.

Upon assembling the hard disk device, it is quite inconvenient to change the connection of the writing circuit and reading circuit to the externally connecting contact pads 41–44 of the suspension 26 in accordance with the up-type and down-type. Therefore, manufactures of hard disk devices require slider which can be used both as the up-type and down-type without changing the connection of the externally connecting contact pads to the writing and reading circuits. Therefore, in known combination type thin film magnetic head, up-type sliders have different structure than down-type sliders. This is one of reasons of the long term delivery of sliders.

In the inductive type thin film magnetic head, a direction of a current passing through the thin film coils 11, 13 is sometimes defined by customers or head types. That is to say, some customers require heads in which the current flows from inside to outside, and other customers require heads in which the current flows from outside to inside. In such a case, a slider of either up-type and down-type could not be used commonly as long as the connection between the externally connecting contact pads and the writing circuit is not changed.

Moreover, in order to improve the record density, it has been proposed to utilize the GMR element instead of the usual AMR element. In the AMR element, it is not necessary to consider the polarity upon connecting it to the reading circuit. However, in the GMR element, the polarity of the connection to the reading circuit is specified. Therefore, the up-type slider including the GMR element could not be utilized as the down-type slider.

As explained above, in the known thin film magnetic head, particularly in the known combination type thin film magnetic head, various sliders having different structures must be manufactured in accordance not only with the center element type and side element type, but also with the up-type and down-type. In general, the manufacture of a single type thin film magnetic head requires 20–30 masks, the number of necessary masks becomes large in accordance with the variety of the slider types and the manufacturing cost becomes high.

In an actual manufacturing site, the customer's request is predicted to a certain extent, and several types of sliders have been stocked. However, when specifications of customers are changed, the stocked slider could not be used, and new type sliders have to be manufactured. Therefore, a delivery of the new type slider could not be performed promptly, and it is very difficult to satisfy the delivery term of customers. If a manufacturing line is crashed by an insertion of speediest rots in regardless of mean cycle time, an important balance of the manufacturing line might be lost and a capacity of large scale production might be reduced.

Furthermore, if the prediction differs greatly from an actual order of customers, an amount of stocked sliders becomes large. Model change of hard disk devices has been effected more and more, and if the sliders are stocked for a long term such as several months, they might be bad backlog. This also results in the increase in the manufacturing cost.

In Japanese Patent Application Laid-open Publication Kokai Hei 11-149622, there is proposed a thin film magnetic head, in which upon forming an element of a combination type thin film magnetic head of side element type, a plurality of auxiliary lead out lines are formed, and these auxiliary lead out lines are connected to a plurality of connection terminals connected to thin film coils and MR element by means of a plurality of element lead out lines in accordance with specifications of a magnetic head. In this known technique, a plurality of auxiliary lead out lines are fixed connected to the contact pads or connecting members connected to the contact pads in regardless of specifications of the head, and this connecting relationship could not be changed.

In the above mentioned prior art, a step of forming the element lead out lines for connecting the auxiliary lead out lines and the connection terminals to each other is an independent step or a same step in which contact pads or connecting members connected thereto are formed. The element lead out lines could not be manufactured in a same step of forming a structural element of the thin film magnetic head and could not be made of same materials as structural elements. Therefore, a number of photomasks used in the lithography is increased.

Furthermore, the above mentioned prior art publication does not teach that information denoting types of sliders is recorded on thin film magnetic heads. Therefore, customers could not easily confirm whether or not the delivered thin film magnetic heads belong to ordered ones. Moreover, when the delivered thin film magnetic heads are installed in hard disk devices, there might occur confusion.

In the above prior art, although it is possible to manufacture selectively side element type sliders of up-type and down-type, center element type sliders of up-type and down-type could not be manufactured. Further, the prior art does teach that up-type and down-type sliders of side element type or center element type are selectively manufactured.

SUMMARY OF THE INVENTION

The present invention has for its object to provide a thin film magnetic head, particularly a combination type thin film magnetic head, in which any required connection can be effected between a thin film magnetic head element and contact pads in accordance with desired specifications, and therefore almost all structures can be commonly used for various types of sliders and a delivery term can be shortened and cost can be decreased.

It is another object of the invention to provide a combination type thin film magnetic head, particularly a combination type thin film magnetic head, in which any required connection can be effected between a thin film magnetic head element and contact pads in accordance with desired specifications, and therefore almost all structures can be commonly used not only for up-type and down-type, but also for center element type and side element type and a delivery term can be further shortened and cost can be further decreased.

It is another object of the invention to provide a thin film magnetic head, in which connecting conductors for selectively connecting thin film coils and/or MR element to contact pads in accordance with required type can be made of a same material in a same step as structural components of thin film magnetic head element, and therefore the number of necessary photomasks can be reduced.

It is still another object of the invention to provide a thin film magnetic head, in which a type of the thin film magnetic head can be easily confirmed.

The present invention also relates to a method of manufacturing a thin film magnetic head, and has for its object to provide a method of manufacturing the above mentioned thin film magnetic head in an effective manner with a smaller number of photomasks at low cost.

According to the invention, a thin film magnetic head comprises:

a substrate constituting a slider having an air bearing surface which is to be opposed to a surface of a record medium;

at least one thin film magnetic head element supported by said substrate;

at least two contact pads for connecting first and second connection terminals of said at least one thin film magnetic head element to an external circuit, said at least two contact pads being provided on one end surface of the substrate viewed in a direction in which the record medium travels; and a wiring pattern arranged to connect said first and second connection terminals of the thin film magnetic head element to said at least two contact pads in accordance with a desired positional relationship define by specifications of the thin film magnetic head.

In the thin film magnetic head according to the invention, said wiring pattern preferably comprises first and second conductive patterns including a plurality of connecting conductors which extend in different levels viewed from the substrate with interposing therebetween an insulating layer and are connected in an electrically conductive manner to said at least two connection terminals of said thin film magnetic head element as well as to said at least two contact pads directly or via another conductive pattern, and coupling conductors connecting said connecting conductors in different levels through contact holes formed in said insulating layer at plural cross points which are selected from a plurality of cross points of the connecting conductors of said first and second conductive patters in accordance with the specifications of the thin film magnetic head. Upon realizing the thin film magnetic head according to the invention, it is preferable that said wiring pattern is made of the same material as a conductive member constituting the thin film magnetic head element and is formed simultaneously with said conductive member.

In the thin film magnetic head according to the invention, said thin film magnetic head element is formed by an inductive type thin film magnetic head element and the first conductive pattern of said wiring pattern situating closer to the substrate is made of a same material as a lower magnetic pole of the inductive type thin film magnetic head element and is formed simultaneously with the lower magnetic pole and the second conductive pattern remote from the substrate is made of a same material as coil windings of a thin film coil and is formed simultaneously with the thin film coil; the first conductive patter closer to the substrate is made of a same material in a same process as the lower magnetic pole and the second conductive pattern remote from the substrate is made of a same material in a same process as an upper magnetic pole; the first conductive pattern closer to the substrate is made of a same material in a same process as lower coil windings of a thin film coil and the second conductive pattern is made of a same material in a same process as upper coil windings of the thin film coil; or the first conductive patter closer to the substrate is made of a same material in a same process as coil windings of a thin film coil and the second conductive pattern is made of a same material in a same process as an upper magnetic pole. In this manner, the first and second conductive patterns of the wiring pattern may be formed simultaneously with components of thin film magnetic head element, and therefore it is no more necessary to prepare a special photomask for manufacturing the wiring pattern and the number of total photomasks can be reduced.

In an embodiment of the thin film magnetic head according to the invention including at least the inductive type thin film magnetic head element, it is preferable that said contact holes for connecting the connecting conductors of the first conductive pattern with the connecting conductors of the second conductive pattern are formed in said insulating layer in a same process as a process in which an opening is formed in said insulating layer for forming a back gap at a position remote from a magnetic gap, said lower and upper magnetic poles being magnetically coupled with each other at said back gap. Also in this case, the number of photomasks may be reduced.

According to the invention, it is preferable to record information representing the specifications of the thin film magnetic head at a position which can be monitored from external. In this case, it is advantageous to form said information during a manufacturing process for electrically connecting a plurality of connecting conductors on different levels at a plurality of cross points selected in accordance with the specifications of the thin film magnetic head. In this case, information corresponding to the information formed on the thin film magnetic head may be formed on a photomask determining the specifications of the thin film magnetic head, and therefore the specifications of the thin film magnetic head can be always corresponded to the information formed on the thin film magnetic head, and any mistake can be removed. Moreover, the information of the thin film magnetic head may be recorded in such a manner that the information may be automatically read out by a reader or may be directly monitored by human beings.

The thin film magnetic head according to the invention includes several principal structural types. In a first principal structure, said connecting conductors of the first conductive pattern of the wiring pattern are fixedly connected to first and second connection terminals of said at least one thin film magnetic head, and said connecting conductors of the second conductive pattern are fixedly connected to said at least two contact pads. Here it should be noted that the term "fixedly connected" means not only a direct connection, but also a connection by means of an intermediate conductor. The term "fixedly connected" is used to express that the connecting conductors are not selectively connected in accordance with the specifications of the thin film magnetic head.

In this first principal structure, said connecting conductors of the first conductive pattern of the wiring pattern are directly connected to said first and second connection terminals of said at least one thin film magnetic head element, and said connecting conductors of the second conductive pattern are directly connected to said at least two contact pads; or said connecting conductors of one of the first and second conductive patters of the wiring pattern are directly connected to said first and second connection terminals of said at least one thin film magnetic head element, and said connecting conductors of the other conductive pattern are connected to another connecting conductors which extend in a different level than the first and second conductive patterns with interposing another insulating layer therebetween and are directly connected to said at least two contact pads through contact holes formed in said another insulating layer.

In a second principal structure of the thin film magnetic head according to the invention, said thin film magnetic head element is formed by a combination type thin film magnetic head element including an inductive type thin film magnetic head element and a magnetoresistive type thin film magnetic head element formed to be supported by the substrate in a stacked fashion, and there are formed two connection terminals connected to both ends of a thin film coil of the inductive type thin film magnetic head element, two connection terminals connected to both end of a magnetoresistive element of the magnetoresistive type thin film magnetic head element, and four contact pads. Said first conductive pattern of the wiring pattern includes four connecting conductors which are fixedly connected to said four connection terminals of the thin film magnetic head element, and said second conductive patter of the wiring pattern includes two connecting conductors which are fixedly connected to two contact pads among said four contact pads and two intermediate conductors having extended portions which cross two connecting conductors electrically connected to the remaining two contact pads.

In a third principal structure of the thin film magnetic head according to the invention, said thin film magnetic head element is formed by a combination type thin film magnetic head element including an inductive type thin film magnetic head element and a magnetoresistive type thin film magnetic head element formed to be supported by the substrate in a stacked fashion, and there are formed two connection terminals connected to both ends of a thin film coil of the inductive type thin film magnetic head element, two connection terminals connected to both end of a magnetoresistive element of the magnetoresistive type thin film magnetic head element, and four contact pads. Said first conductive pattern of the wiring pattern includes two connecting conductors which are fixedly connected to two connection terminals among said four connection terminals of the thin film magnetic head element and two intermediate conductors having extended portions which cross two connecting conductors electrically connected to the remaining two connection terminals, and said second conductive patter of the wiring pattern includes four connecting conductors which are fixedly connected to said four contact pads.

In a fourth principal structure of the thin film magnetic head according to the invention, said first conductive pattern of the wiring pattern includes four connecting conductors which are connected to first and second connection terminals of the thin film magnetic head element and said at least two contact pads, and said second conductive pattern includes intermediate conductors whose number is identical with that of the contact pads and which cross all connecting conductors of the first conductive pattern.

In the fourth principal structure of the thin film magnetic head according to the invention, said thin film magnetic head element is formed by a combination type thin film magnetic head element including an inductive type thin film magnetic head element and a magnetoresistive type thin film magnetic head element formed to be supported by the substrate in a stacked fashion, and both ends of a thin film coil of the inductive type thin film magnetic head element and both end of a magnetoresistive element of the magnetoresistive type thin film magnetic head element are connected to four connection terminals. These four connection terminals are connected to four contact pads by means of the wiring pattern which includes the first conductive pattern having four connecting conductors and the second conductive pattern having four intermediate conductors. Then, the thin film magnetic head may be commonly used as the center element type sliders of up-type and down-type, in which said combination type thin film magnetic head element is situated at a center of the air bearing surface viewed from a direction perpendicular to the end surface of the substrate on which said contact pads are formed.

Moreover in the fourth principal structure of the thin film magnetic head according to the invention, there are provided two combination type thin film magnetic head elements each of which includes an inductive type thin film magnetic head element and a magnetoresistive type thin film magnetic head element formed to be supported by the substrate in a stacked fashion, both ends of thin film coils of the two inductive type thin film magnetic head elements are connected to four connection terminals and both ends of magnetoresistive elements of the two magnetoresistive type thin film magnetic head elements are connected to four connection terminals, and these eight connection terminals are connected to four contact pads by means of the wiring pattern including the first conductive pattern having twelve connecting conductors and the second conductive pattern having four intermediate conductors. Then, the thin film magnetic head may be commonly used as the side element type sliders of up-type and down-type, in which the two thin film magnetic head elements are situated at positions which are symmetrical with respect to a center of the air bearing surface viewed from a direction perpendicular to the end surface of the substrate on which the contact pads are provided.

In the fourth principal structure of the thin film magnetic head according to the invention, there are provided three combination type thin film magnetic head elements each of which includes an inductive type thin film magnetic head element and a magnetoresistive type thin film magnetic head element formed to be supported by the substrate in a stacked fashion, both ends of thin film coils of the three inductive type thin film magnetic head elements are connected to six connection terminals and both ends of magnetoresistive elements of the three magnetoresistive type thin film magnetic head elements are connected to six connection terminals. These twelve connection terminals are connected to four contact pads by means of the wiring pattern including the first conductive pattern having sixteen connecting conductors and the second conductive pattern having four intermediate conductors. Then, the thin film magnetic head may be commonly used as the side element type sliders of up-type and down-type as well as the center element type sliders of up-type and down-type, in which one thin film magnetic head element is situated at a center of the air bearing surface and the remaining two thin film magnetic head elements are situated at side positions which are symmetrical with respect to the center of the air bearing surface viewed from a direction perpendicular to the end surface of the substrate on which the contact pads are provided.

The present invention also relates to an intermediate unit for thin film magnetic head which may be commonly used for thin film magnetic heads having different specifications, and has for its object to provide an intermediate unit for thin film magnetic head, by means of which a final thin film magnetic head can be promptly obtained by adding few manufacturing processes in accordance with desired specifications.

According to the invention, an intermediate unit of thin film magnetic head which can be commonly used for thin film magnetic heads having different specifications comprises:

a substrate constituting a slider having an air bearing surface which is to be opposed to a surface of a record medium;

at least one thin film magnetic head element supported by said substrate; and a wiring pattern arranged such that a plurality of connection terminals of the thin film magnetic head element to a plurality of contact pads in accordance with a desired positional relationship defined by specifications of the thin film magnetic head, said contact pads being provided on an end surface of the substrate viewed in a traveling direction of the record medium for connecting said plurality of connection terminals of said at least one thin film magnetic head element to an external circuit.

In a preferable embodiment of the intermediate unit for thin film magnetic head according to the invention, said wiring pattern comprises first and second conductive patterns including a plurality of connecting conductors which extend in different levels viewed from the substrate with interposing therebetween an insulating layer and are connected in an electrically conductive manner to at least two connection terminals of said thin film magnetic head element as well as to at least two contact pads directly or via another conductive pattern. In this case, it is preferable to form said wiring pattern by a same manufacturing process with a same material as a conductive member constituting the thin film magnetic head element.

In a first principal structure of the intermediate unit for thin film magnetic head according to the invention, the connecting conductors of the first conductive pattern of the wiring pattern are fixedly connected to first and second connection terminals of said at least one thin film magnetic head element, and the connecting conductors of the second conductive pattern are fixedly connected to said at least two contact pads.

In a second principal structure of the intermediate unit for thin film magnetic head according to the invention, said thin film magnetic head element is formed by a combination type thin film magnetic head element including an inductive type thin film magnetic head element and a magnetoresistive type thin film magnetic head element formed to be supported by the substrate in a stacked fashion, and there are formed two connection terminals connected to both ends of a thin film coil of the inductive type thin film magnetic head element, two connection terminals connected to both end of a magnetoresistive element of the magnetoresistive type thin film magnetic head element, and four contact pads. Said first conductive pattern of the wiring pattern includes four connecting conductors which are fixedly connected to said four connection terminals of the thin film magnetic head element, and said second conductive patter includes two connecting conductors which are fixedly connected to two contact pads among said four contact pads and two intermediate conductors having extended portions which cross two connecting conductors electrically connected to the remaining two contact pads.

In a third principal structure of the intermediate unit for thin film magnetic head according to the invention, said thin film magnetic head element is formed by a combination type thin film magnetic head element including an inductive type thin film magnetic head element and a magnetoresistive type thin film magnetic head element formed to be supported by the substrate in a stacked fashion, and there are formed two connection terminals connected to both ends of a thin film coil of the inductive type thin film magnetic head element, two connection terminals connected to both end of a magnetoresistive element of the magnetoresistive type thin film magnetic head element, and four contact pads. Said first conductive pattern of the wiring pattern includes two connecting conductors which are fixedly connected to two connection terminals among said four connection terminals of the thin film magnetic head element and two intermediate conductors having extended portions which cross two connecting conductors electrically connected to the remaining two connection terminals, and said second conductive patter of the wiring pattern includes four connecting conductors which are fixedly connected to said four contact pads.

In a fourth principal structure of the intermediate unit for thin film magnetic head according to the invention, said thin film magnetic head element is formed by a combination type thin film magnetic head element including an inductive type thin film magnetic head element and a magnetoresistive type thin film magnetic head element formed to be supported by the substrate in a stacked fashion, and both ends of a thin film coil of the inductive type thin film magnetic head element and both end of a magnetoresistive element of the magnetoresistive type thin film magnetic head element are connected to four connection terminals, and the wiring pattern is formed such that said four connection terminals may be connected to four contact pads by means of the wiring pattern which includes the first conductive pattern having four connecting conductors and the second conductive pattern having four intermediate conductors. Then, the combination type thin film magnetic head element may be commonly used as the center element type sliders of up-type and down-type, in which said combination type thin film magnetic head element is situated at a center of the air bearing surface viewed from a direction perpendicular to the end surface of the substrate on which said contact pads are formed.

In a fifth principal structure of the intermediate unit for thin film magnetic head according to the invention, there are provided two combination type thin film magnetic head elements each of which includes an inductive type thin film magnetic head element and a magnetoresistive type thin film magnetic head element formed to be supported by the substrate in a stacked fashion, both ends of thin film coils of the two inductive type thin film magnetic head elements are connected to four connection terminals and both ends of magnetoresistive elements of the two magnetoresistive type thin film magnetic head elements are connected to four connection terminals, and said wiring pattern is formed such that said eight connection terminals may be connected to the four contact pads by means of the wiring pattern including the first conductive pattern having twelve connecting conductors and the second conductive pattern having four intermediate conductors. Then, said two combination type the thin film magnetic head elements may be commonly used as the side element type sliders of up-type and down-type, in which the two thin film magnetic head elements are situated at positions which are symmetrical with respect to a center of the air bearing surface viewed from a direction perpendicular to the end surface of the substrate on which the contact pads are provided.

In a sixth principal structure of the intermediate unit for thin film magnetic head according to the invention, there are provided three combination type thin film magnetic head elements each of which includes an inductive type thin film magnetic head element and a magnetoresistive type thin film magnetic head element formed to be supported by the substrate in a stacked fashion, both ends of thin film coils of the three inductive type thin film magnetic head elements are connected to six connection terminals and both ends of magnetoresistive elements of the three magnetoresistive type thin film magnetic head elements are connected to six connection terminals, and the wiring pattern is formed such that said twelve connection terminals may be connected to four contact pads by means of the wiring pattern including the first conductive pattern having sixteen connecting conductors and the second conductive pattern having four intermediate conductors. Then, said three combination type thin film magnetic head elements may be commonly used as the side element type sliders of up-type and down-type as well as the center element type sliders of up-type and down-type, in which one thin film magnetic head element is situated at a center of the air bearing surface and the remaining two thin film magnetic head elements are situated at side positions which are symmetrical with respect to the center of the air bearing surface viewed from a direction perpendicular to the end surface of the substrate on which the contact pads are provided.

Furthermore, the present invention relates to a method of manufacturing a thin film magnetic head including a substrate constituting a slider having an air bearing surface which is to be opposed to a surface of a record medium, at least one thin film magnetic head element supported by said substrate, at least two contact pads for connecting first and second connection terminals of said at least one thin film magnetic head element to an external circuit, said at least two contact pads being provided on one end surface of the substrate viewed in a direction in which the record medium travels, and a wiring pattern arranged to connect said first and second connection terminals of the thin film magnetic head element and said at least two contact pads through first and second conductive patterns. According to the invention, a method of manufacturing such a thin film magnetic head comprises:

- a step of forming said thin film magnetic head element such that the thin film magnetic head element is supported by the substrate;
- a step of forming a plurality of connecting conductors and/or intermediate conductors constituting the first conductive pattern of the wiring pattern;
- a step of forming an insulating layer such that said first conductive pattern of the wiring pattern is covered with the insulating layer;
- a step of forming, on said insulating layer, the second conductive pattern of the wiring pattern, said second conductive pattern including a plurality of connecting conductors and/or intermediate conductors each of which crosses respective one of said plurality of connecting conductors and/or intermediate conductors of the first conductive pattern of the wiring pattern;
- a step of electrically connecting said connecting conductors and/or intermediate conductors of the first and second conductive patterns through contact holes formed in said insulating layer at a plurality of cross points selected in accordance with specifications of the thin film magnetic head to be manufactured among all cross points of the connecting conductors and/or intermediate conductors of the first and second conductive patters;
- a step of forming an overcoat layer at least on said end surface of the substrate; and
- a step of forming said at least two contact pads on said overcoat layer such that said contact pads are connected to said at least two connection terminals.

In the method of manufacturing the thin film magnetic head according to the invention, said first and second conductive patterns of the wiring pattern is preferably made of a same material in a same manufacturing process as an electrically conductive member of the thin film magnetic head element, and furthermore conductive members connecting these first and second conductive patterns are preferably made of a same material in a same process as the conductive member of the thin film magnetic head element.

In a case of forming a part or all of the wiring pattern is formed by a same material in a same process as the conductive member of the thin film magnetic head element, the first conductive pattern may be formed by a same material in a same process as a lower magnetic pole of an inductive type thin film magnetic head element and the second conductive pattern may be made of a same material as coil windings of a thin film coil and is formed simultaneously with the thin film coil; the first conductive patter may be made of a same material in a same process as the lower magnetic pole and the second conductive pattern may be made of a same material in a same process as an upper magnetic pole of the inductive type thin film magnetic head element; the first conductive pattern may be made of a same material in a same process as upper coil windings of a thin film coil and the second conductive pattern may be made of a same material in a same process as upper coil windings of the thin film coil; or the first conductive patter may be made of a same material in a same process as coil windings of a thin film coil and the second conductive pattern may be made of a same material in a same process as an upper magnetic pole.

In the method of manufacturing the thin film magnetic head according to the invention, it is preferable that said contact holes for connecting the first conductive pattern with the second conductive pattern are formed in said insulating layer in a same process as a process in which an opening is formed in said insulating layer for forming a back gap at a position remote from a magnetic gap, said lower and upper magnetic poles being magnetically coupled with each other at said back gap.

In the method of manufacturing the thin film magnetic head according to the invention, it is preferable to record information representing the specifications of the thin film magnetic head at a position which can be monitored from external. It is advantageous to form such information during a manufacturing process for electrically connecting a plurality of connecting conductors on different levels at a plurality of cross points selected in accordance with the specifications of the thin film magnetic head. In this case, information corresponding to the information formed on the thin film magnetic head may be formed on a photomask determining the specifications of the thin film magnetic head, and thus the specifications of the thin film magnetic head can be always corresponded to the information formed on the thin film magnetic head, and any mistake can be removed. Moreover, the information of the thin film magnetic head may be recorded in such a manner that the information may be automatically read out by a reader or may be directly monitored by human beings.

The present invention also relates to a method of manufacturing a thin film magnetic head by utilizing the above mentioned intermediate unit for thin film magnetic head, and according to the invention a method of manufacturing a thin film magnetic head comprises:

- a step of preparing and stocking a number of intermediate units for thin film magnetic head, each including a substrate constituting a slider having an air bearing surface which is to be opposed to a surface of a record medium, at least one thin film magnetic head element supported by said substrate, and a wiring pattern arranged such that a plurality of connection terminals of the thin film magnetic head element to a plurality of contact pads in accordance with a desired positional relationship defined by specifications of the thin film magnetic head, said contact pads being provided on an end surface of the substrate viewed in a traveling direction of the record medium for connecting said plurality of connection terminals of said at least one thin film magnetic head element to an external circuit; and
- a step of electrically connecting said first and second conductive patterns at a plurality of cross points selected in accordance with specifications of the thin film magnetic head among cross points between said first and second conductive patterns of the wiring pattern.

In such a method of manufacturing the thin film magnetic head according to the invention, information representing the specifications of the thin film magnetic head is preferably formed during said step of electrically connecting said first and second conductive patterns at a plurality of cross points selected in accordance with specifications of the thin film magnetic head among cross points between said first and second conductive patterns of the wiring pattern.

In the method of manufacturing the thin film magnetic head according to the invention, said step of electrically connecting the first and second conductive patterns of the wiring pattern may be carried out in various ways. For instance, the first and second conductive patterns may be connected by means of coupling conductors at a plurality of contact holes determined in accordance with the specifications among contact holes formed in the insulating layer at all cross points between the first and second conductive patterns.

Alternatively, coupling plugs are formed in all contact holes formed in the insulating layer such that the contact holes extend from an upper surface of the first conductive pattern to an upper surface of the second conductive pattern, and a plurality of coupling plugs and the second conductive pattern are electrically connected to each other by means of coupling patches at a plurality of cross points determined in accordance with the specifications of the thin film magnetic head. Furthermore, a plurality of contact holes are formed in the insulating layer at a plurality of cross points determined in accordance with the specifications of the thin film magnetic head such that said contact holes extend up to the first conductive pattern, and the second conductive pattern is connected to the first conductive pattern by means of said contact holes.

As stated above, in case of forming the contact holes at the cross points, after forming the necessary connection, the contact holes may be covered with an insulating layer, and a plurality of contact pads may be formed on this insulating layer such that the contact pads are connected to the second conductive pattern or conductive members connected thereto. In this case, the contact pads may be formed to have a large area extending above the wiring pattern, and therefore even if an end surface of a small slider becomes small, the contact pads having a large surface area can be obtained.

BRIEF DESCRIPTION OF THE DRAWINGS

FIGS. 1A, 1B–6A, 6B are cross sectional views showing successive steps of manufacturing a known combination type thin film magnetic head;

FIG. 11 is a end view depicting connection of contact pads of a known side element type thin film magnetic head of up-type;

FIGS. 25A, 25B–29A, 29B are cross sectional views depicting successive steps of an embodiment of the method of manufacturing the first embodiment of the thin film magnetic head according to the invention shown in FIG. 20;

FIGS. 31A and 31B are cross sectional views illustrating a step next to the step shown in FIG. 29;

FIGS. 32A, 32B–36A, 36B are cross sectional views showing successive steps of another embodiment of the method of manufacturing the first embodiment of the thin film magnetic head according to the invention shown in FIG. 20;

FIGS. 46A, 46B–50A, 50B are cross sectional and plan views showing successive steps for selectively connecting upper and lower connecting conductors to each other at crossings.

DESCRIPTION OF THE PREFERRED EMBODIMENT

Now the present invention will be explained in detail with reference to the accompanying drawings. Before explaining several embodiments, the principal structures of the wiring pattern of the thin film magnetic head according to the invention will be first explained.

Figure 1B:
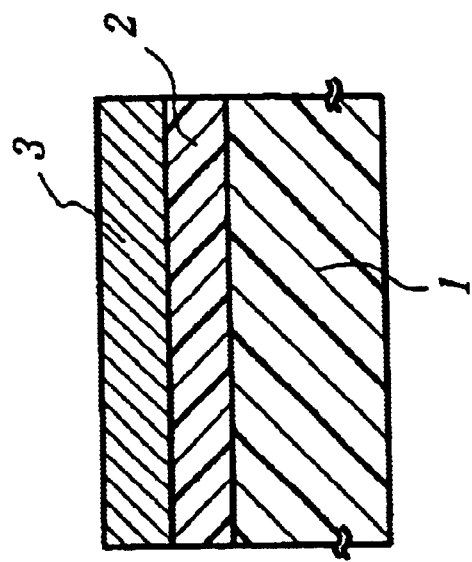
Figure 1A:
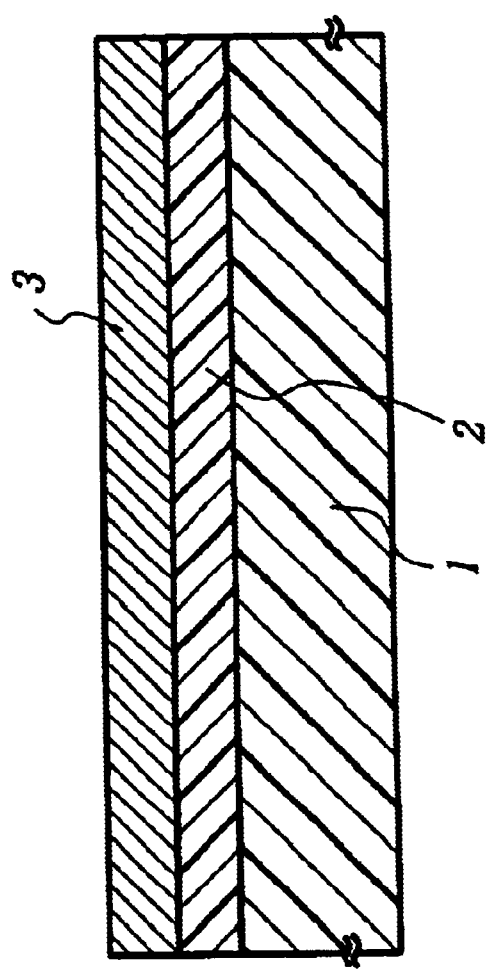
Figure 2B:
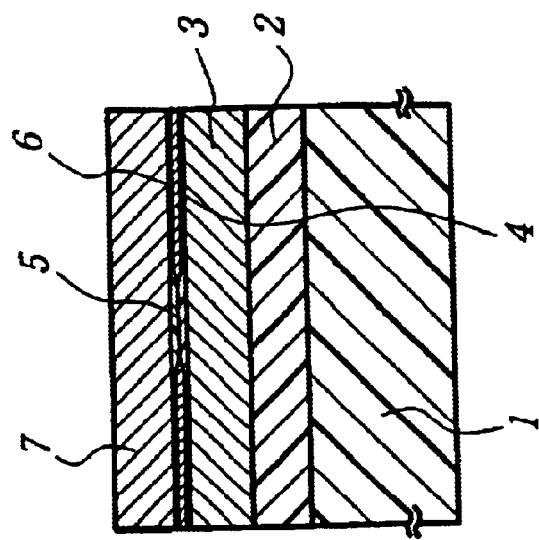
Figure 2A:
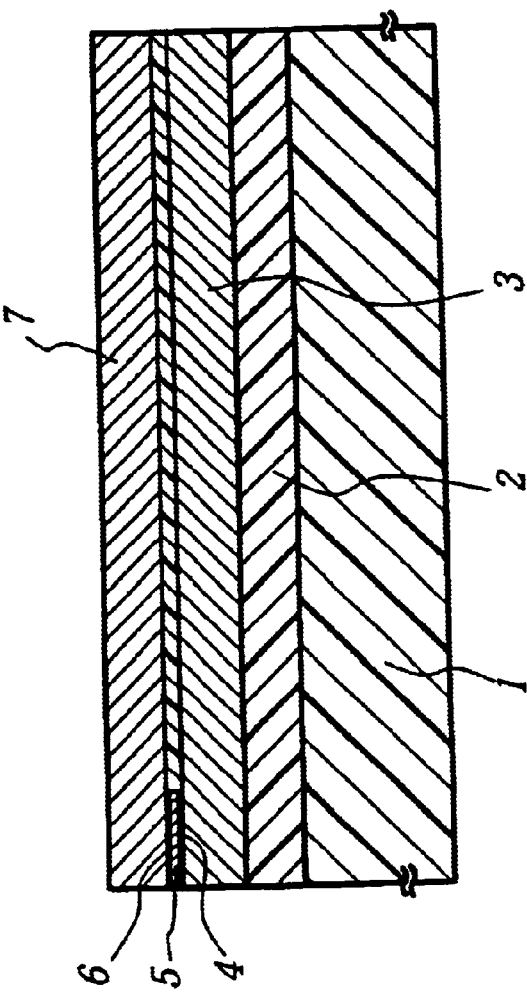
Figure 4B:
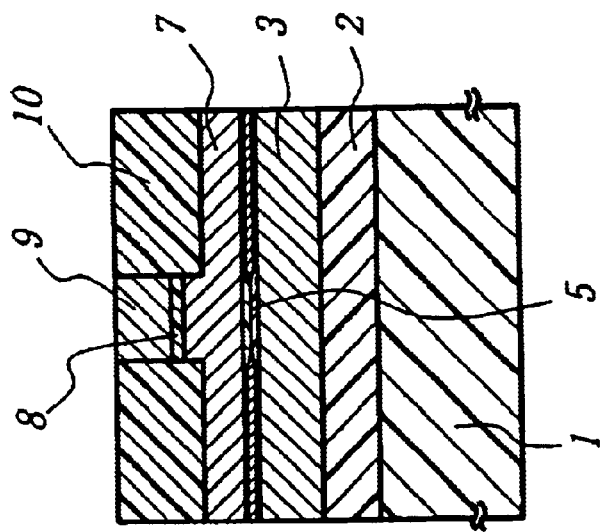
Figure 4A:
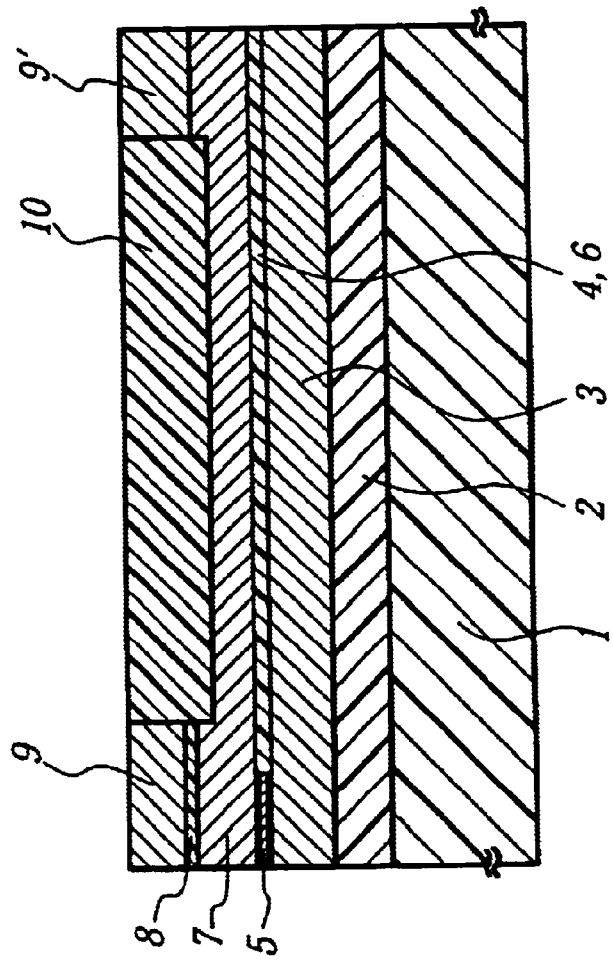
Figures 5A, 5B:
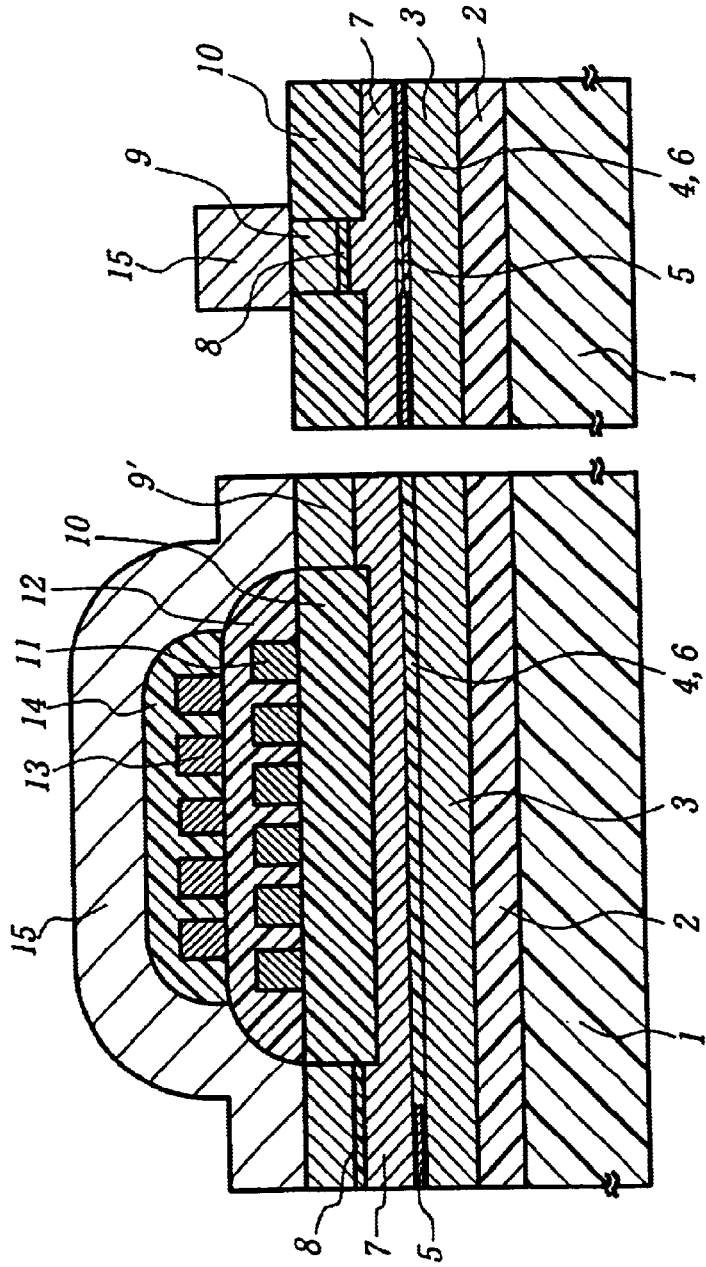
Figure 7:
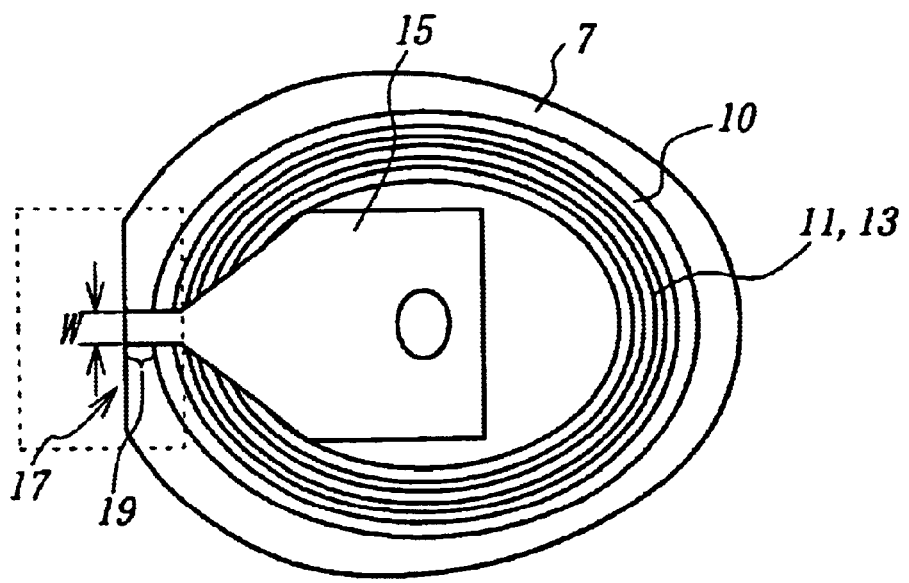
FIG. 7 is a plan view illustrating the known thin film magnetic head.
Figure 8:
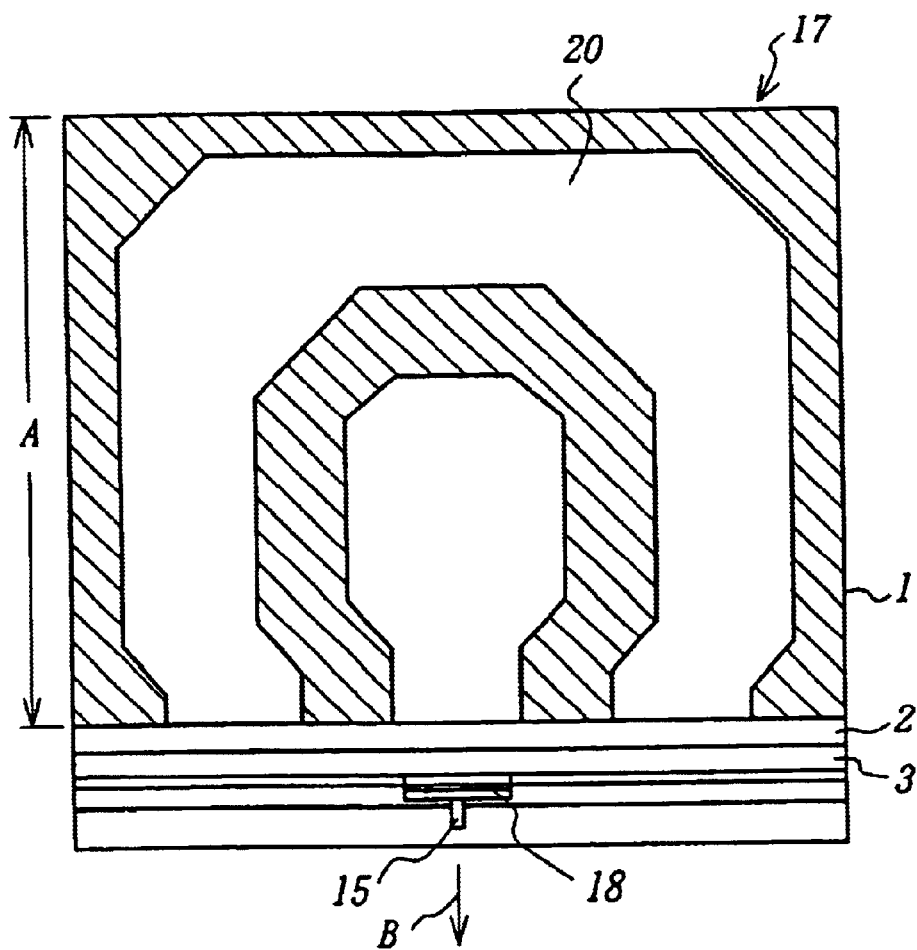
FIG. 8 is a bottom view of the known thin film magnetic head.
Figure 9:
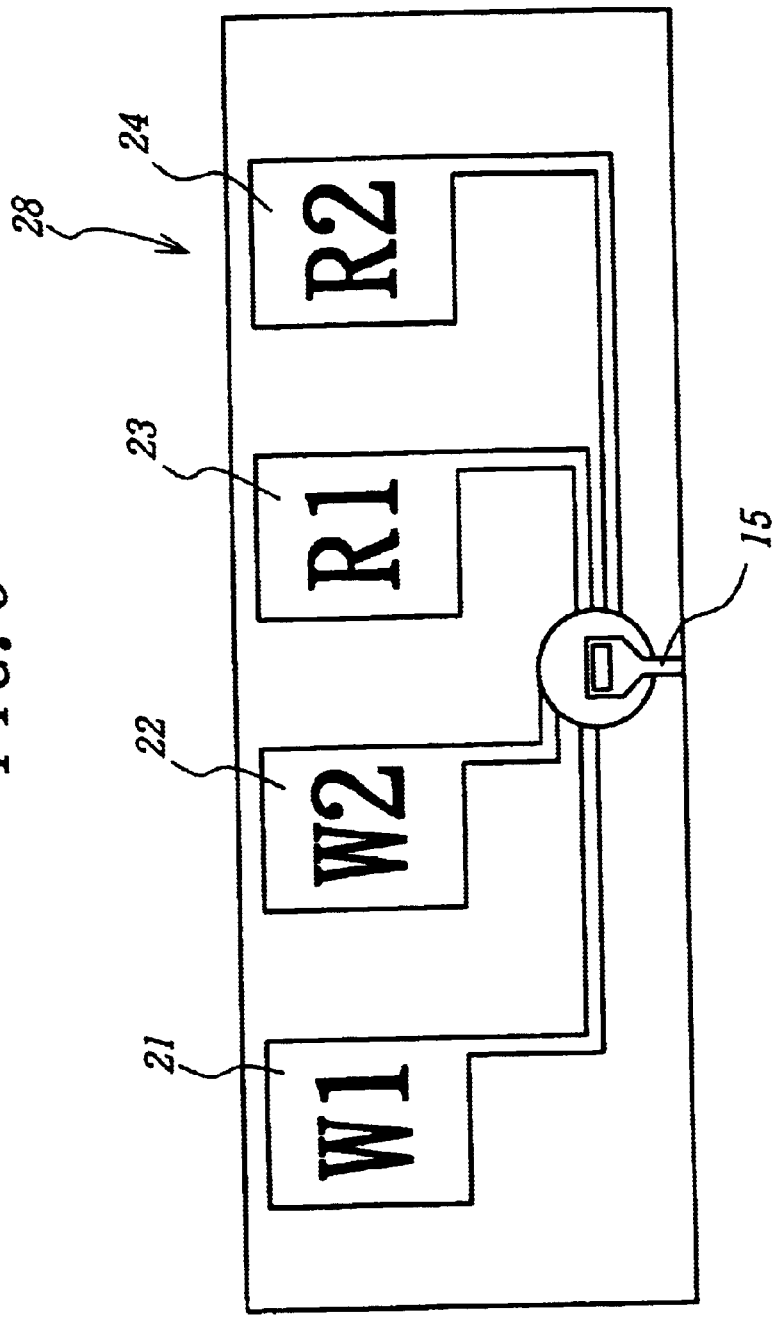
FIG. 9 is an end view of a known center element type thin film magnetic head, in which a connection of contact pads.
Figure 10A:
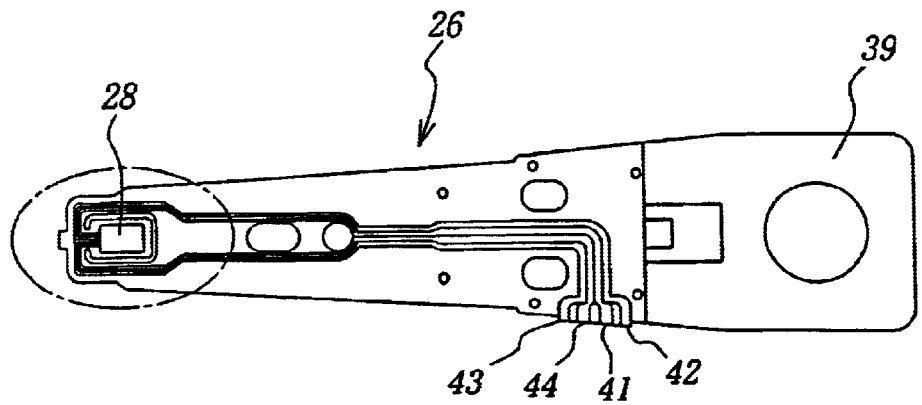
FIGS. 10A and 10B are plan and perspective views, respectively showing an arm having a slider provided thereon.
Figure 10B:
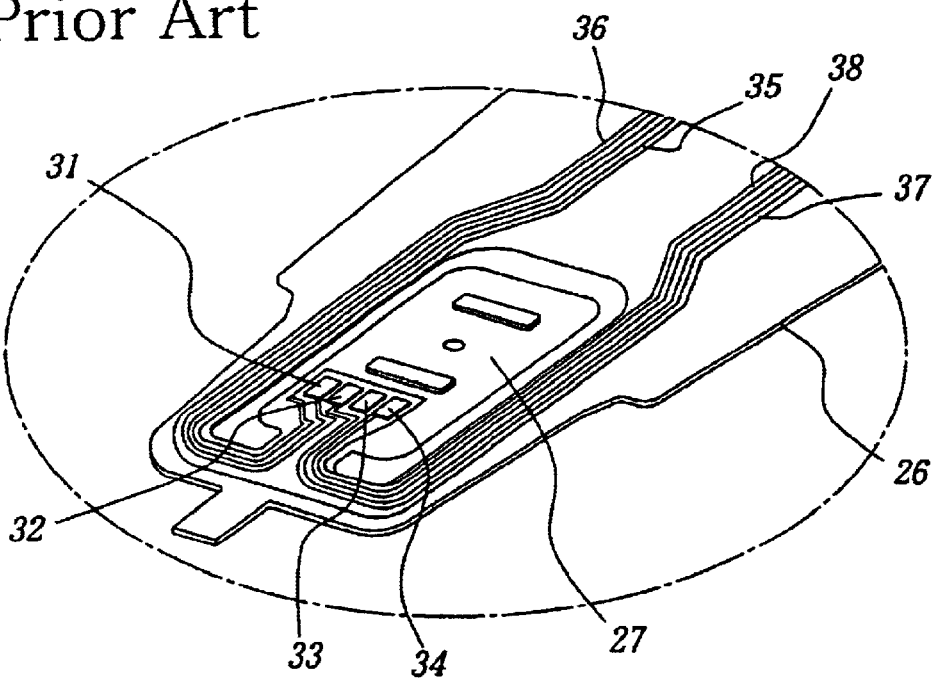
Figure 12:
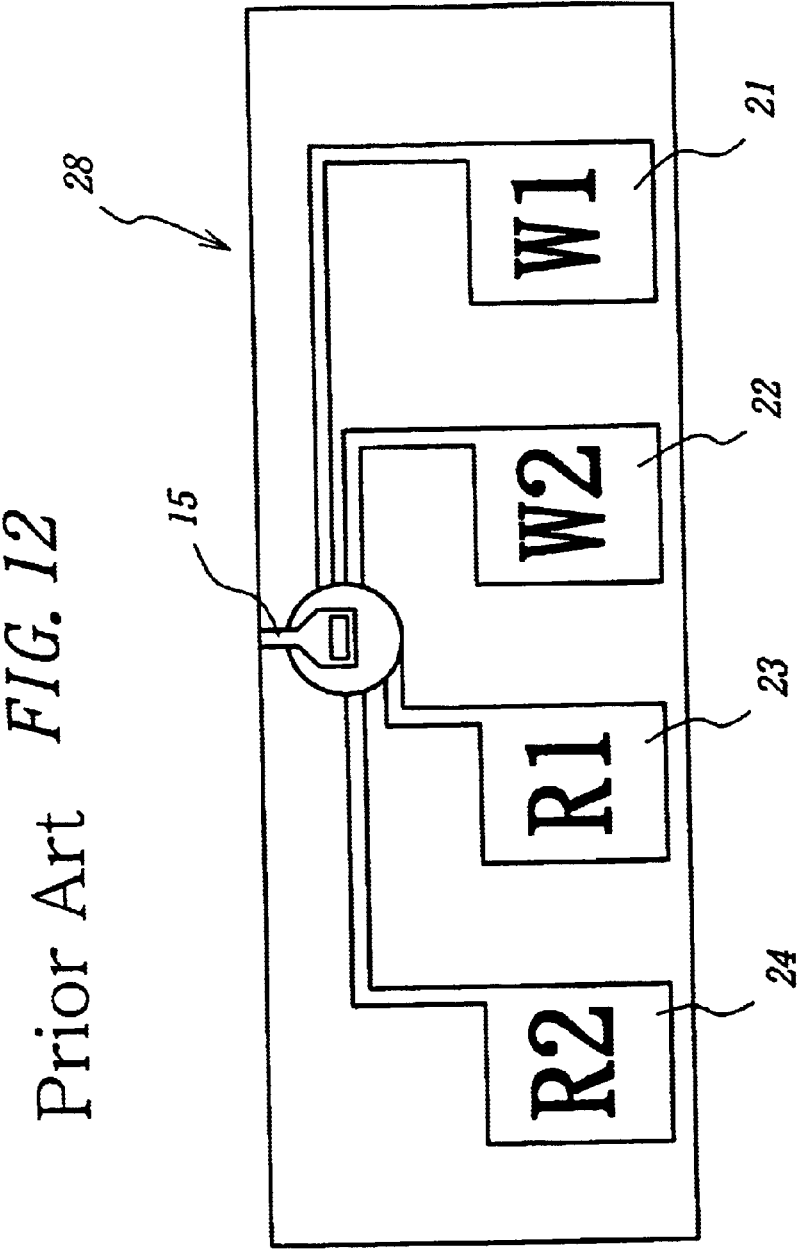
FIG. 12 is a end view showing connection of contact pads of a known center element type thin film magnetic head of down-type.
Figure 13:
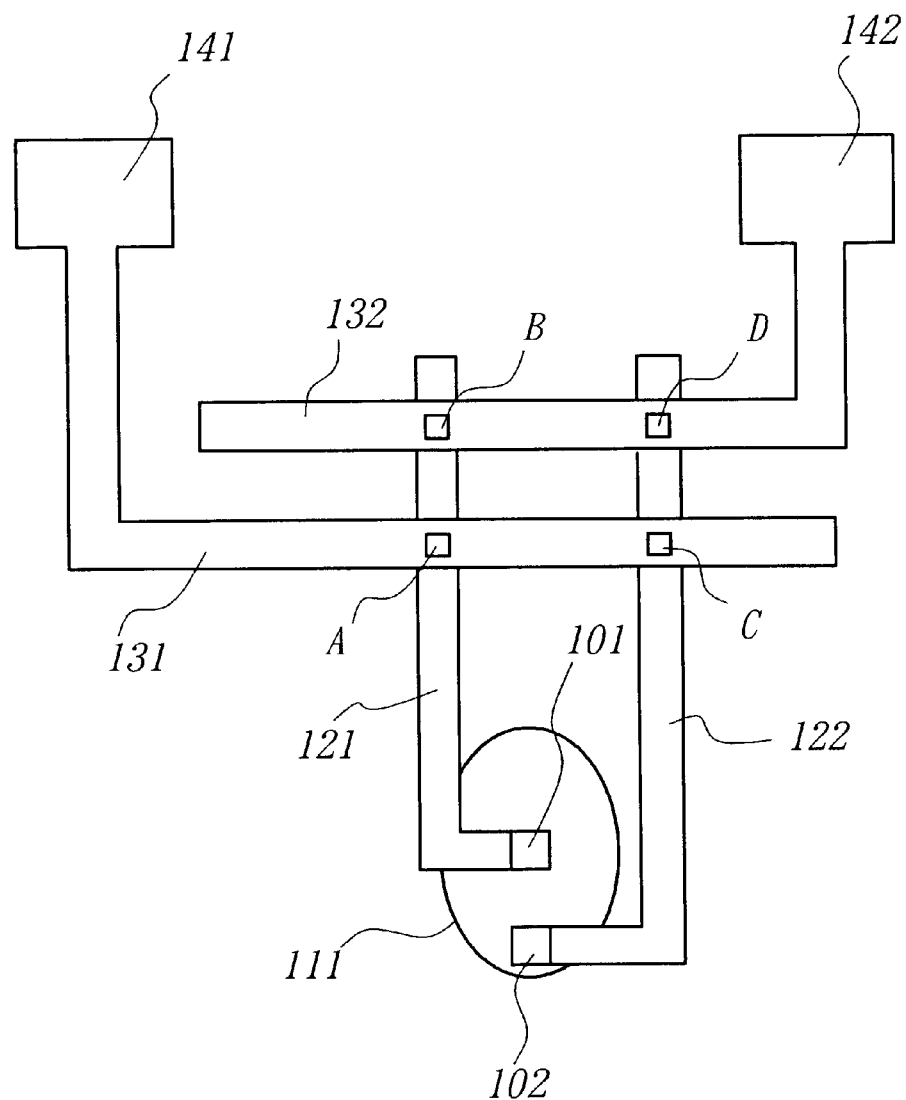
FIG. 13 is a schematic view illustrating an embodiment of the first principal structure of wiring pattern of the thin film magnetic head according to the invention.

FIG. 13 is a schematic view showing an example of a first principal structure of the thin film magnetic head according to the invention. When the principal structure is illustrated, a thin film magnetic head is shown schematically for the sake of simplicity. As will be apparent from embodiments to be explained later, the thin film magnetic head may comprise at least one inductive type thin film magnetic head element, at least one magnetoresistive type thin film magnetic head, and at least one inductive type thin film magnetic head element and at least one magnetoresistive type thin film magnetic head element. In FIG. 13, the thin film magnetic head includes only one thin film magnetic head element 111 for the sake of explanation.

The thin film magnetic head element 111 includes first and second connection terminals 101 and 102 which are connected to a component of the thin film magnetic head element. If the thin film magnetic head element 111 is formed by an inductive type thin film magnetic head, the first and second connection terminals are connected to both ends of a thin film coil. If the thin film magnetic head element 11 is constructed by a magnetoresistive type thin film magnetic head element, the first and second connection terminals are connected to both ends of a magnetoresistive element.

There are provided a first conductive pattern including first and second connecting conductors 121 and 122 whose one ends are connected to the first and second connection terminals 101 and 102, respectively, and a second conductive pattern including first and second connecting conductors 131 and 132 each of which crosses said first and second connecting conductors 121 and 122. The connecting conductors 121 and 122 of the first conductive pattern and the connecting conductors 131 and 132 of the second conductive pattern are separated from each other by means of an insulating layer such that these conductive patterns are formed on different levels viewed from a substrate surface. One ends of the first and second connecting conductors 131 and 132 of the second conductive pattern are connected to first and second contact pads 141 and 142 which serve to connect the thin film magnetic head 111 to an external circuit. The first and second connecting conductors 121 and 122 of the first conductive pattern include portions which extend in parallel with each other, and the first and second connecting conductors 131 and 132 of the second conductive pattern also include portions which extend in parallel with each other. The parallel portions of the first and second conductive patterns cross each other at right angles. However, according to the invention, it is not always necessary to provide portions which extend in parallel with each other, and therefore it is not necessary that the connecting conductors 121, 122 of the first conductive pattern and the connecting conductors 131, 132 of the second conductive pattern cross each other at right angles.

Figure 14A:
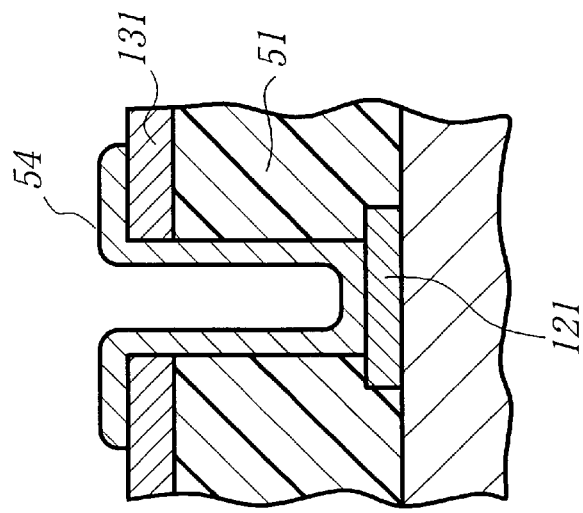
FIGS. 14A, 14B and 14C are cross sectional views representing an electrically conductive connection at crossing points of the wiring pattern.

As shown in FIG. 13, cross points between the first and second connecting conductors 121, 122 of the first conductive pattern and the first and second connecting conductors 131, 132 of the second conductive pattern are denoted by A, B, C and D. FIG. 14A is a cross sectional view illustrating schematically the structure at a cross point between the first connecting conductor 121 of the first conductive pattern and the first connecting conductor 131 of the second conductive pattern. These connecting conductors 121 and 131 are separated by an insulating layer 51, and a contact hole 52 is formed in the insulating layer at the cross point, said connecting conductors 121 and 131 being communicated with each other through the contact hole.

When the first connection terminal 101 of the thin film magnetic head element 111 is to be connected to the first contact pad 141 and the second connection terminal 102 is to be connected to the second contact pad 142, the first connecting conductor 121 of the first conductive pattern is electrically connected to the first connecting conductor 131 of the second conductive pattern at the cross point A and at the same the second connecting conductor 122 of the first conductive pattern is electrically connected to the second connecting conductor 132 of the second conductive pattern at the cross point D. In this manner, according to the invention, it is possible to obtain easily a thin film magnetic head having desired specifications by selecting cross points at which connecting conductors are electrically connected to each other in accordance with the desired specifications.

For instance, now it is assumed that the thin film magnetic head 111 includes an inductive type thin film magnetic head, the first connection terminal 101 is connected to the innermost coil winding of a thin film coil and the second connection terminal 102 is connected to the outermost coil winding of the thin film coil. Then, by connecting electrically the connecting conductors at the cross points A and D, the innermost coil winding of the thin film coil may be connected to the first contact pad 141 and the outermost coil winding may be connected to the second contact pad 142. Alternatively, when the connecting conductors are connected to each other at the cross points B and D, the innermost coil winding of the thin film coil may be connected to the second contact pad 142 and the outermost coil winding may be connected to the first contact pad 141.

Figure 14B:
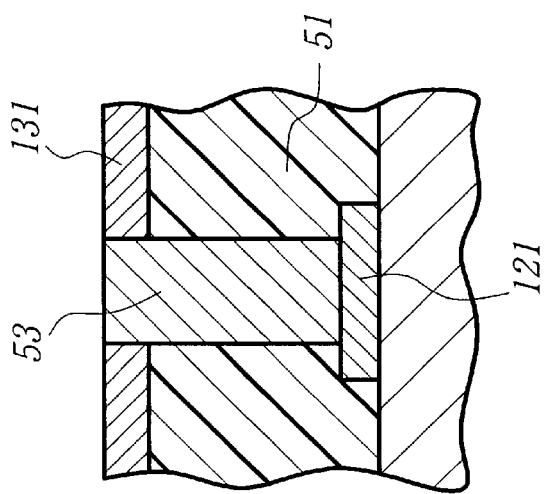
Figure 14C:
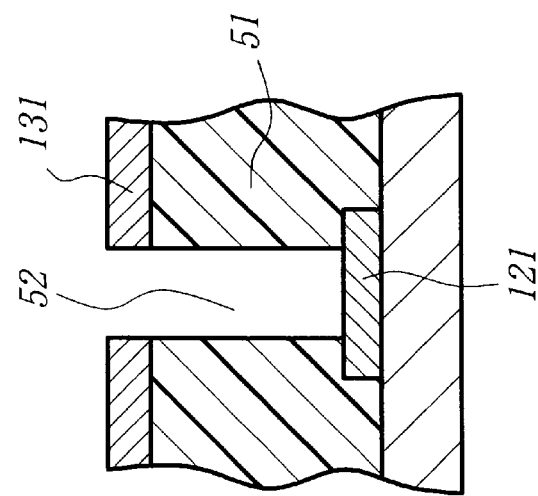

FIGS. 14B and 14C depict embodiments of the electrical connection between the connecting conductors of the first and second conductive patterns at the cross point. In FIG. 14B, the connecting conductors 121 and 131 are electrically connected to each other by means of a plug 53 made of an electrically conductive material and embedded within the contact hole 52. In FIG. 14C, the connecting conductors 121 and 131 are electrically connected to each other by means of a conductive layer 54 applied on the inner wall of the contact hole 52. According to the invention, the manner of electrically connecting the connecting conductors mutually or to intermediate conductors is not limited to those shown in FIGS. 14B and 14C, but many modifications may be conceived.

Figure 15:
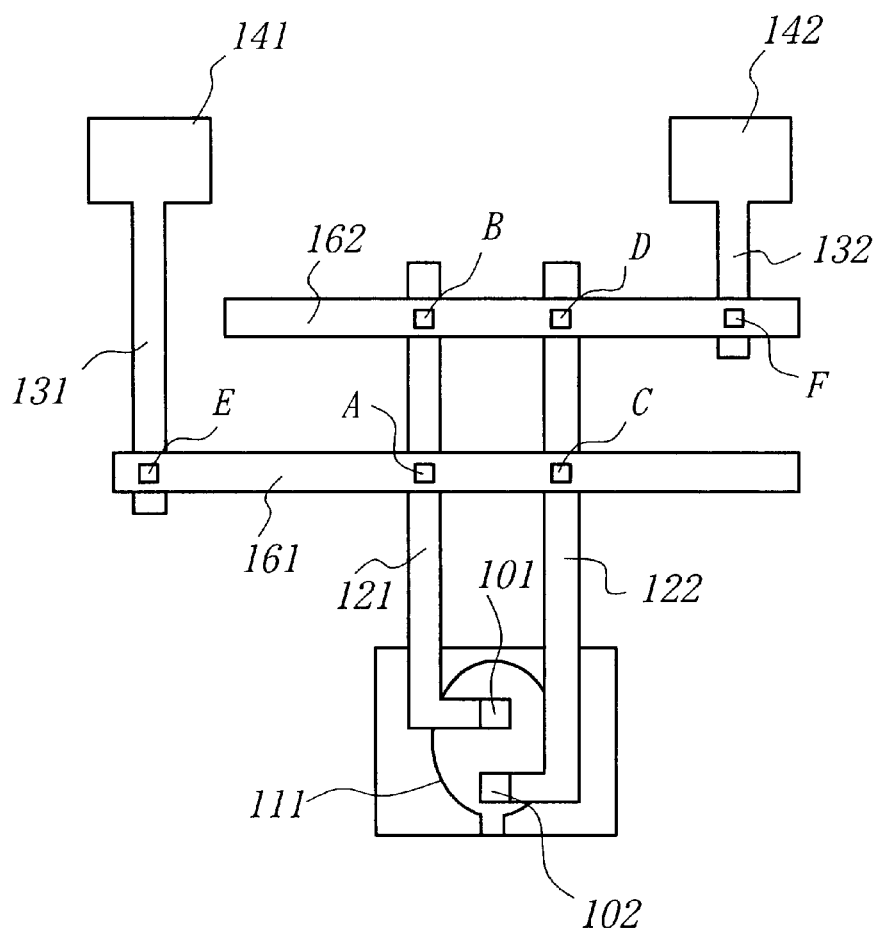
FIG. 15 is a schematic view showing another embodiment of the first principal structure of the wiring pattern according to the invention.

FIG. 15 is a schematic view representing another embodiment of the thin film magnetic head according to the first principal structure of the invention. In the present embodiment, there are arranged a second conductive pattern including first and second connecting conductors 161 and 162 which cross the first and second connecting conductors 121 and 122 of the first conductive patterns connected to the first and second connection terminals 101 and 102, respectively of the thin film magnetic head element 111, and the first and second connecting conductors 131 and 132 connected to the first and second contact pads 141 and 142, respectively cross the first and second intermediate conductors 161 and 162, respectively.

In this structure, at a cross point E between the first connecting conductor 131 connected to the first contact pad 141 and the first intermediate conductor 161 and a cross point F between the second connecting conductor 132 connected to the second contact pad 142 and the second intermediate conductor 162, the connecting conductors are fixedly connected to each other irrespective of specifications of thin film magnetic heads. At the remaining cross points A–D, the electrical connection is effected at two cross points selected in accordance with specifications of thin film magnetic heads, and this electrical connection may be performed in a similar manner as the first embodiment shown in FIG. 13. It should be noted that in the embodiment shown in FIG. 13, the connecting conductors 121, 122 of the first conductive pattern are formed on a first level and the connecting conductors 131, 132 of the second conductive pattern are formed on a second level, but in the present embodiment, the connecting conductors 121, 122 of the first conductive pattern are formed on a first level, the intermediate conductors 161, 162 constituting the second conductive pattern are formed on a second level, and the connecting conductors 131, 132 for connecting the intermediate conductors to the contact pads 141, 142 are formed on a third level.

Figure 16:
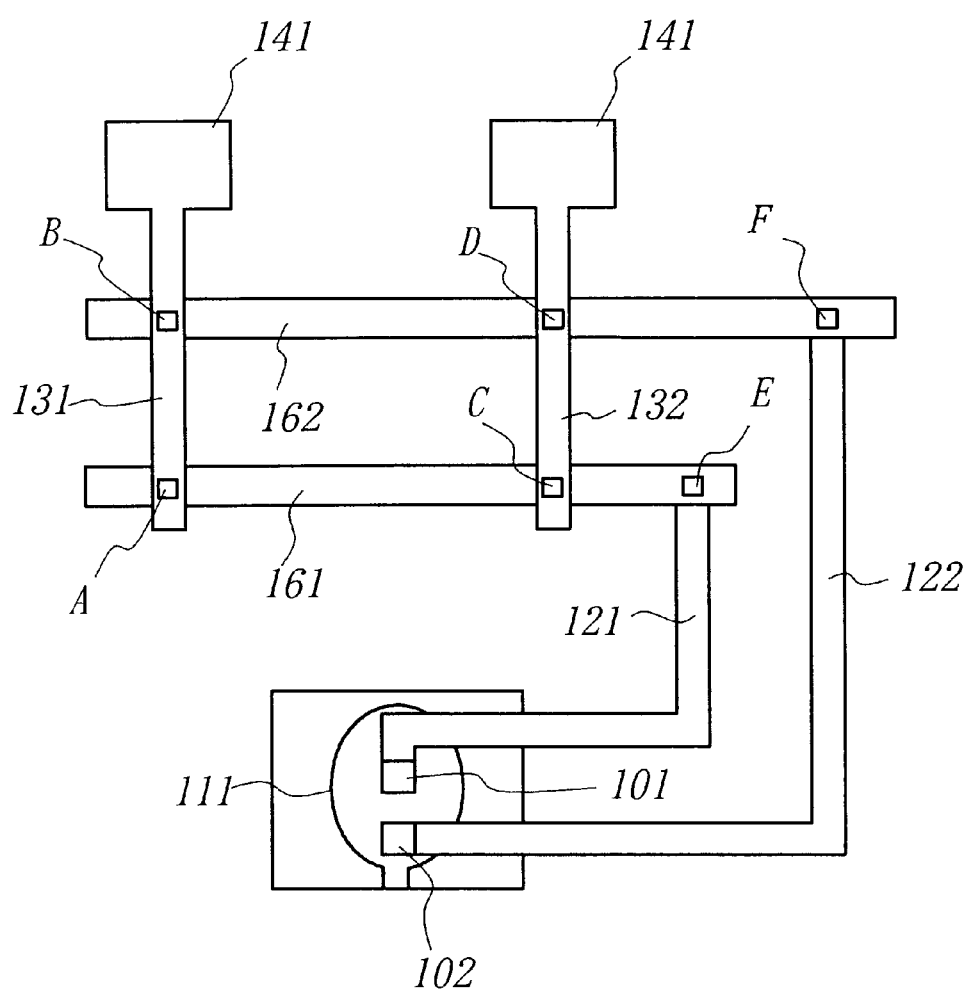
FIG. 16 is a schematic view depicting still another embodiment of the first principal structure of the wiring pattern according to the invention.

FIG. 16 is a schematic view representing still another embodiment of the thin film magnetic head according to the first principal structure of the invention. In the present embodiment, the first and second intermediate conductors 161 and 162 constituting the first conductive pattern cross the first and second connecting conductors 131 and 132 constituting the second conductive pattern, and the first and second connecting conductors 161 and 162 of the first conductive patterns cross the first and second connecting conductors 121 and 122, respectively connected to the connection terminals 101 and 102, respectively. In this embodiment, at cross points E and F between the first and second connecting conductors 121, 122 and the first and second intermediate conductors 161, 162, the connecting conductors are fixedly connected to each other regardless of specifications of thin film magnetic heads. At the remaining cross points A–D, the electrical connection is effected at two cross points selected in accordance with specifications of thin film magnetic heads in a similar manner as the first and second embodiments illustrated in FIGS. 13 and 15.

Figure 17:
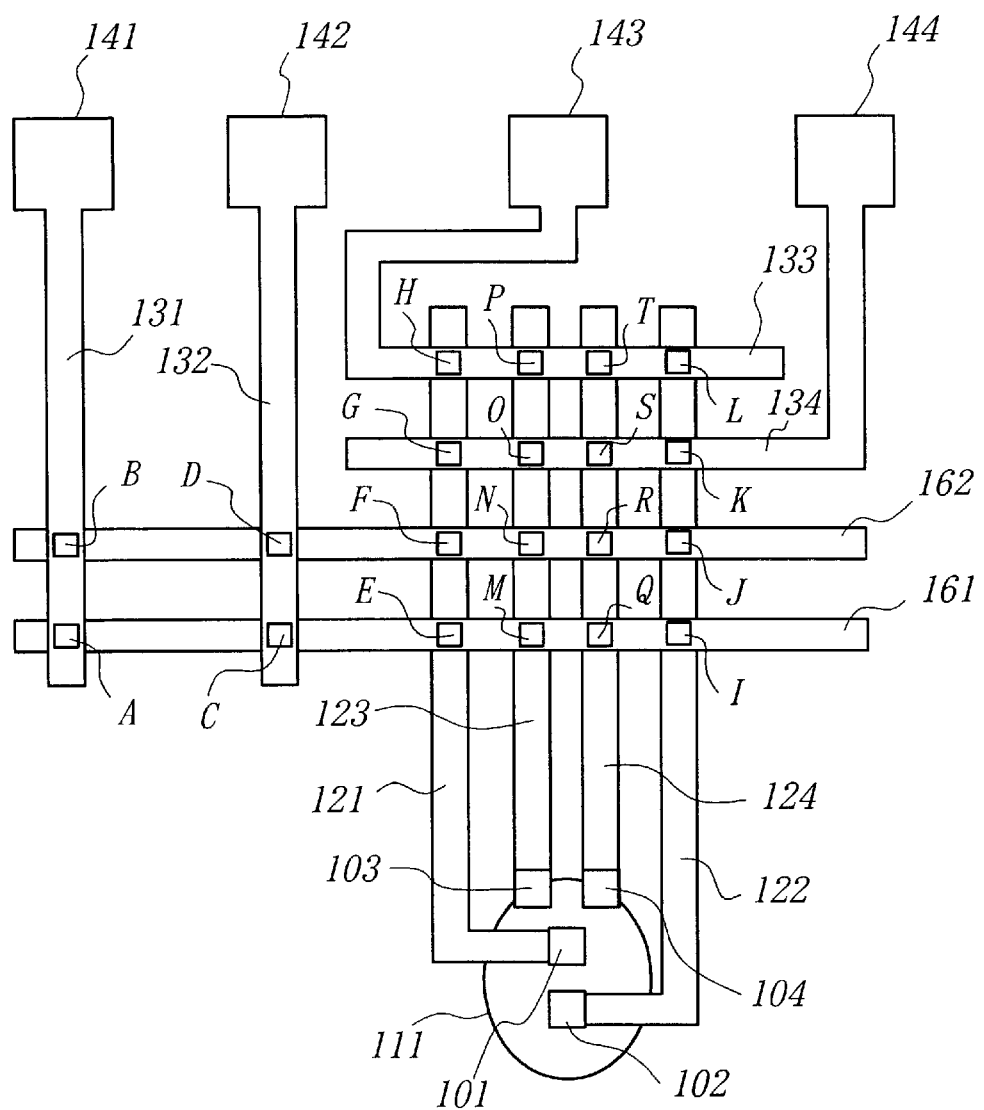
FIG. 17 is a schematic view showing an embodiment of the second principal structure of the wiring pattern according to the invention.

FIG. 17 is a schematic view showing the second principal structure of the thin film magnetic head according to the invention. In the first principal structure so far explained, the thin film magnetic head includes only one thin film magnetic head element, but in the second principal structure, the thin film magnetic head contains two thin film magnetic head elements. That is to say, the thin film magnetic head is formed as a combination type thin film magnetic head including an inductive type thin film magnetic head element and a magnetoresistive type thin film magnetic head element. In this combination type thin film magnetic head element 111, there are provided first and second connection terminals 101 and 102 connected to respective ends of a thin film coil of the inductive type thin film magnetic head element, and third and fourth connection terminals 103 and 104 connected to respective ends of a magnetoresistive element of the magnetoresistive type thin film magnetic head element. In this structure, the first conductive pattern of the wiring pattern includes four connecting conductors 121–124 connected to said four connection terminals, respectively, and the second conductive pattern includes two intermediate conductors 161 and 162 and two connecting conductors 133 and 134 connected to the contact pads 143 and 144, respectively.

There are provided four contact pads 141-144 for connecting the thin film magnetic head to an external circuit, and the first and second connecting conductors 131 and 132 connected to the first and second contact pads 141 and 142, respectively cross extended portions of the first and second intermediate conductors 161 and 162 at four cross points A–D, said first and second intermediate conductors crossing all the four connecting conductors 121–124 of the first conductive pattern. The second conductive pattern of the wiring pattern includes the third and fourth connecting conductors 133 and 134 connected to the third and fourth contact pads 143,and 144, respectively and crossing all the four connecting conductors 121–124 of the first conductive pattern. Therefore, the first and second conductive patterns of the wiring pattern cross each other at sixteen cross points E–T.

In the second principal structure of the present invention, various connection modes may be attained as shown in the following table 1.

TABLE 1

|  | Pad | | | |
| --- | --- | --- | --- | --- |
| Output terminal | 141 | 142 | 143 | 144 |
| 101 | E, A<br>F, B | E, C<br>F, D | H | G |
| 102 | J, B<br>I, A | J, D<br>I, C | L | K |
| 103 | M, A<br>N, B | M, C<br>N, D | P | O |
| 104 | R, B<br>Q, A | R, D<br>Q, C | T | S |

|  |  | Pad | | | |
| --- | --- | --- | --- | --- | --- |
| Type |  | 141 | 142 | 143 | 144 |
| Up | normal | E, A<br>(101) | J, D<br>(102) | P<br>(103) | S<br>(104) |
|  | cross | E, C<br>(102) | J, B<br>(101) | P<br>(103) | S<br>(104) |
| Up | normal | M, A<br>(103) | R, D<br>(104) | L<br>(102) | G<br>(101) |
|  | cross | M, A<br>(103) | R, D<br>(104) | H<br>(101) | K<br>(102) |

For instance, when the connection terminal 101 connected to the innermost coil winding of the thin film coil of the inductive type thin film magnetic head element of the thin film magnetic head 111 is to be electrically coupled with first contact pad 141, the first connecting conductor 121 of the first conductive pattern is coupled with the first intermediate conductor 161 of the second conductive pattern at the cross point E and the first intermediate conductor 161 is electrically coupled with the first connecting conductor 131 at the cross point A. Alternatively, such a connection may be attained by performing similar electrical couplings at the cross points F and B. When the connection terminal 102 connected to the outermost coil winding of the thin film coil is to be connected to the second contact pad 142, upper and lower conductors may be electrically coupled with each other at the cross points E and C or at cross points F and D.

When the connection terminal 103 connected to one end of the magnetoresistive element of the magnetoresistive type thin film magnetic head element of the thin film magnetic head 111 is to be electrically coupled with the third contact pad 143 and the connection terminal 104 connected to the other end of the magnetoresistive element is to be electrically coupled with the fourth contact pad 144, the electrical connection may be performed at the cross points P and S. Furthermore, when the connection terminal 103 connected to one end of the magnetoresistive type thin film magnetic head element of the thin film magnetic head 111 is to be electrically coupled with the fourth contact pad 144 and the connection terminal 104 connected to the other end of the magnetoresistive type thin film magnetic head element is to be electrically coupled with the third contact pad 143, the conductive couplings may be effected at the cross points O and T. In this manner, by selecting cross points at which the electrical coupling is to be performed, the thin film magnetic head 111 can be connected to the contact pads 141–144 with any desired combination.

Figure 18:
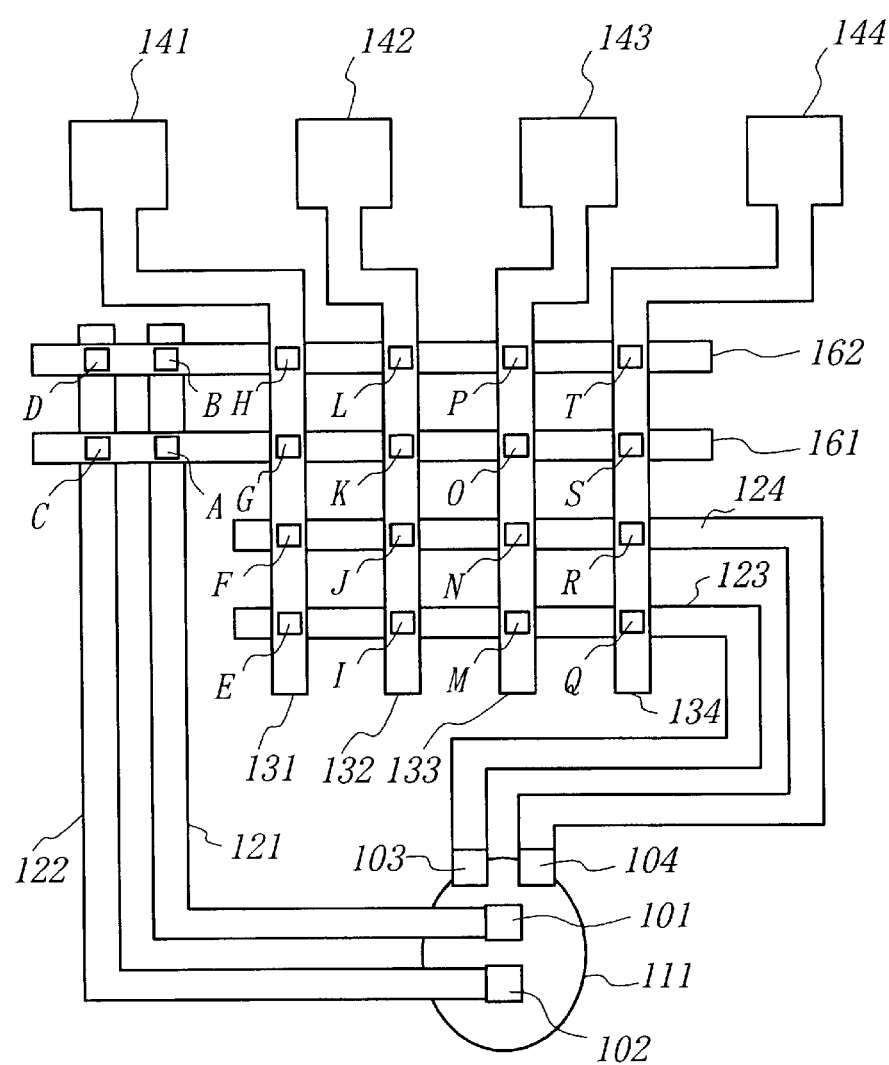
FIG. 18 is a schematic view illustrating an embodiment of the third principal structure of the wiring pattern according to the invention.

FIG. 18 shows the third principal structure of the thin film magnetic head according to the invention. In this structure, the first and second conductive patterns of the second principal structure shown in FIG. 17 are exchanged mutually. That is to say, the first conductive pattern is constituted by the first and second connecting conductors 123 and 124 connected to the third and fourth connection terminals 103 and 104, respectively and the two intermediate conductors 161 and 162, the second conductive pattern is constituted by the first to fourth connecting conductors 131–134 connected to the contact pads 141–144, respectively, and the first and second connecting conductors 121 and 122 connected to the connection terminals 101 and 102, respectively cross extended portions of the intermediate conductors 161 and 162 at four cross points A–D. Also in this structure, the third and fourth connecting conductors 123, 124 and first and second intermediate conductors 161,162 of the first conductive pattern cross the first to fourth connecting conductors 131–134 of the second conductive patter at sixteen cross points E–T.

The following table 2 represents the connection modes of the above explained third principal structure.

TABLE 2

| | Pad | | | |
|---|---|---|---|---|
| Output terminal | 141 | 142 | 143 | 144 |
| 101 | A, G | A, K | A, O | A, S |
|  | B, H | B, L | B, P | B, T |
| 102 | D, H | D, L | D, P | D, T |
|  | C, G | C, K | C, O | C, S |
| 103 | E | I | M | Q |
| 104 | F | J | N | R |

| | | Pad | | | |
|---|---|---|---|---|---|
| Type | | 141 | 142 | 143 | 144 |
| Up | normal | A, G | D, L | M | R |
|  |  | (101) | (102) | (103) | (104) |
|  | cross | B, L | C, G | M | R |
|  |  | (102) | (101) | (103) | (104) |
| Down | normal | E | J | D, P | A, S |
|  |  | (103) | (104) | (102) | (101) |
|  | cross | E | J | B, P | C, S |
|  |  | (103) | (104) | (101) | (102) |

For instance, when the connection terminal 101 connected to the innermost coil winding of the thin film coil of the inductive type thin film magnetic head element of the thin film magnetic head 111 is to be electrically coupled with first contact pad 141, the connection terminal 102 connected to the outermost coil winding is to be electrically coupled with second contact pad 142, the connection terminal 103 connected to one end of the magnetoresistive type thin film magnetic head element is to be electrically coupled with the third contact pad 143, and the connection terminal 104 connected to the other end of the magnetoresistive type thin film magnetic head element is electrically coupled with the fourth contact pad 144, the conductive couplings may be performed at cross points A, G, D, L, M and R or at cross points B, H, C, K, M and R.

Figure 19:
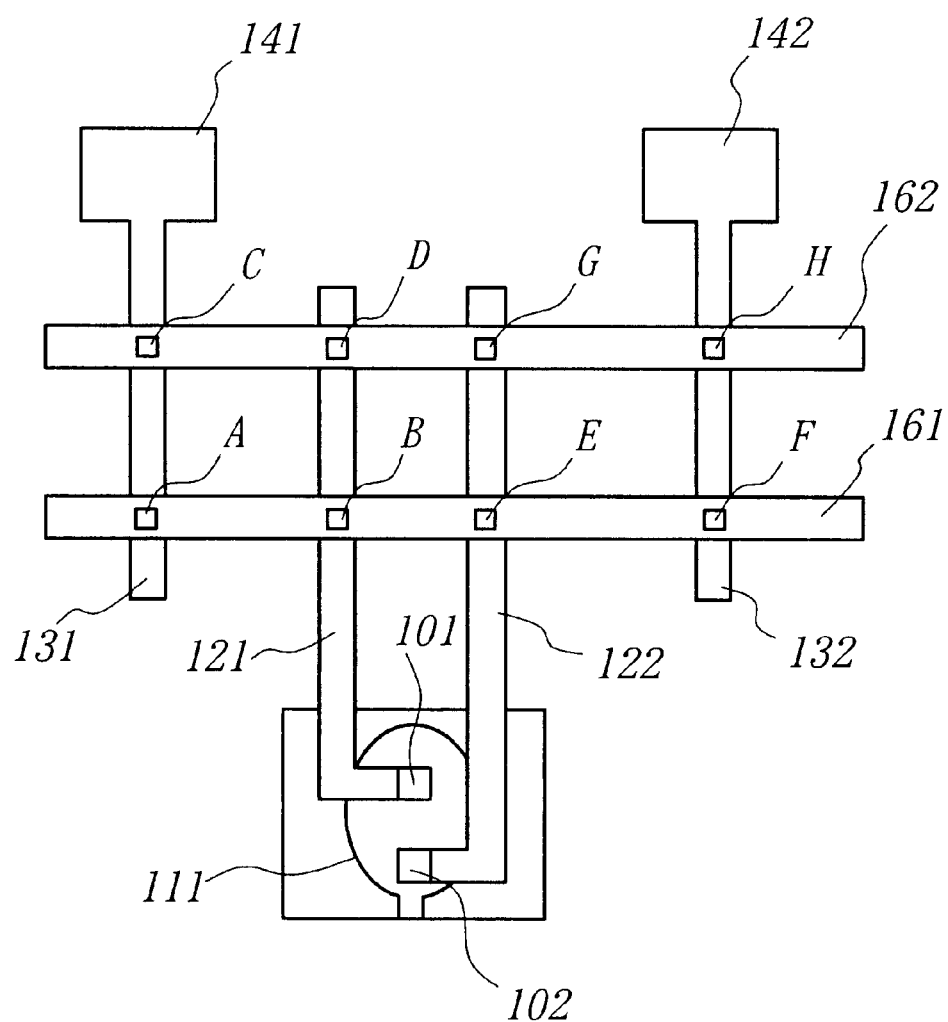
FIG. 19 is a schematic view representing an embodiment of the fourth principal structure of the wiring pattern according to the invention.

FIG. 19 is a schematic view depicting the fourth principal structure of the thin film magnetic head according to the invention. In this structure, portions similar to those of the first principal structure shown in FIG. 13 are denoted by the same reference numerals used in FIG. 13. In the fourth principal structure, the first conductive pattern of the wiring pattern is constituted by first and second connecting conductors 121 and 122 connected to the first and second connection terminals 101 and 102 of the thin film magnetic head 111, respectively and third and fourth connecting conductors 131 and 132 connected to the first and second contact pads 141 and 142, respectively, and the second conductive pattern is constituted by first and second intermediate conductors 161 and 162, each of which crosses all the connecting conductors 121, 122, 131 and 132 of the first conductive pattern. In this case, as illustrated in FIG. 19, it is preferable that the first and second connecting conductors 121., 122, 131 and 132 of the first conductive pattern are formed in parallel with each other and the first and second intermediate conductors 161 and 162 of the second conductive pattern are also formed in parallel with each other and are extended substantially perpendicularly to the connecting conductors 121, 122, 131 and 132. The number of the intermediate conductors constituting the second conductive pattern is identical with the number of the contact pads.

In the fourth principal structure, eight cross points between the four connecting conductors 121, 122, 131 and 132 of the first conductive pattern and the two intermediate conductors 161 and 162 of the second conductive pattern are denoted as A–H as depicted in FIG. 19. When the first connection terminal 101 of the thin film magnetic head 111 is to be coupled with the first contact pad 141, connecting conductors are electrically coupled with each other at cross points A and B, and when the second connection terminal 102 of the thin film magnetic head 111 is to be coupled with the second contact pad 142, connecting conductors are coupled with each other at cross points G and H. Alternatively, when the first connection terminal 101 of the thin film magnetic head 111 is to be coupled with the second contact pad 142, connecting conductors are electrically coupled with each other at cross points D and H, and when the second connection terminal 102 of the thin film magnetic head 111 is to be coupled with the first contact pad 141, connecting conductors may be electrically coupled with each other at cross points A and E.

Figure 20:
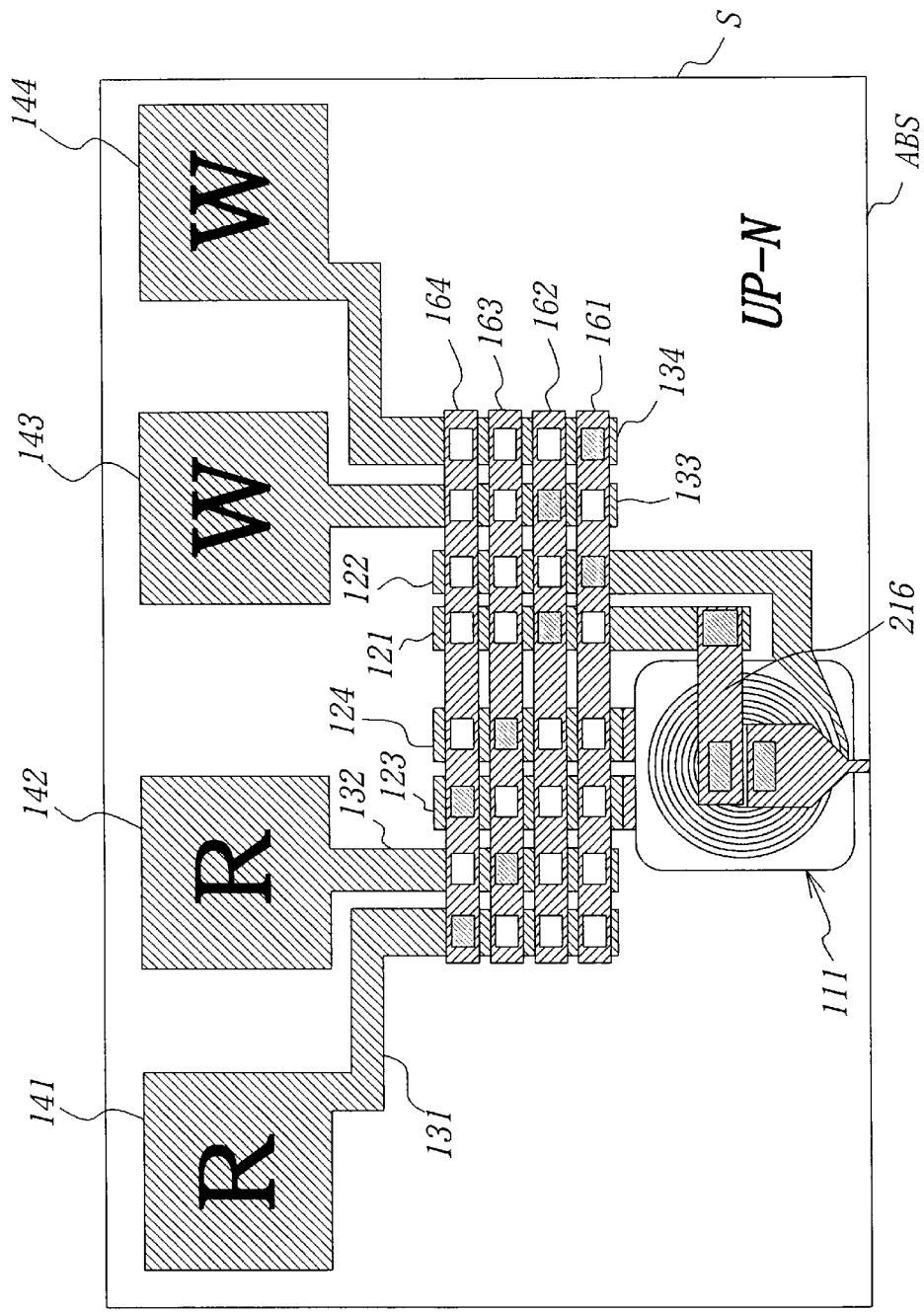
FIG. 20 is an end view showing the connection of contact pads of a first embodiment of the thin film magnetic head of center element- and up-type according to the invention.
Figure 21:
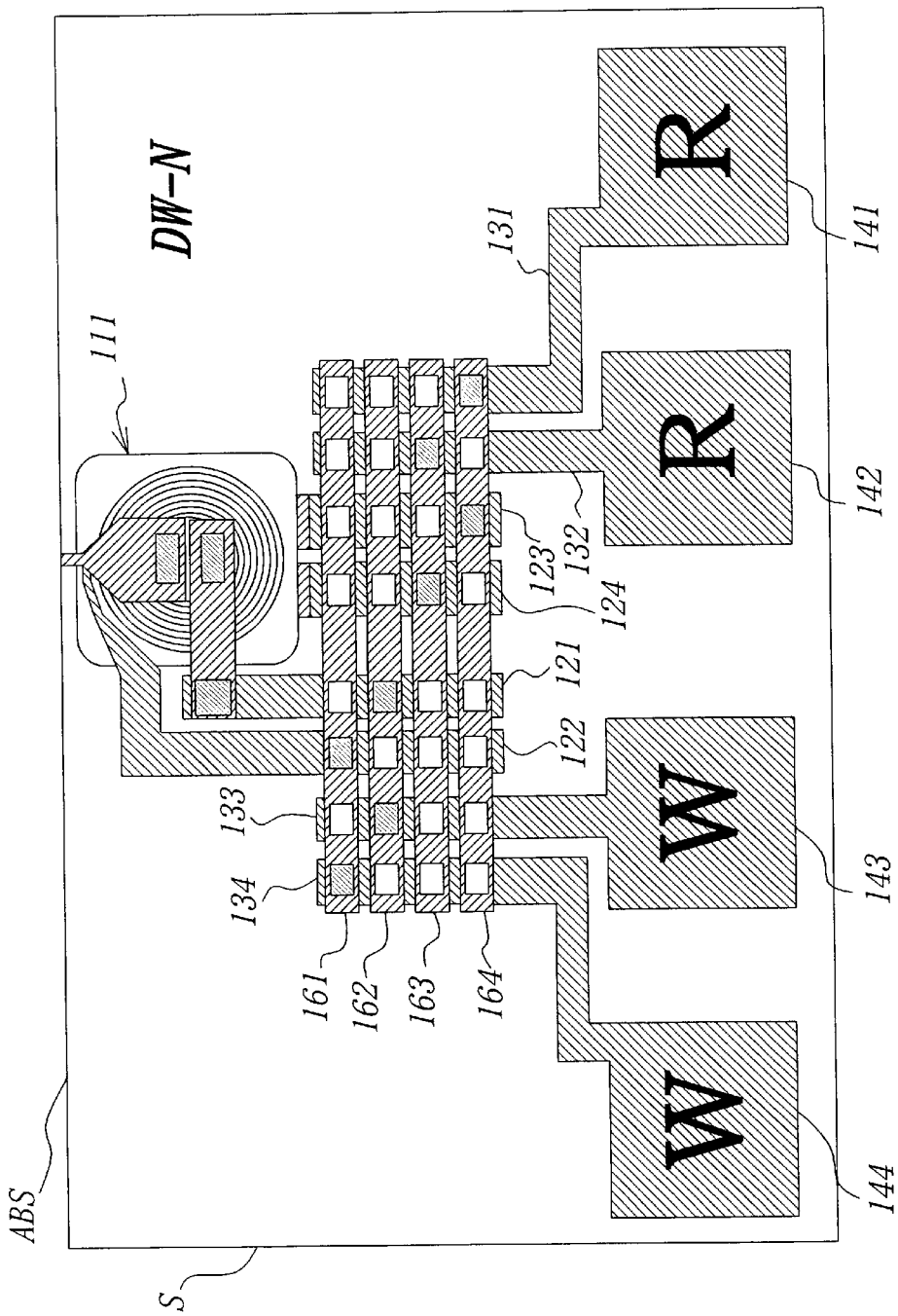
FIG. 21 is an end view showing the connection of contact pads of a second embodiment of the thin film magnetic head of center element-and down-type according to the invention.

FIGS. 20 and 21 are schematic views showing a first embodiment of the thin film magnetic head according to the fourth principal structure of the present invention. In these drawings, an end face of a slider S on which contact pads are provided is shown. In a lower surface of the slider S, there is formed the air bearing surface ABS which is to be opposed to the magnetic record medium which travels from the back to forth of the plane of the drawing. In the present embodiment, the magnetic head is formed as a center element type in which only one combination type thin film magnetic head element is arranged at a center of the slider S viewed in a direction in which the magnetic record medium travels. A detailed structure of this combination type thin film magnetic head 111 will be explained later, but here it should be noted that an inductive type thin film magnetic head element and a magnetoresistive type thin film magnetic head element are arranged in a stacked fashion viewed in a direction perpendicular to a plane of the drawing of FIG. 20.

The connecting conductors 121 and 122 electrically coupled with the innermost and outermost coil windings, respectively of a thin film coil of the inductive type thin film magnetic head and the connecting conductors 123 and 124 electrically coupled with respective ends of a magnetoresistive element of the magnetoresistive type thin film magnetic head element are arranged in parallel with each other. The four connecting conductors 131–134 connected to the first to fourth contact pads 141–144, respectively for connecting the combination type thin film magnetic head 111 are arranged also in parallel with the above mentioned connecting conductors 121–124. These eight connecting conductors constitute the first conductive pattern of the wiring pattern. The first to fourth intermediate conductors 161–164 constituting their second conductive pattern are arranged in parallel with each other and are extended perpendicularly to the eight connecting conductors 121–124 and 131–134 of the first conductive pattern. Therefore, the present embodiment is formed in accordance with the fourth principal structure shown in FIG. 19.

In FIG. 20, among 32 cross points between the connecting conductors 121–124 constituting the first conductive pattern and the first to fourth intermediate conductors 161–164 constituting the second conductive pattern, portions at which upper and lower conductive layers are electrically coupled with each other by means of conductive members are denoted with hatching. For instance, the connecting conductor 121 of the first conductive pattern is electrically coupled with the second intermediate conductor 162 of the second conductive pattern, and this second intermediate conductor is further electrically coupled with the connecting conductor 133 of the first conductive pattern. Therefore, the innermost coil winding of the thin film coil of the inductive type thin film magnetic head element of the combination type thin film magnetic head 111 is connected to the third contact pad 143 by means of the connecting conductor 121 of the first conductive pattern, intermediate conductor 162 of the second conductive pattern and connecting conductor 133 of the first conductive pattern.

As illustrated in FIG. 20, the outermost coil winding of the thin film coil is connected to the fourth contact pad 144, and both ends of the magnetoresistive element of the magnetoresistive type thin film magnetic head element are connected to the first and second contact pads 141 and 142, respectively. In FIG. 20, the contact pads connected to the thin film coil are denoted by "W" and the contact pads connected to the magnetoresistive element are denoted by "R" for the sake of clarity. That is to say, the left hand two contact pads 141, 142 are connected to the magnetoresistive element and the right hand two contact pads 143, 144 are connected to the thin film coil.

In the embodiment shown in FIG. 20, the slider S is used as the up-type in which the slider is arranged above the record medium. As explained above, if the slider is used as the down-type one as it is, a suitable relationship in connection between the combination type thin film magnetic head element and the contact pads could not be attained.

According to the present invention, by merely changing cross points at which upper and lower conductive layers are to be electrically coupled with each other, the up-type slider can be used as the down-type slider without changing the structure of the thin film magnetic head.

FIG. 21 shows the structure of the down-type slider constructed by the up-type slider shown in FIG. 20. In order to construct the thin film magnetic head as the down-type one, cross points at which the electrically connection has to be performed are changed. For instance, the innermost coil winding of the thin film coil of the combination type thin film magnetic head 111 is connected to the first contact pad 141 via the connecting conductor 121 of the first conductive pattern, intermediate conductor 161 of the second conductive pattern and connecting conductor 131 of the first conductive pattern, and the outermost coil winding of the thin film coil is connected to the second contact pad 142 by means of the connecting conductor 122 of the first conductive pattern, intermediate conductor 162 of the second conductive pattern and connecting conductor 132 of the first conductive pattern. Also in this case, the left hand two contact pads 144, 143 are connected to the thin film coil as shown by "W" and the right hand two contact pads 141, 142 are connected to the magnetoresistive element as illustrated by "R". That is to say, both in the up-type and down-type, the contact pads 141, 142 are used for reading and the contact pads 143, 144 are used for the writing.

In the normal type connection mode with respect to the thin film coil, the innermost coil winding of the thin film coil is connected to the inner contact pad 143 and the outermost coil winding is connected to the outer contact pad 144. In the cross type connection mode of the thin film coil, the connection is inverted to that explained above. Both the up-type slider shown in FIG. 20 and the down-type slider illustrated in FIG. 21 are of the normal type.

As explained above, in the thin film magnetic head according to the invention, the structure except for the wiring pattern is identical for the up-type and down-type as well as the normal-type and cross-type. Therefore, it is difficult to know to what type manufactured thin film coil magnetic heads belong. Then, one could not easily know whether or not manufactured thin film magnetic heads satisfy user's requirements. Moreover, also on user's side, users could not confirm easily whether or not thin film magnetic heads to be installed into hard disk drives have predetermined specifications, and there is a fear that erroneous type thin film magnetic heads might be installed in hard disk drives.

According to the invention, in order to solve the above problem, information representing a specification of a thin film magnetic head is formed on the slider at such a position that the information can be inspected or monitored from outside. The information may be formed as marks which can be automatically readout by an automatic reader or may be recorded as figures and/or characters which can be easily recognized by human beings. In the embodiments shown in FIGS. 20 and 21 as well as in embodiments to be explained later, the above mentioned information is recorded on the slider such that it can be directly recognized by the human beings. That is to say, the slider shown in FIG. 20 has a mark "UP-N", which represents that the relevant slider is of the up-type and normal-type, is provided on a surface of the slide on which the thin film coil, wiring pattern and contact pads are formed. In the embodiment depicted in FIG. 21, "DW-N" mark is provided showing that this slider is of the down-type and normal-type. It is preferable that the mark is formed during a manufacturing process in which connecting conductors of different levels are electrically connected at a plurality of cross points selected in accordance a given specification. In this case, information representing the mark may be recorded on a photomask used for performing the above mentioned electrical connection. A method of recording of such information will be explained later.

Figure 22:
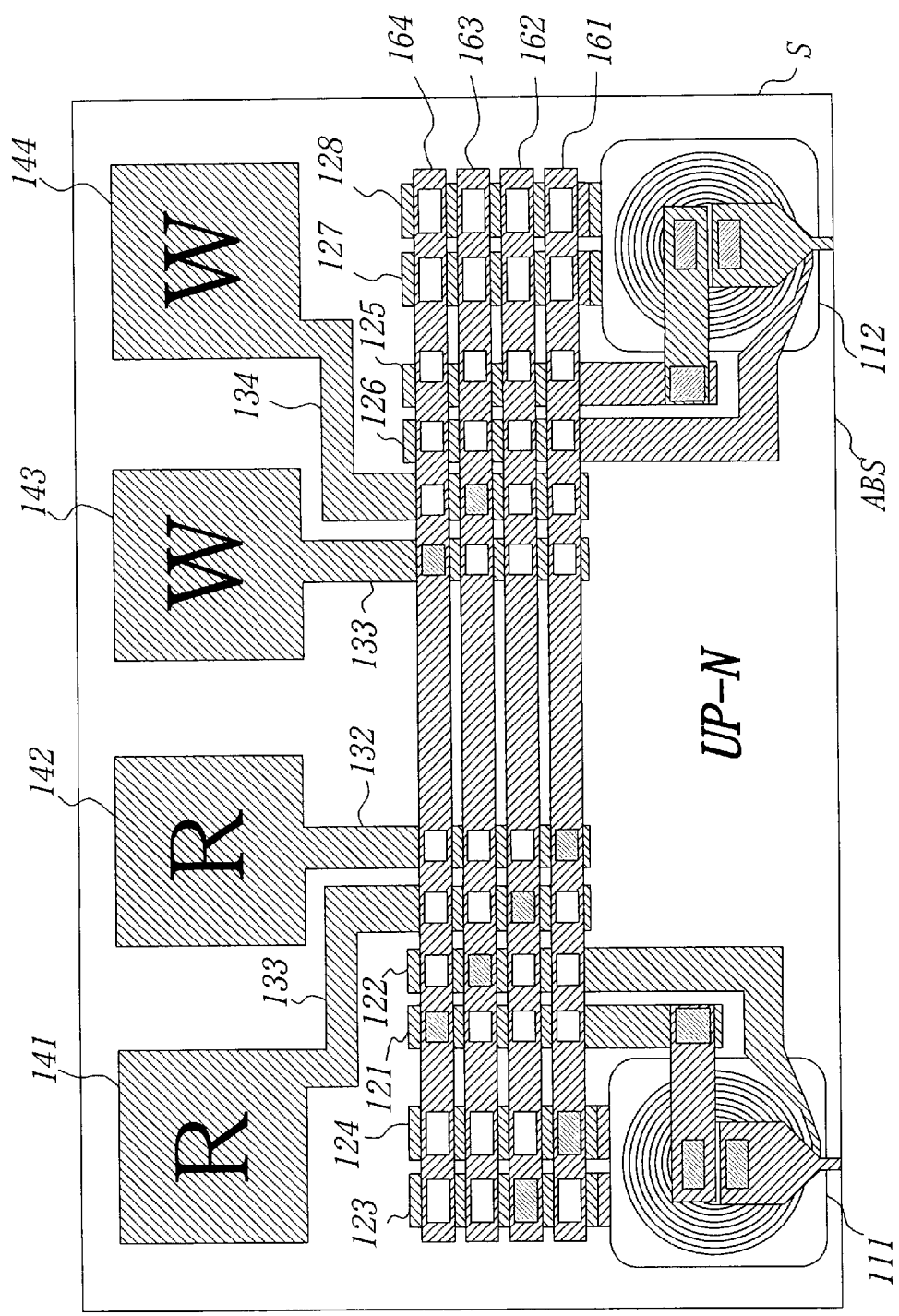
FIG. 22 is an end view showing the connection of contact pads of a third embodiment of the thin film magnetic head of side element- and up-type according to the invention.
Figure 23:
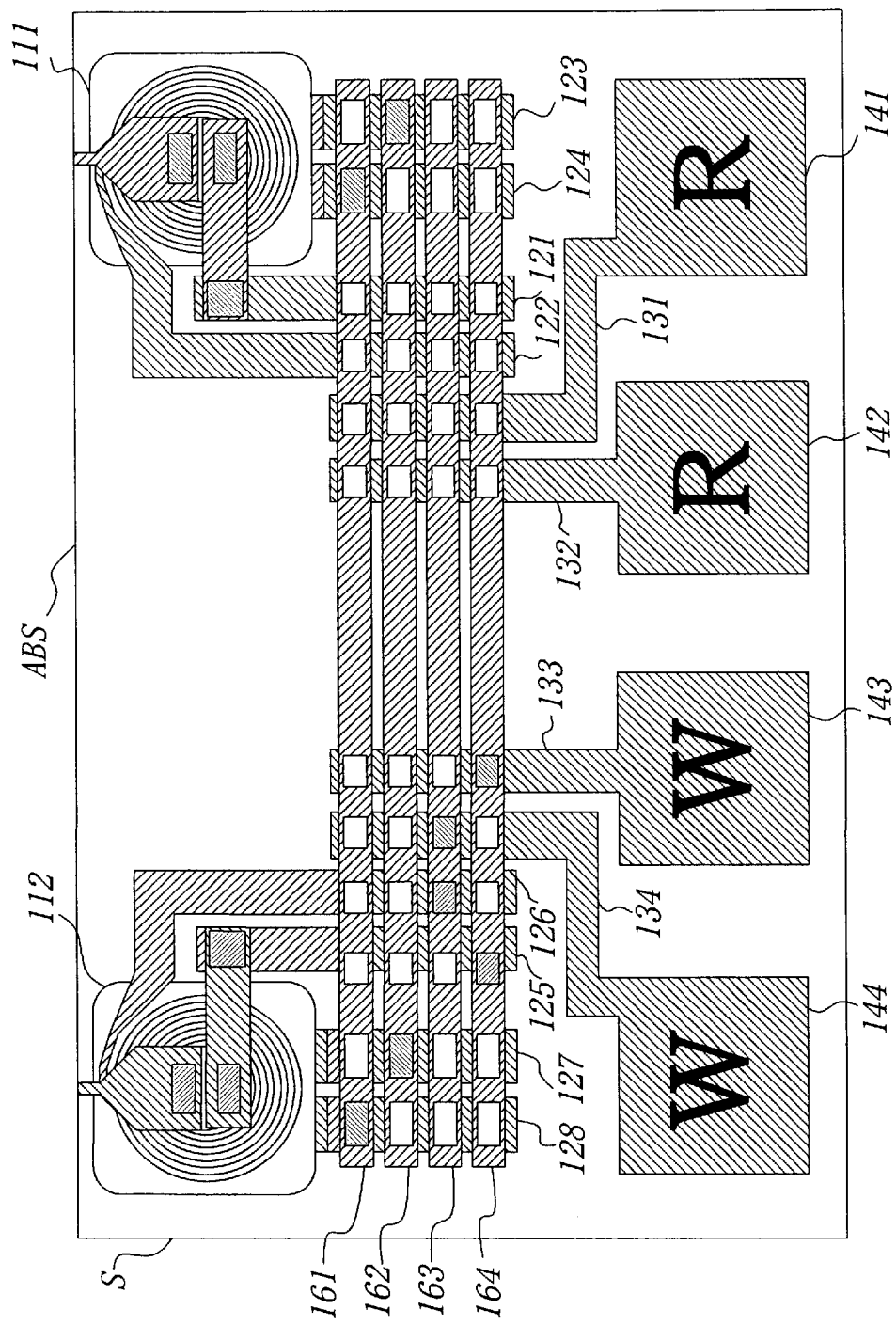
FIG. 23 is an end view showing the connection of contact pads of a fourth embodiment of the thin film magnetic head of side element- and down-type according to the invention.

FIGS. 22 and 23 show a second embodiment of the thin film magnetic head according to the invention formed as the side element type slider. The present embodiment belongs to the fourth principal structure according to the invention like as the first embodiment illustrated in FIGS. 20 and 21, and portions similar to those shown in FIGS. 20 and 21 are denoted by the same reference numerals used in these figures. In order to use the side element type slider both for the up-type and down-type, the slider S comprises first and second combination type thin film magnetic heads 111 and 112 which are arranged symmetrically with respect to a center line viewed in a direction perpendicular to the plane of the drawing.

Four connecting conductors 121–124 electrically coupled with the thin film coil of the inductive type thin film magnetic head element and the magnetoresistive element of the magnetoresistive type thin film magnetic head element of the first combination type thin film magnetic head 111, four connecting conductors 131–134 connected to the four contact pads 141–144, and four connecting conductors 125–128 electrically coupled with the thin film coil of the inductive type thin film magnetic head element and the magnetoresistive element of the magnetoresistive type thin film magnetic head element of the second combination type thin film magnetic head 112 are arranged in parallel with each other to constitute the first conductive pattern of the wiring pattern. Furthermore, four intermediate conductors 161–164 are arranged to constitute the second conductive pattern of the wiring pattern, each of said intermediate conductors crossing the above mentioned twelve connecting conductors of the first conductive pattern. Therefore, in the present embodiment, there are forty eight cross points.

In the up-type slider shown in FIG. 22, only the left hand first combination type thin film magnetic head 111 is used, and the right hand second combination type thin film magnetic head 112 is not used. Therefore, by performing a conductive connection between the connecting conductors and the intermediate conductors at eight cross points denoted by hatching, both: ends of the magnetoresistive element of the magnetoresistive type thin film magnetic head of the first combination type thin film magnetic head 111 are connected to the first and second contact pads 141 and 142, respectively and both ends of the thin film coil of the inductive type thin film magnetic head of the first combination type thin film magnetic head 111 are connected to the third and fourth contact pads 143 and 144, respectively. In the present embodiment, the innermost coil winding of the thin film coil is connected to the inner contact pad 143 and the outermost coil winding is connected to the outer contact pad 144, and thus the slider is of normal type, and a character mark "UP-N" is formed on the slider.

FIG. 23 represents the connection mode when the slider shown in FIG. 22 is used as the down-type one. In this case, the left hand second combination type thin film magnetic head 112 is used and the right hand first combination type thin film magnetic head 111 is not used. At eight cross points denoted by hatching, the connecting conductors constituting the first conductive pattern of the wiring patter are electrically coupled with the intermediate conductors constituting the second conductive pattern such that both ends of the thin film coil of the inductive type thin film magnetic head of the second combination type thin film magnetic head 112 are connected to the third and fourth contact pads 143 and 144, respectively and both ends of the magnetoresistive element of the magnetoresistive type thin film magnetic head of the second combination type thin film magnetic head 112 are connected to the first and second contact pads 141 and 142, respectively. In this embodiment, the connection mode between the thin film coil and the contact pads 143, 144 is of normal type, and thus a character mark "DW-N" is formed on the slider.

As explained above, in the second embodiment illustrated in FIGS. 22 and 23, the side element type slider of up-type and the side element type slider of down-type can be selected at will in accordance with specifications required by users. If a user requires a cross-type slider in which the connection of the innermost and outermost coil windings of the thin film coil to the contact pads are reversed to that shown in FIG. 23, such a requirement of the user can be easily and promptly satisfied by performing the electrical connection at eight cross points denoted by hatching in FIG. 24. In this case, a character mark "DW-C" is formed on the slider. In this manner, according to the present invention, a larger portion of the thin film magnetic head can be commonly utilized for various kinds of sliders irrespective of specifications of users, and therefore manufacturing masks can be commonly used. Therefore, a manufacturing cost can be reduced and a cost of a thin film magnetic head can be decreased. Furthermore, requirements of users can be satisfied promptly and accurately.

Now successive steps for manufacturing the first embodiment of the thin film magnetic head according to the invention shown in FIGS. 20 and 21 will be explained with reference to FIGS. 25–31 also taking account of the structure illustrated in FIG. 20. It should be noted that in there figures, A represents a cross sectional view perpendicular to the air bearing surface and B denotes a cross sectional view parallel with the air bearing surface. In the present embodiment, the magnetoresistive type thin film magnetic head for reading is first formed on the substrate and then the inductive type thin film magnetic head for writing is formed to construct the combination type thin film magnetic head.

As shown in FIG. 25, on a substrate 201 made of AlTiC, is deposited an insulating layer 202 made of alumina having a thickness of about 3–5 $\mu$m, a bottom shield layer 203 made of permalloy for the magnetoresistive type thin film magnetic head is formed on the insulating layer 202 with a thickness of about 2–3 $\mu$m, an alumina layer is formed on a whole surface with a thickness of about 4 $\mu$m, and then the bottom shield layer 203 is exposed by CMP. In the present specification, the insulating layer means a layer which has at least an electrically insulating property, and it may have or may not have a non-magnetic property. However, in general, a material such as alumina which has both the electrical insulating property and the non-magnetic property, and therefore the insulating layer is sometimes used to denote the non-magnetic layer.

Figure 26A:
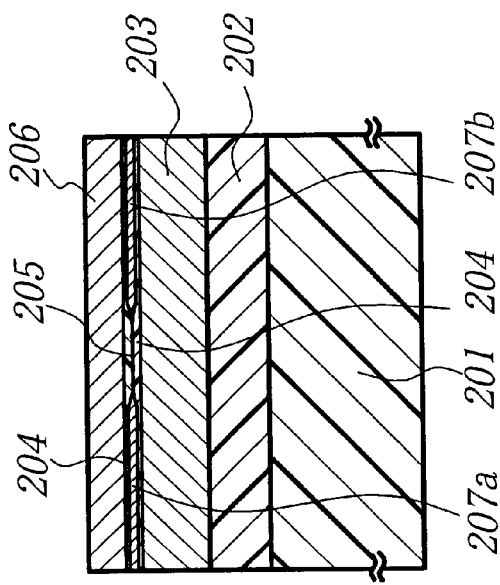
Figure 26B:
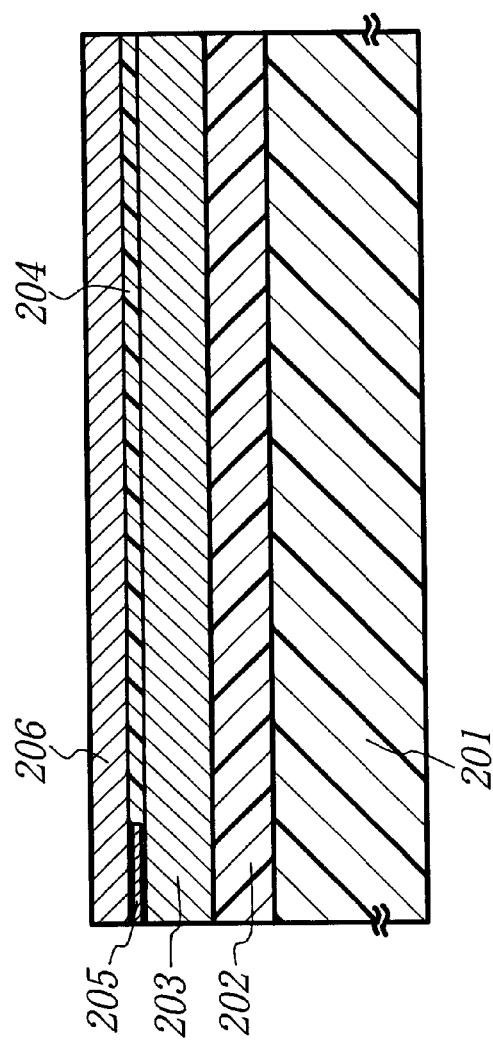

Next, as shown in FIG. 26, on the flat surface of the bottom shield layer 203 is formed a GMR layer 205 embedded in a shield gap layer 204 made of alumina, said flat surface of the bottom shield layer being coplanar with the flat surface of the insulating layer. Furthermore, on the shield gap layer 204 is formed a magnetic layer 206 made of permalloy with a thickness of 1–2 $\mu$m, said magnetic layer constituting a top shield for the GMR layer as well as the bottom pole for the inductive type thin film magnetic head. Here, said magnetic layer 206 is called the bottom pole. Upon forming the GMR layer 205, a pair of lead members 207a and 207b made of electrically conductive material for connecting the GMR layer to an external circuit are formed as depicted in FIG. 26B.

Next as illustrated in FIG. 27, a bottom pole chip 208 is formed on the bottom pole 206 with a thickness of about 2–4 μm in accordance with a given pattern. At the same time, there is formed an island-like coupling member 209 which constitutes a back gap situating at a position remote from the air bearing surface. Then, an insulating layer 400 made of alumina and having a thickness of 0.3–0.5 μm is formed on the bottom pole chip 208, the exposed surface of the bottom pole 206 and coupling member 209. Next, on this insulating layer 400, is formed a thin film coil 211 in accordance with a given pattern. The thin film coil may be formed by first forming a copper seed layer in accordance with the given pattern and then performing an electroplating with copper. However, according to the invention, the thin film coil may be formed by another method.

Upon manufacturing the thin film coil 211 in accordance with the given pattern, a conductive member 212 for connecting the innermost coil winding of the thin film coil 211 to the external circuit is formed with copper. A conductive member for connecting the outermost coil winding to the external circuit is also formed, but this conductive member is not shown in the drawing. Furthermore, during the formation of the thin film coil 211, a conductive layer constituting the twelve connecting conductors 121–128 and 131–134 of the first conductive pattern shown in FIG. 20 is formed in accordance with a given pattern. It should be noted that the contact pads 141–144 shown in FIG. 20 have not yet formed. In this manner, the connecting conductors are made of a same conductive material, in the present embodiment copper, as the thin film coil 211, and therefore resistance of the connecting conductors can be reduced. Moreover, a conductive layer is formed to be connected to end portions of a pair of the lead members 207a and 207b connected to both ends of the GMR layer 205.

Figure 28B:
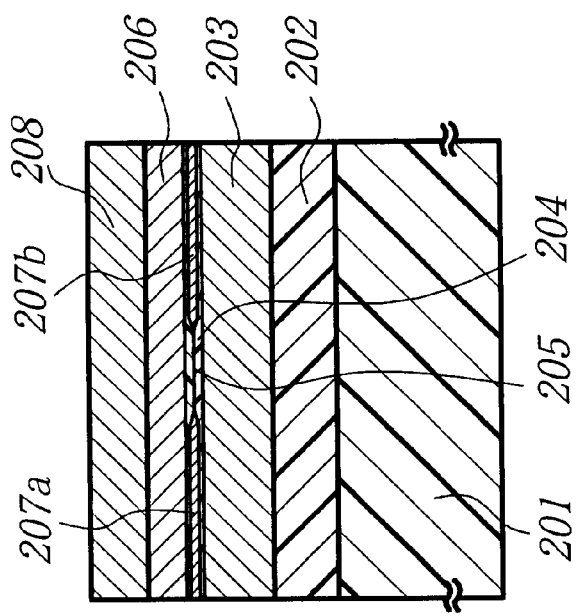
Figure 28A:
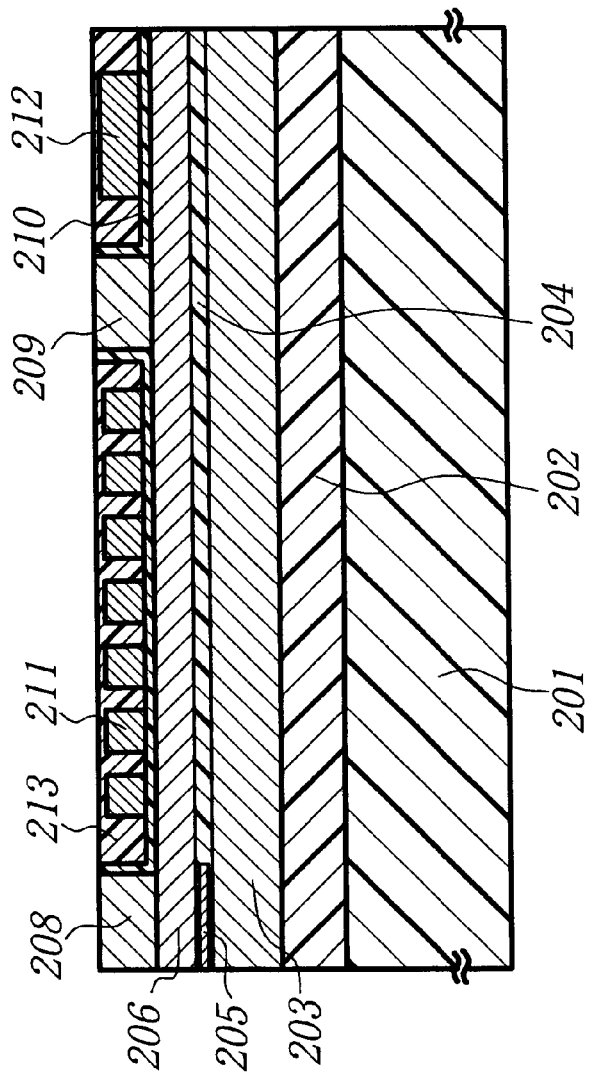

Next, as shown in FIG. 28, after forming an insulating layer 213 having a thickness of about 3–4 μm such that the thin film coil 211 and the conductive layer constituting the connecting conductors are covered with the insulating layer, the surface of the insulating layer 213 is flattened by CMP such that the bottom pole chip 208 is remained to have a thickness of about 1.5–2.5 μm. Then, as depicted in FIG. 29, a write gap layer 214 made of alumina is formed on the flattened surface with a thickness of about 0.2–0.25 μm.

As depicted in FIG. 29, after forming openings in the write gap layer 214 at positions corresponding to the coupling member 209 and conductive member 212, a top pole 215 is formed such that the bottom pole 206 and top pole 215 are magnetically coupled with each other by means of the coupling member 209 to form a closed magnetic loop including the write gap layer 214. During the formation of the top pole 215, a conductive member 216 is formed to be contacted with the conductive member 212. This conductive member 216 is also connected to one end of the connecting conductor 121 of the first conductive pattern shown in FIG. 20, and therefore the connecting conductor which connects the innermost coil winding of the thin film coil to the connecting conductor 121 is denoted by the same reference numeral as the coupling member 216. That is to say, by forming the top pole 215 after forming the opening in the write gap layer 214 and insulating layer 213 at a cross point between the conductive member 212 and the connecting conductor 121 of the first conductive pattern of the wiring pattern, the connecting conductor 216 connecting the conductive member 212 to the connecting conductor 121 is formed. Furthermore, during this process, there are formed openings in the insulating layer at positions corresponding to an end portion of the conductive layer constituting the connecting conductors 131–134 of the first conductive pattern shown in FIG. 20, and a conductive layer constituting the contact pads 141–144 illustrated in FIG. 20 is also formed.

As stated above, during the formation of the top pole 215, the conductive member 216 for connecting the thin film coil 211 to the first and second connecting conductors 121 and 122 and the first to fourth intermediate conductors 141–144 of the second conductive pattern shown in FIG. 20 are formed. Moreover, upon forming the intermediate conductors, there are formed openings in the insulating layer 213 and write gap layer 214 at positions corresponding to cross points at which the conductive coupling is to be performed, said cross points being determined in accordance with specifications of the thin film magnetic head to be manufactured. In this manner, in the present embodiment, plural kinds of photolithography masks for forming openings in the insulating layer 213 and write gap layer 124 upon forming the top pole 215 are prepared in accordance specifications of thin film magnetic heads and a mask corresponding to specifications of a thin film magnetic head to be manufactured is used to form openings at given positions. In this manner, electrically conductive coupling can be performed at given cross points corresponding to the desired specifications.

Figure 30:
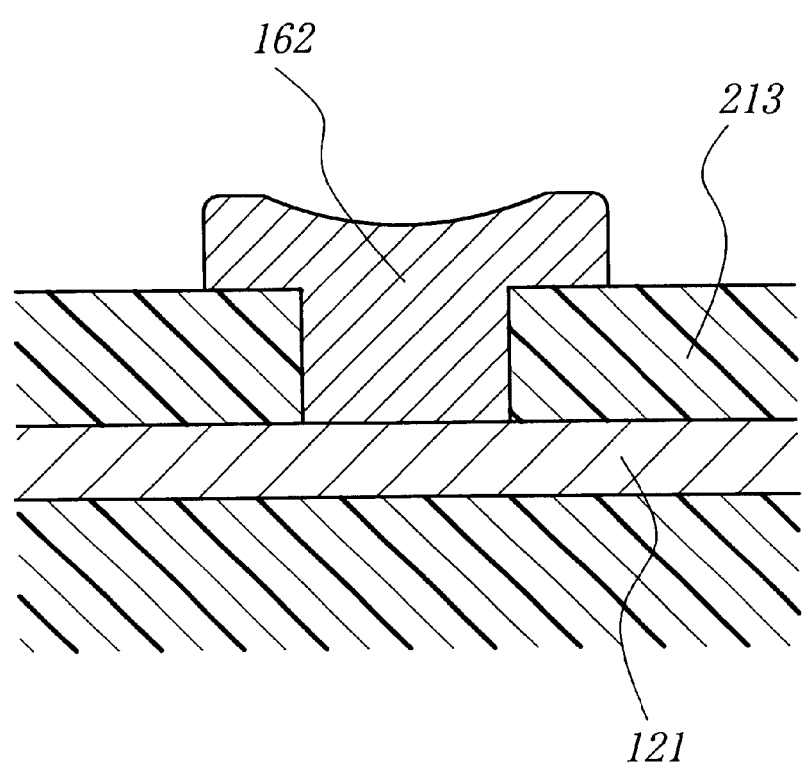
FIG. 30 is a cross sectional view showing the electrical connection at cross points.

As explained above, after forming the openings in the insulating layer 213 and write gap layer 214 at desired positions in accordance with given specifications of the thin film magnetic head, the top pole 215 is formed with a thickness of about 2.5–3.5 μm and the conductive layer constituting the first to fourth intermediate conductors 161–164 and the contact pads 141–144 are formed. Therefore, in the present embodiment, at the cross point between the first connecting conductor 121 of the first conductive pattern and the second intermediate conductor 162, as shown in FIG. 30, the conductive conductor 121 of the first conductive pattern made of copper constituting the thin film coil 211 is electrically connected to the intermediate conductor 162 of the second conductive pattern made of the electrically conductive magnetic material, e.g. permalloy. At cross points at which the electrically coupling should not be performed, the connecting conductors are isolated from the intermediate conductors by means of the insulating layer 213 and write gap layer 214.

Next, as illustrated in FIG. 31, portions of the write gap layer 214 and underlying bottom pole chip 208 are etched to form a trim structure, while the pole chip of the top pole 215 is as a mask. For instance, the write gap layer 2124 is selectively removed by the reactive ion etching using a freon gas or a chlorine gas, and then the exposed bottom pole chip 208 is partially etched by the ion beam etching to form the trim structure.

After forming the trim structure in the manner explained above, an overcoat layer 217 made of alumina is formed with a thickness of about 20–40 μm, and then a surface of the overcoat layer is flattened by CMP to expose the contact pads 141–144. The remaining manufacturing processes are same as those in the known method of manufacturing the thin film magnetic head. After dividing the wafer into bars each including a number of thin film magnetic beads, a side wall of a bar is polished to form the air bearing surfaces of these magnetic heads. Finally, the bar is divided into respective thin film magnetic heads.

As stated above, in the present embodiment, the connecting conductors 121–124 and 131–134 constituting the first conductive pattern of the wiring pattern illustrated in FIG. 20 are made of the same conductive material as that of the thin film coil 211 during the step of forming the thin film coil, and the first to fourth intermediate conductors 161–164 crossing the connecting conductors are made of the same conductive (magnetic) material as that of the top pole 215 during the step of forming the top pole, and furthermore the openings for performing the electrical coupling at cross points determined in accordance with given specifications of the thin film magnetic head to be manufactured are formed during the formation of the openings in the write gap layer 214 and insulating layer 213 for forming the back gap. Therefore, the manufacturing processes up to the formation of the openings are common to all thin film magnetic heads irrespective of particular specifications thereof, and the number of photomasks can be reduced as compared with a case in which thin film magnetic heads having different specifications are manufactured independently. Therefore, the manufacturing cost can be reduced and thin film magnetic heads having specifications required by users can be promptly supplied.

Figures 32A, 32B:
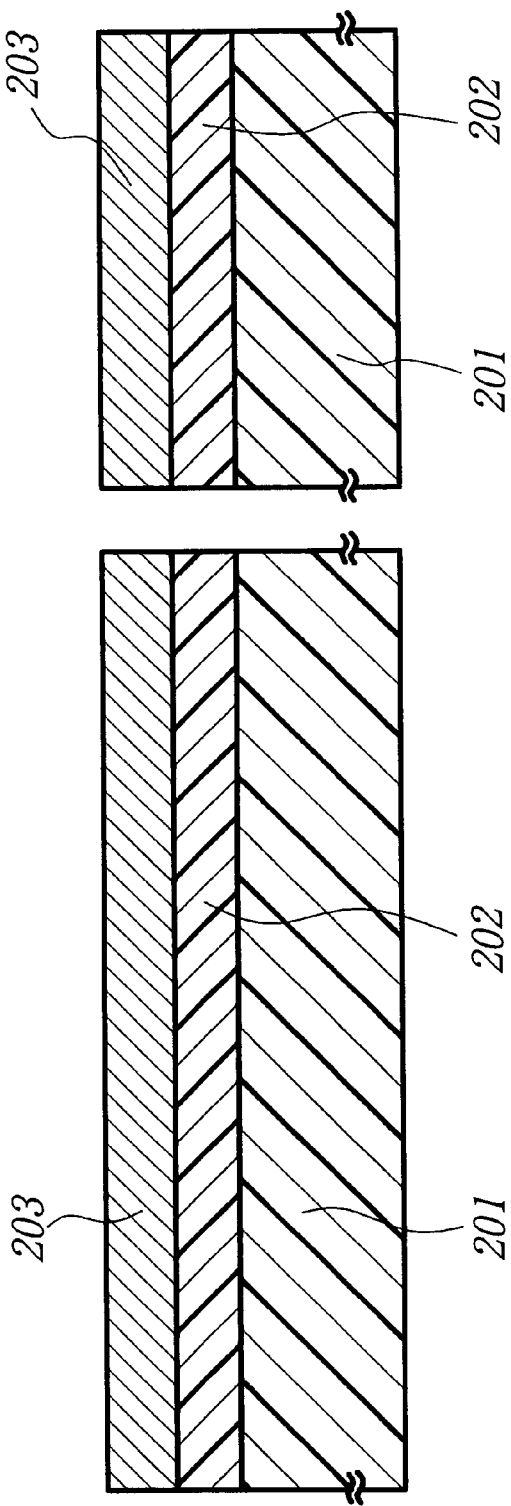
Figure 33A:
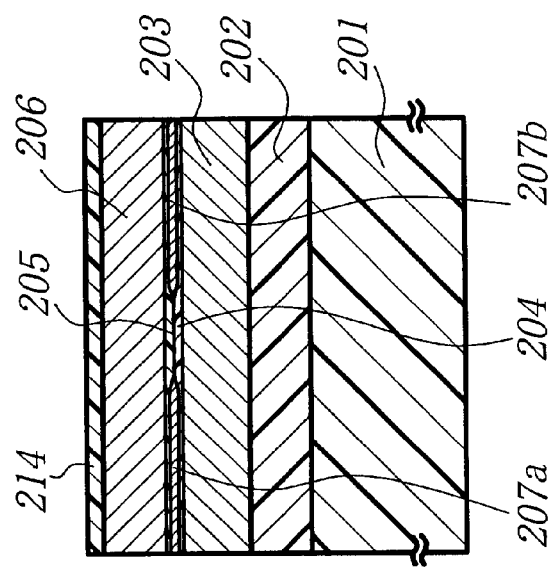
Figure 33B:
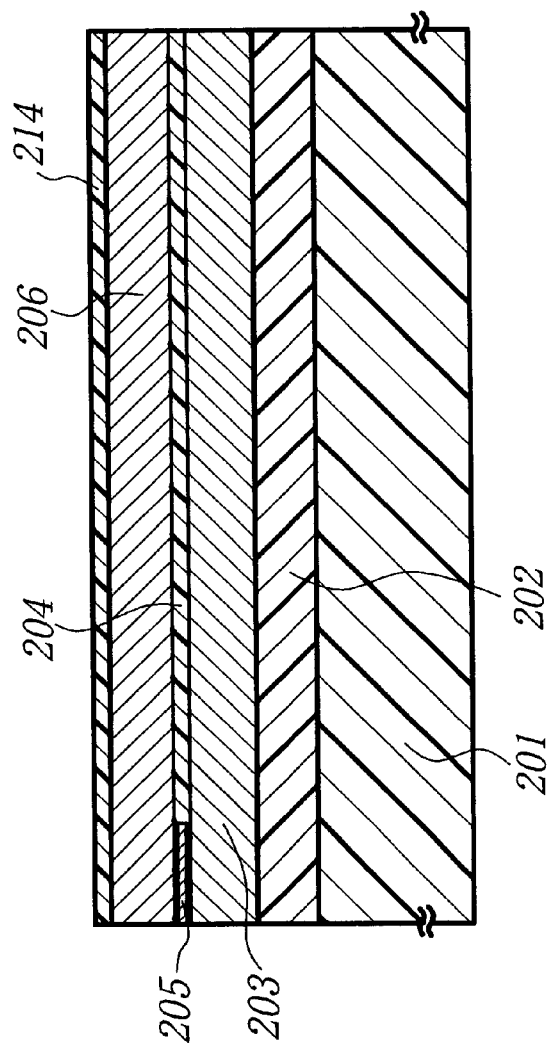

FIGS. 32–36 are cross sectional views showing successive steps of another method of manufacturing the embodiment of the thin film magnetic head illustrated in FIGS. 20 and 21. Portions similar to those of the previous embodiment are denoted by the same reference numerals arid their detailed explanation is dispensed with. Steps depicted in FIGS. 32 and 33 are substantially identical with those illustrated in FIGS. 25 and 25 in the previous embodiment, but in the present embodiment, the write gap layer 214 is formed on a flat surface of the bottom pole 206 as shown in FIG. 33.

Next, as depicted in FIG. 34, on the write gap layer 214, is formed a first top pole chip 231 with a thickness of about 2–4 μm, and at the same time a coupling member 232 is formed. Then, the write gap layer 214 is selectively remove and the underlying bottom pole 206 is etched over a depth of, e.g. 0.3–0.5 μm to form the trim structure, while the first top pole chip 231 is used as a mask. Next, by an electroplating of copper, a first layer thin film coil 233 is formed on the write gap layer 214. At the same time, a contact member 234 for connecting the first layer thin film coil to a second layer thin film coil to be manufactured later and the connecting conductors 121–124 and 131–134 (shown in FIG. 20) constituting the first conductive pattern of the wiring pattern are formed.

Figures 35A, 35B:
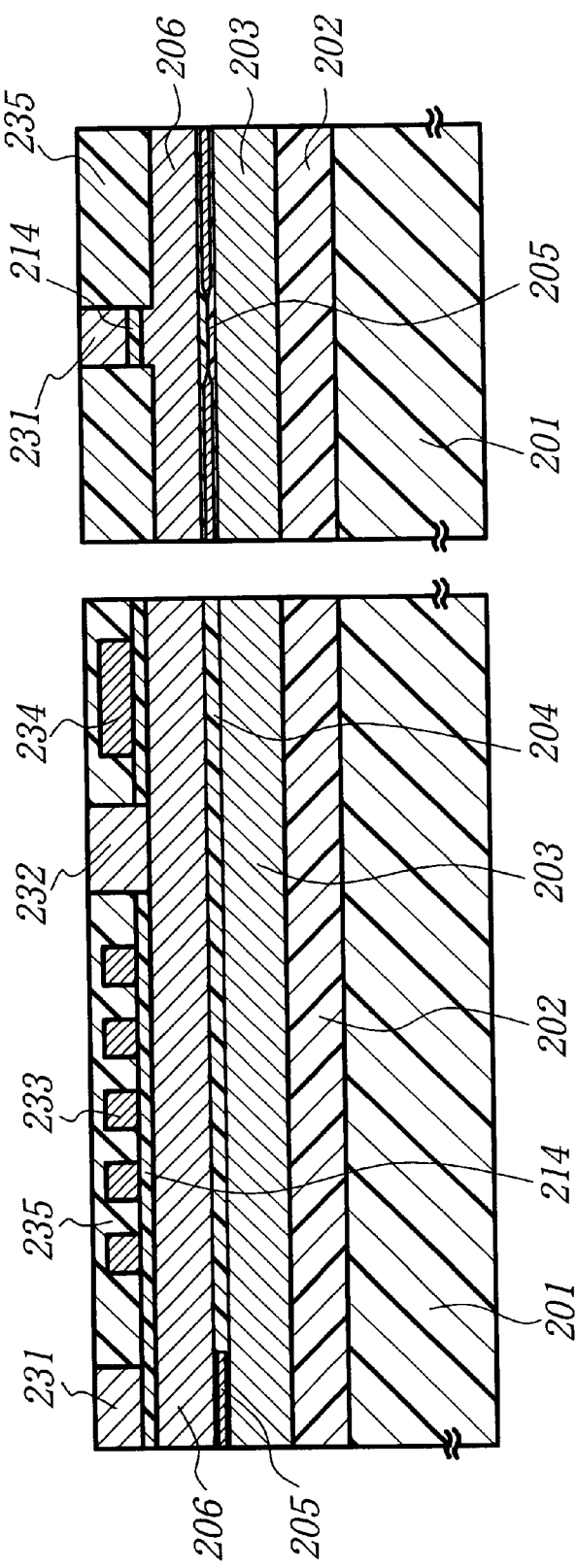

After forming the first layer thin film coil 233 on the write gap layer 214 in the manner explained above, an inorganic insulating layer 235 made of alumina, silicon oxide or silicon nitride is formed with a thickness of about 5–7 μm, and its surface is flattened by CMP to expose the first top pole chip 231 as shown in FIG. 35.

Furthermore, as illustrated in FIG. 36, on the flattened surface are formed a second top pole chip 236 and a coupling member 237 such that the second top pole chip is coupled with the first top pole chip 231 and the coupling member 237 is coupled with the coupling member 232. The coupling portion of these coupling members 232 and 237 is called the back gap. Furthermore, on the surface of the insulating layer 235 is formed a second layer thin film coil 239 by the electroplating of copper such that the thin film coil is supported by an insulating layer 238 made of photoresist.

During the formation of the second layer thin film coil 239, a contact member 240 is formed to be brought into contact with the contact member 234. In the present embodiment, the intermediate conductors 161–164 of the second conductive pattern of the wiring pattern are formed during the formation of the second layer thin film coil 239 and contact member 240. Prior to the formation of the second conductive pattern, the opening for forming the back gap is formed in the insulating layer 238 and openings for connecting given lower wiring pattern are formed in the insulating layer 238 in accordance with given specifications of the thin film magnetic head to be manufactured. That is to say, by suitably selecting a photomask for forming the openings, desired specifications can be satisfied.

In this manner, plural kinds of photomasks which are inherently required for forming the opening in the insulating layer 238 in order to manufacture the back gap are prepared in accordance with specifications of plural kinds of thin film magnetic heads, and prior to the formation of the second layer thin film coil 239, a photomask having desired pattern corresponding to specifications of a thin film magnetic head to be manufactured is selected, and openings extending to the first conductive pattern are formed at given positions. Then, the second layer thin film coil 239 as well as the second conductive pattern of the wiring pattern are formed simultaneously. In this manner, the first and second conductive patterns of the wiring pattern can be electrically coupled with each other at desired cross points. Therefore, as compared with the case in which respective thin film magnetic heads of different specifications are manufactured separately, the number of required photomasks can be reduced and the manufacturing cost can be decreased. Furthermore, in the present embodiment, the first conductive pattern is formed during the manufacturing process of forming the first layer thin film coil with copper and the second conductive pattern is formed during the process of manufacturing the second layer thin film coil with copper. Therefore, resistance of the wiring pattern can be decreased.

Next, as illustrated in FIG. 36, the top pole 215 is formed such that it is coupled with the second top pole chip 236 and coupling member 237, and after forming the overcoat layer 217, its surface is polished by CMP to expose the contact pads 141–144 like as the previous embodiment.

Figure 37:
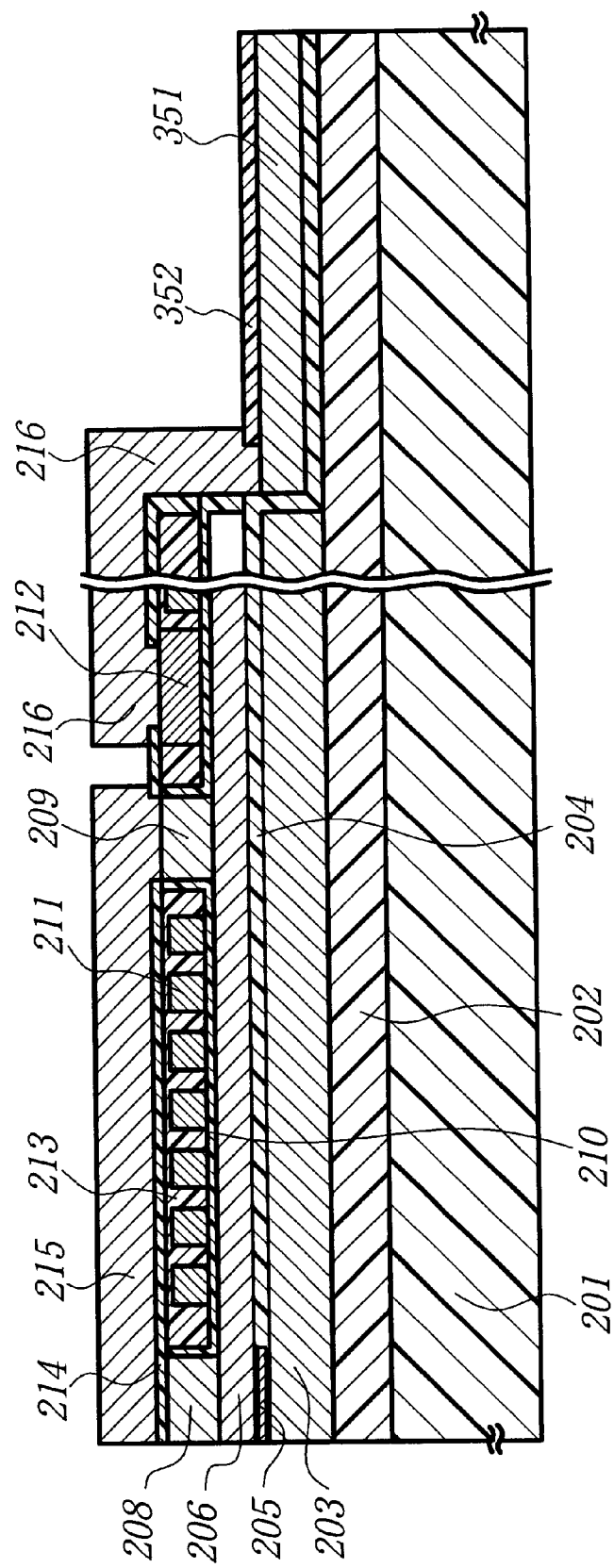
FIGS. 37 and 38 are cross sectional views representing successive steps of another embodiment of the method of manufacturing the first embodiment of the thin film magnetic head according to the invention.
Figure 38:
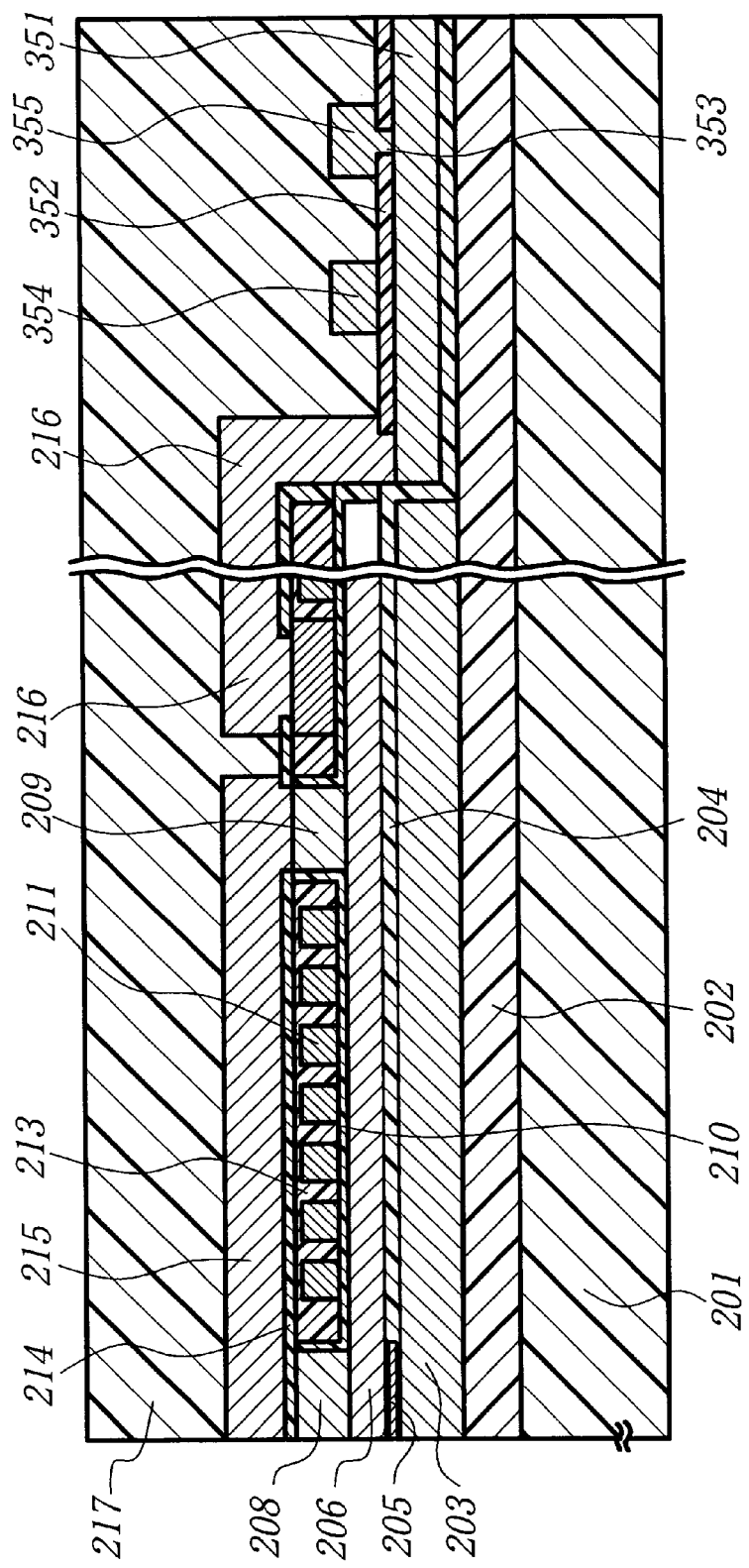

FIGS. 37 and 38 show successive steps of another embodiment of the method of manufacturing the thin film magnetic head according to the invention. In the present embodiment, there are formed and stocked thin film magnetic head intermediate units, in each of which almost all parts of the magnetoresistive type and inductive type thin film magnetic head elements have been previously manufactured irrespective of specifications of thin film magnetic heads, and both ends of the GMR element of the magnetoresistive type thin film magnetic head element and both ends of a thin film coil of the inductive type thin film magnetic head element are connected to desired contact pads in accordance with specifications of a thin film magnetic head to be manufactured.

As illustrated in FIG. 37, the magnetoresistive type thin film magnetic head element including the GMR element 205 and the inductive type thin film magnetic head element including the thin film coil 211, write gap layer 214 and top pole 215 have been previously manufactured. In this case, during the formation of the thin film coil 211, the conductive member 212 for connecting the innermost coil winding of the thin film coil to a contact pad are formed together with a conductive member 351 corresponding to the connecting conductor 121 of the first conductive pattern of the wiring pattern shown in FIG. 20. In addition to this conductive member 351, there are formed three connecting conductors in parallel with the conductive member 351, and these connecting conductors are connected to the outermost coil winding of the thin film coil and both ends of the GMR film, respectively.

The above mentioned conductive member 351 is electrically connected to the conductive member 212 by means of the conductive member 216 which is formed together with the top pole 215. Furthermore, the conductive member 351 is covered with an insulating layer 352. This insulating layer 352 may be made of the same material as the insulating layer 213 during the same manufacturing process, said insulating layer 213 supporting the thin film coil 211 in an isolated manner. As shown in FIG. 37, since the bottom shield layer 203 and bottom pole 206 are extended beyond the thin film coil 211 viewed from the air bearing surface, the conductive member 351 is formed at a lower portion of a step.

Next, as depicted in FIG. 38, openings 353 are formed in the insulating layer 352 at positions corresponding to desired specifications of a thin film magnetic head to be manufactured, and then the intermediate conductors 161–164 constituting the second conductive pattern are formed. IN FIG. 37, only two conductive members 354 and 355 corresponding to the first and second intermediate conductors 161 and 162 are shown among the four conductive members and the remaining intermediate conductors are not shown in the drawing for the sake of clarity. During this process, the contact pads 141–144 are formed to be connected to the connecting conductors 131–134 of the first conductive pattern.

As explained above, since the openings are formed in the insulating layer 352, the intermediate conductor 162 (conductive member 356) is electrically connected to the connecting conductor 121 (conductive member 351). However, the conductive member 354 is isolated from the conductive member 351 by means of the insulating layer 352. Therefore, in the present embodiment, it is possible to manufacture combination type thin film magnetic heads having different specifications by preparing plural kinds of photomasks in accordance of specifications of thin film magnetic heads. Particularly, in the present embodiment, thin film magnetic head intermediate units, in which almost all parts of the magnetoresistive type and inductive type thin film magnetic head elements have been previously formed, are prepared and stocked, thin film magnetic heads having specifications required by users can be supplied particularly in a prompt manner.

As shown in FIG. 38, an insulating layer is deposited on a whole surface and its surface is flattened by CMP to form the overcoat layer 217. Although not shown in the drawing, by polishing the overcoat layer, the contact pads are exposed.

Figure 39:
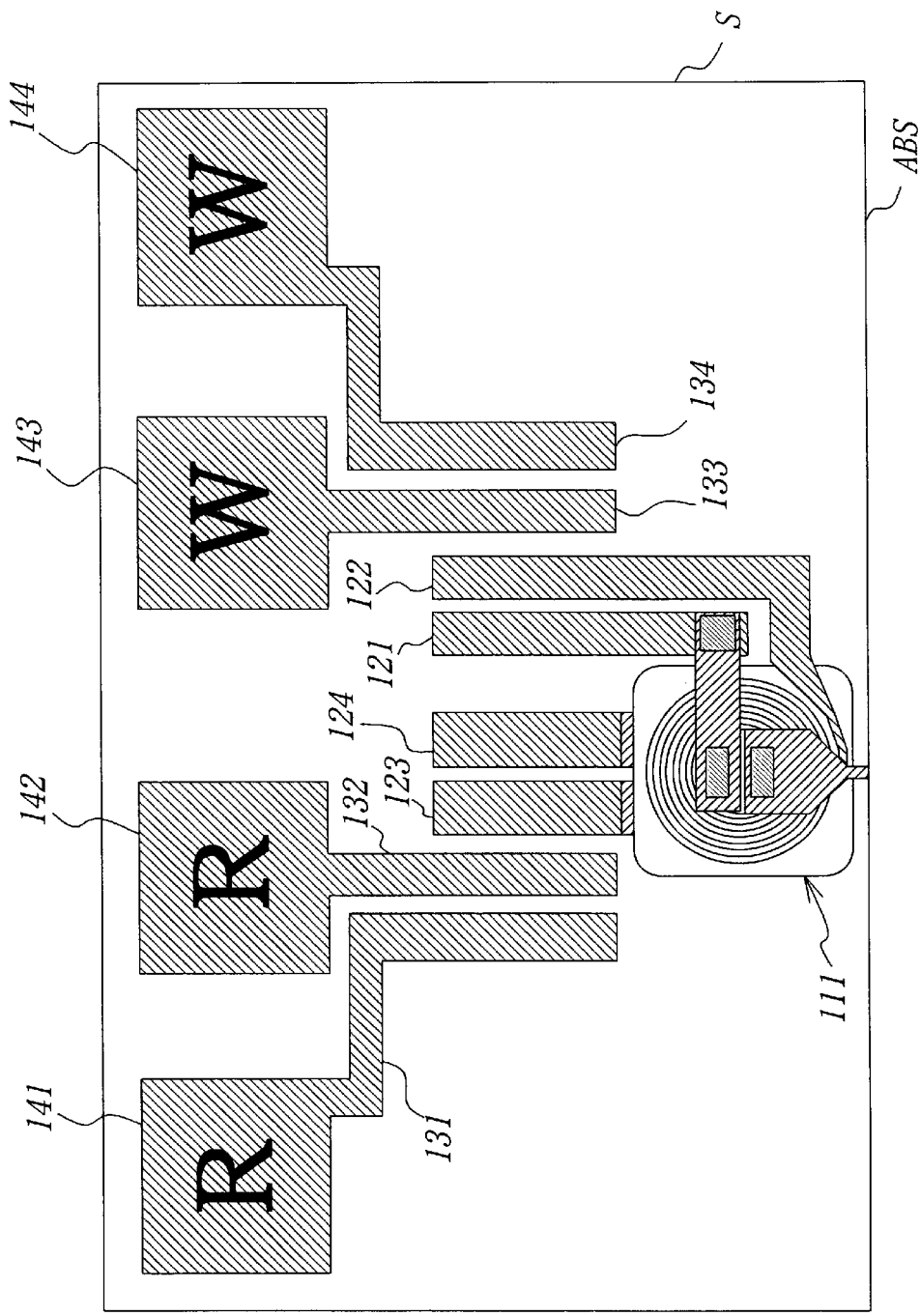
FIGS. 39 and 40 are cross sectional views illustrating successive steps of the method of manufacturing a sixth embodiment of the center element- and up-type thin film magnetic head according to the invention.
Figure 40:
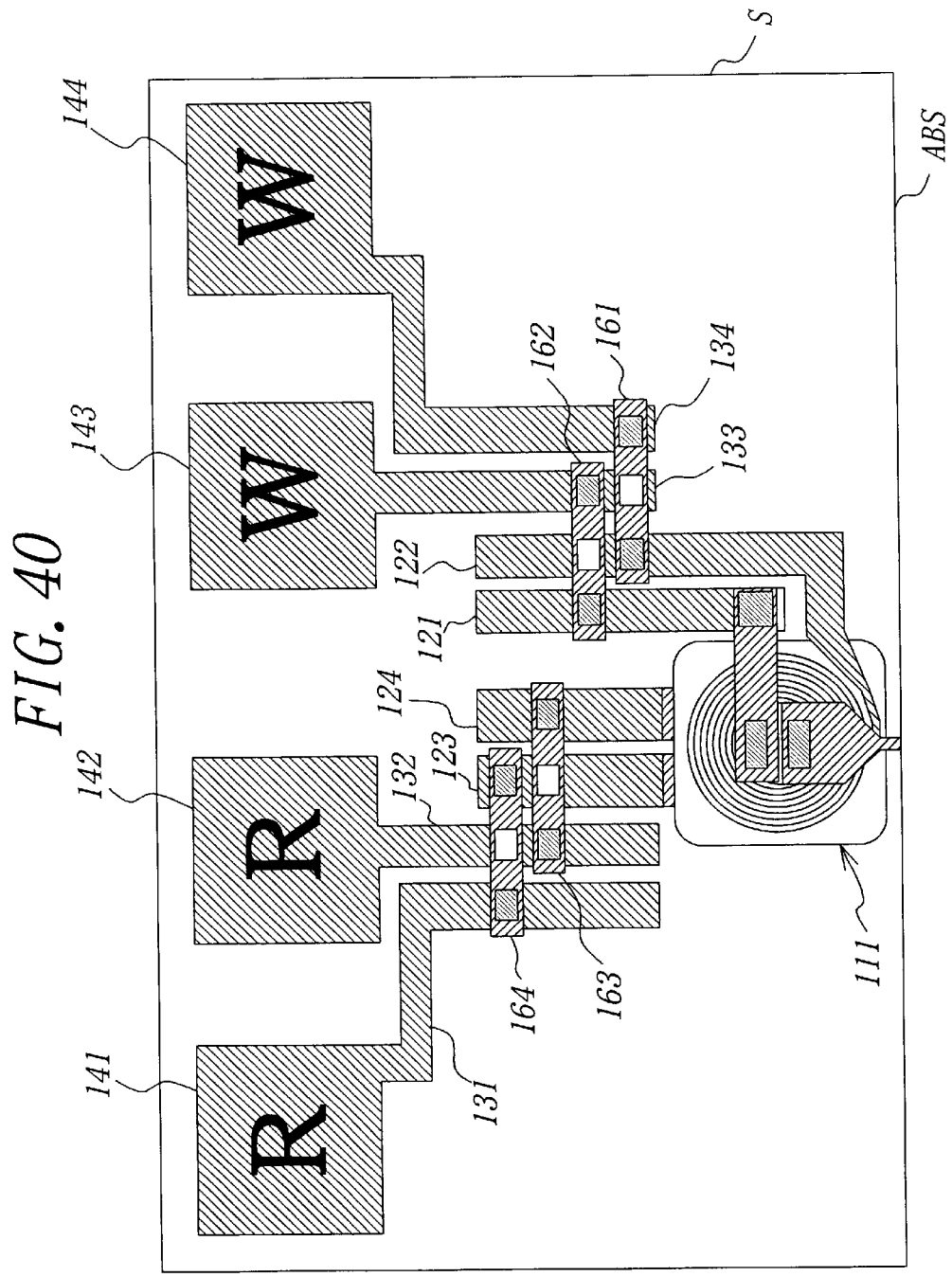

FIGS. 39 and 40 represent successive steps of another embodiment of the method of manufacturing the thin film magnetic head according to the invention. In the above explained embodiments, all connecting conductors and intermediate conductors which are required to manufacture all specifications required by all kinds of thin film magnetic heads are formed, but in the present embodiment, if the wiring pattern is formed by two level layers, the first layer connecting conductors are all formed, but only necessary connecting conductors or intermediate conductors are formed. Since the present embodiment has a similar structure as that shown in FIG. 20, portions similar to those shown in FIG. 20 are denoted by the same reference numerals used in FIG. 20.

As depicted in FIG. 39, upon forming the inductive type and magnetoresistive type thin film magnetic head elements, the four connecting conductors 121–124 of the first conductive pattern connected to the thin film coil and GMR film as well as the four connecting conductors 131–134 to be connected to the contact pads 141–144 are formed to be in parallel with each other. These eight connecting conductors may be formed simultaneously with the bottom pole or thin film coil of the inductive type thin film magnetic head. Next after forming an insulating layer such that the above mentioned connecting conductors 121–124 and 131–134 are covered with the insulating layer (the insulating layer of the write gap layer and/or insulating layer supporting the thin film coil), intermediate conductors are formed in accordance with specifications of a thin film magnetic head to be manufactured. In the present embodiment, intermediate conductors are formed such that each of the intermediate conductors extends between two cross points at which the electrical coupling has to be formed. That is to say, as illustrated in FIG. 40, a first intermediate conductor 161 is formed to extend from the connecting conductor 122 to the connecting conductor 134 of the first conductive pattern, and the remaining intermediate conductors are formed in a similar manner. It should be noted that both ends of an intermediate conductor is electrically coupled with an underlying connecting conductor. In order to perform such an electrical coupling, it is necessary to form openings in the insulating layer as explained above, but these openings can be formed during the process of manufacturing the opening for the back gap. Furthermore, during the process of manufacturing the intermediate conductors 161–164, the contact pads 141–144 are formed to be connected to the connecting conductors 131–134 of the first conductive pattern, but coupling portions are not shown in the drawing.

Figure 41:
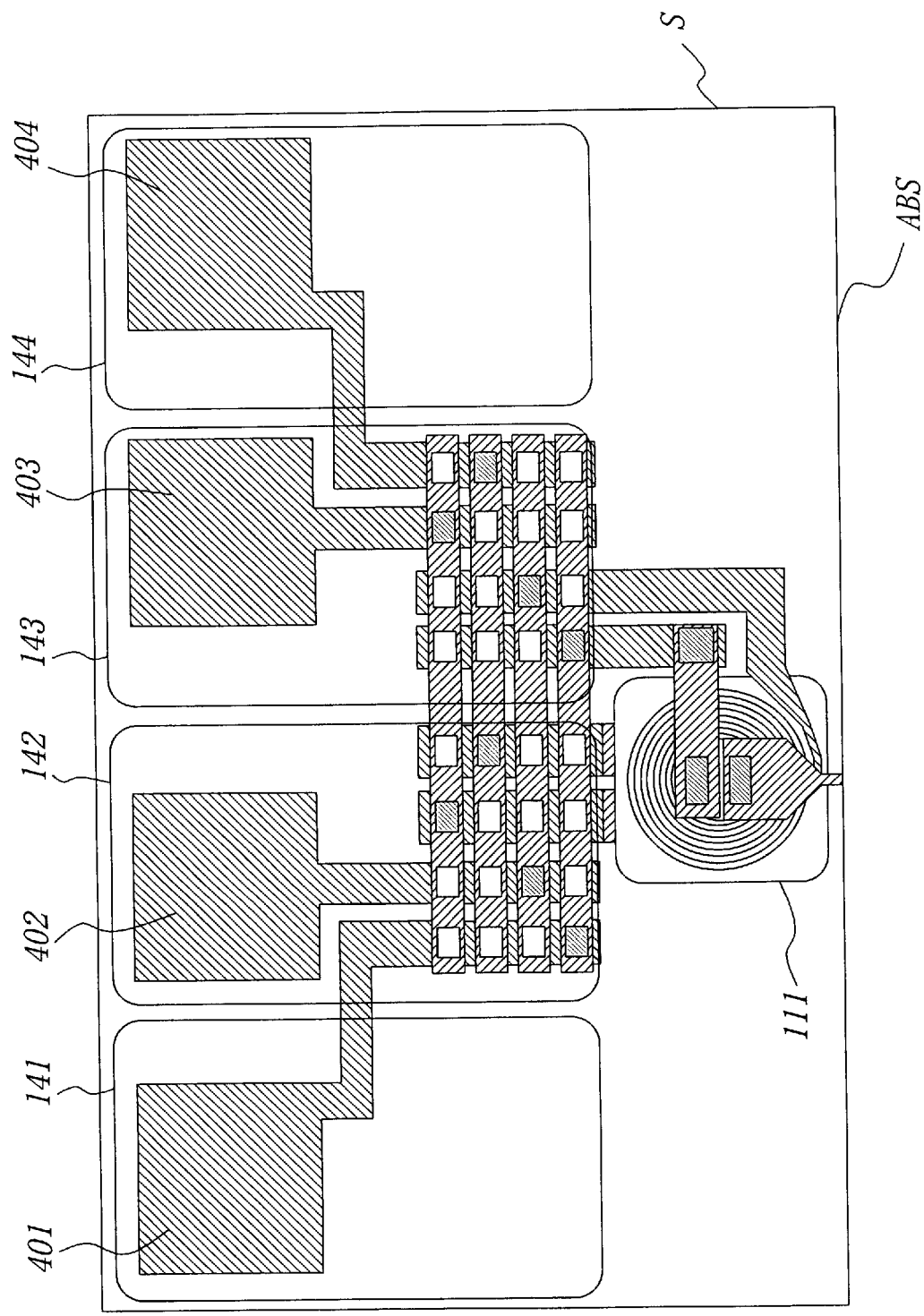
FIG. 41 is an end view showing the connection of contact pads of a seventh embodiment of the center element- and up-type thin film magnetic head.

FIG. 41 shows another embodiment of the thin film magnetic head according to the invention. In accordance with a reduction in size of the thin film magnetic head, a surface area of the slider on which the contact pads are formed becomes smaller, but there is a limitation for reducing a surface area of a contact pad. In the present embodiment, the contact pads 141–144 have not been formed previously, but are formed after forming the desired wiring pattern and forming the insulating layer on the wiring pattern such that each contact pad has a large surface area to extend over the wiring pattern. It should be noted that these contact pads 141–144 are formed to be electrically connected to underlying conductive layers 401–404, respectively.

Figure 42:
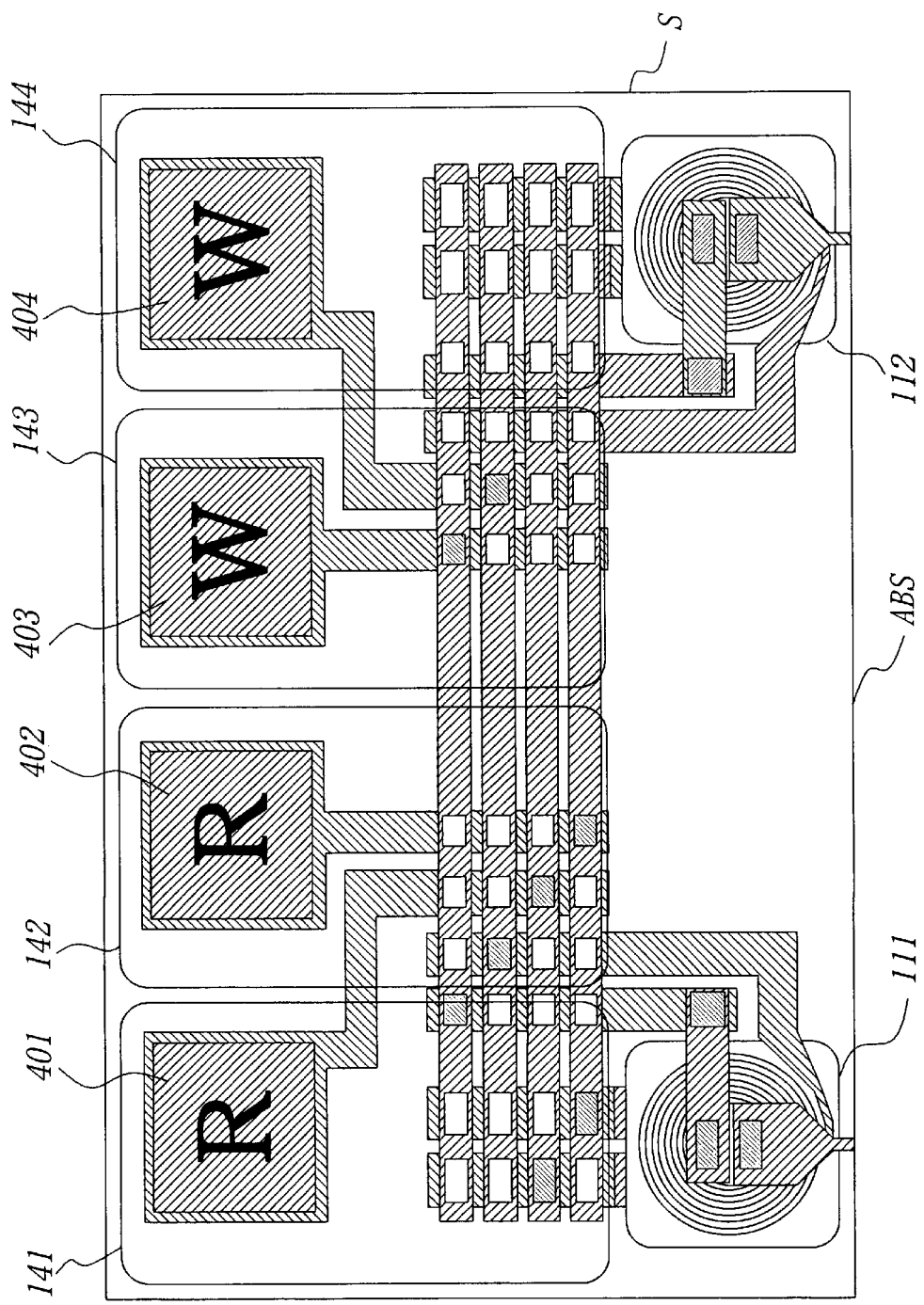
FIG. 42 is an end view depicting the connection of contact pads of an eighth embodiment of the thin film magnetic head of side element- and up-type according to the invention.

FIG. 42 shows still another embodiment of the thin film magnetic head according to the invention, which corresponds to the embodiment shown in FIG. 22. Also in the present embodiment, after forming the wiring pattern, the contact pads 141–144 are formed over the wiring pattern to have a large surface area. These contact pads 141–144 are electrically connected to underlying conductive layers 401–404, respectively.

Figure 43:
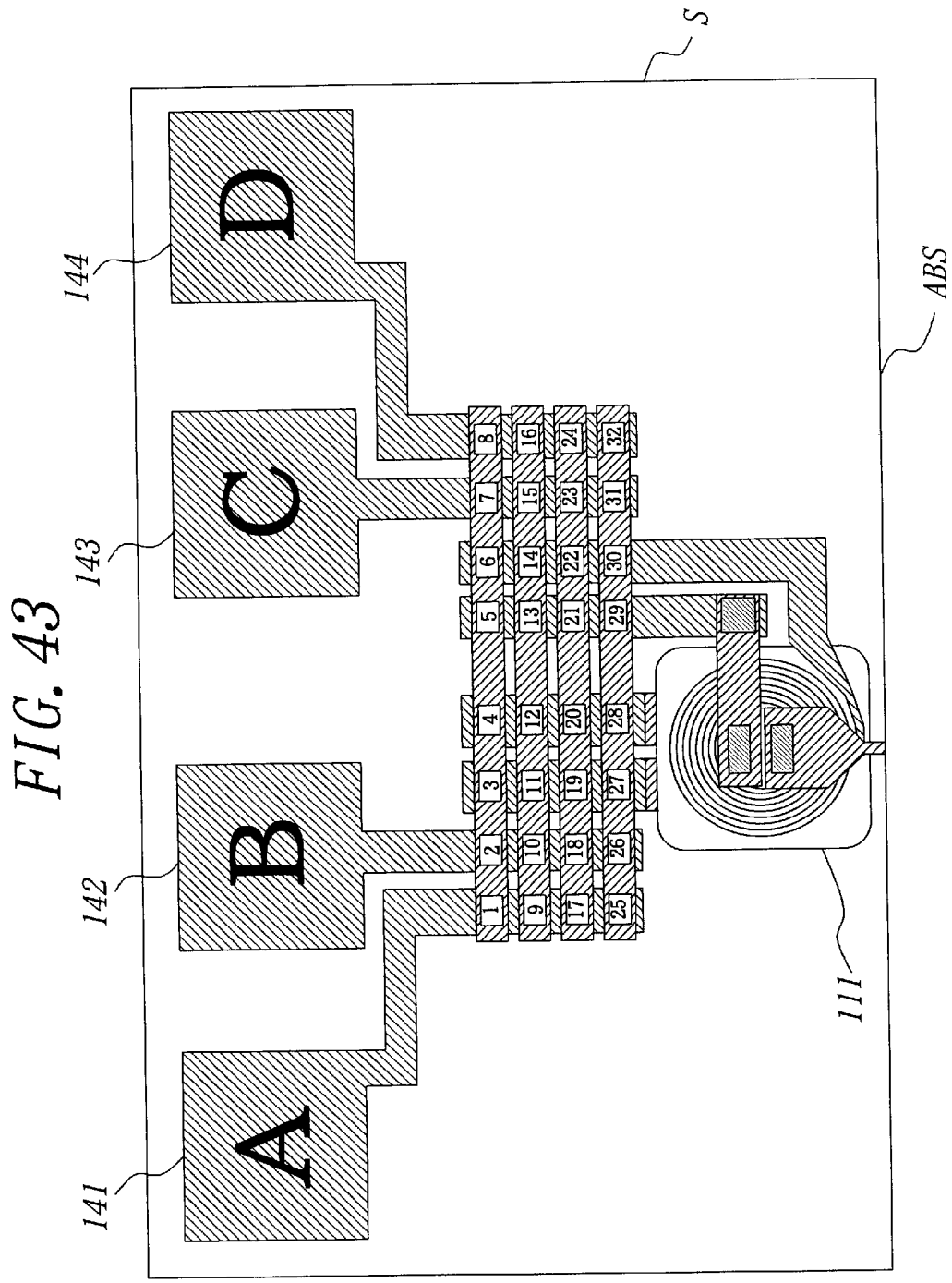
FIG. 43 is an end view representing all possible connections in a ninth embodiment of the thin film magnetic head having a thin film magnetic head element at a center according to the invention.

FIG. 43 shows an embodiment of the thin film magnetic head used as the inductive type thin film magnetic head of center element type, and has the same principal structure as that shown in FIGS. 20 and 21. However, in the present embodiment, in order to explain all possible connection modes for all possible specifications, the contact pads 141–144 are denoted by A–D, respectively and all cross points are denoted by 1–32. The connection modes of this embodiment is shown in the following table 3.

TABLE 3

| Type | | Pad 141 | | 142 | | 143 | | 144 | |
|---|---|---|---|---|---|---|---|---|---|
| Up | normal | 1 | 3 | 10 | 12 | 21 | 23 | 30 | 32 |
| | | 9 | 11 | 2 | 4 | 29 | 31 | 22 | 24 |
| | | 17 | 19 | 26 | 28 | 5 | 7 | 14 | 16 |
| | | 25 | 27 | 18 | 20 | 13 | 15 | 6 | 8 |
| | cross | 1 | 3 | 10 | 12 | 22 | 23 | 29 | 32 |
| | | 9 | 11 | 2 | 4 | 30 | 31 | 21 | 24 |
| | | 17 | 19 | 26 | 28 | 6 | 7 | 13 | 16 |
| | | 25 | 27 | 18 | 20 | 14 | 15 | 5 | 8 |
| Down | normal | 1 | 6 | 10 | 13 | 23 | 19 | 32 | 28 |
| | | 9 | 14 | 18 | 21 | 31 | 27 | 8 | 4 |
| | | 17 | 22 | 26 | 29 | 7 | 3 | 16 | 12 |
| | | 25 | 30 | 2 | 5 | 15 | 11 | 24 | 20 |
| | cross | 10 | 13 | 1 | 6 | 23 | 19 | 32 | 28 |
| | | 18 | 21 | 9 | 14 | 31 | 27 | 8 | 4 |
| | | 26 | 29 | 17 | 22 | 7 | 3 | 16 | 12 |
| | | 2 | 5 | 25 | 30 | 15 | 11 | 24 | 20 |

In the present embodiment, structures having desired specifications can be realized by the combinations denoted in the above table 3. In this table 3, the contact pads A and B are connected to both ends of the magnetoresistive element, and the contact pads C and D are connected to both ends of the thin film coil of the inductive type thin film magnetic head element. As stated above, in the "normal type" of the connection mode of the thin film coil, the innermost coil winding is connected to the contact pad C and the outermost coil winding is connected to the contact pad D. In the "cross-type", the connection is reversed.

For instance, in case of a center element type thin film magnetic head of up-type, each of the normal-type and cross-type has four connection modes, and any one of these connection modes may be selected at will. In the center element type thin film magnetic head of down-type, each of the normal-type and cross-type includes four connection modes.

Figure 24:
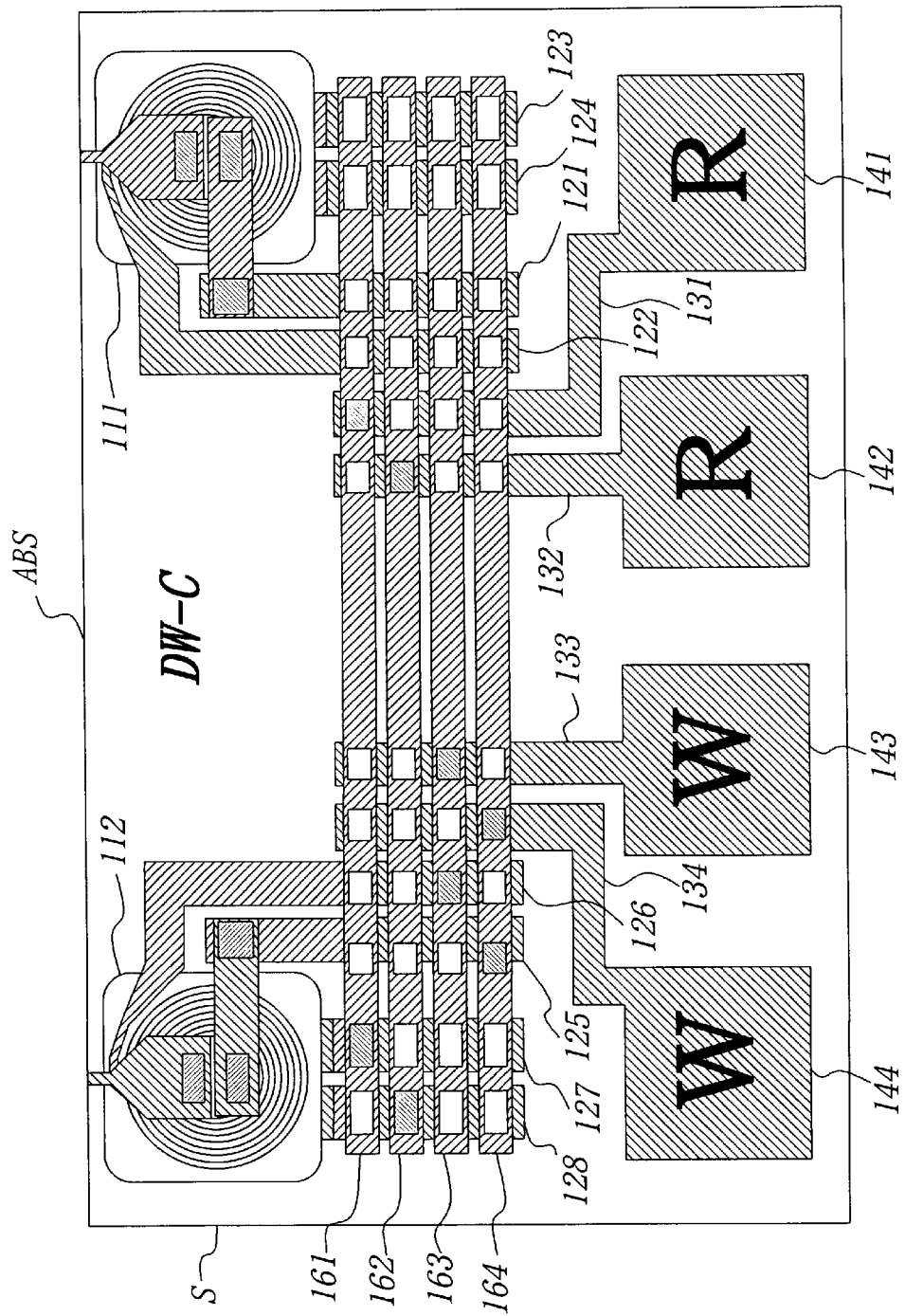
FIG. 24 is an end view showing the connection of contact pads of a fifth embodiment of the thin film magnetic head of side element- and down-type according to the invention.
Figure 44:
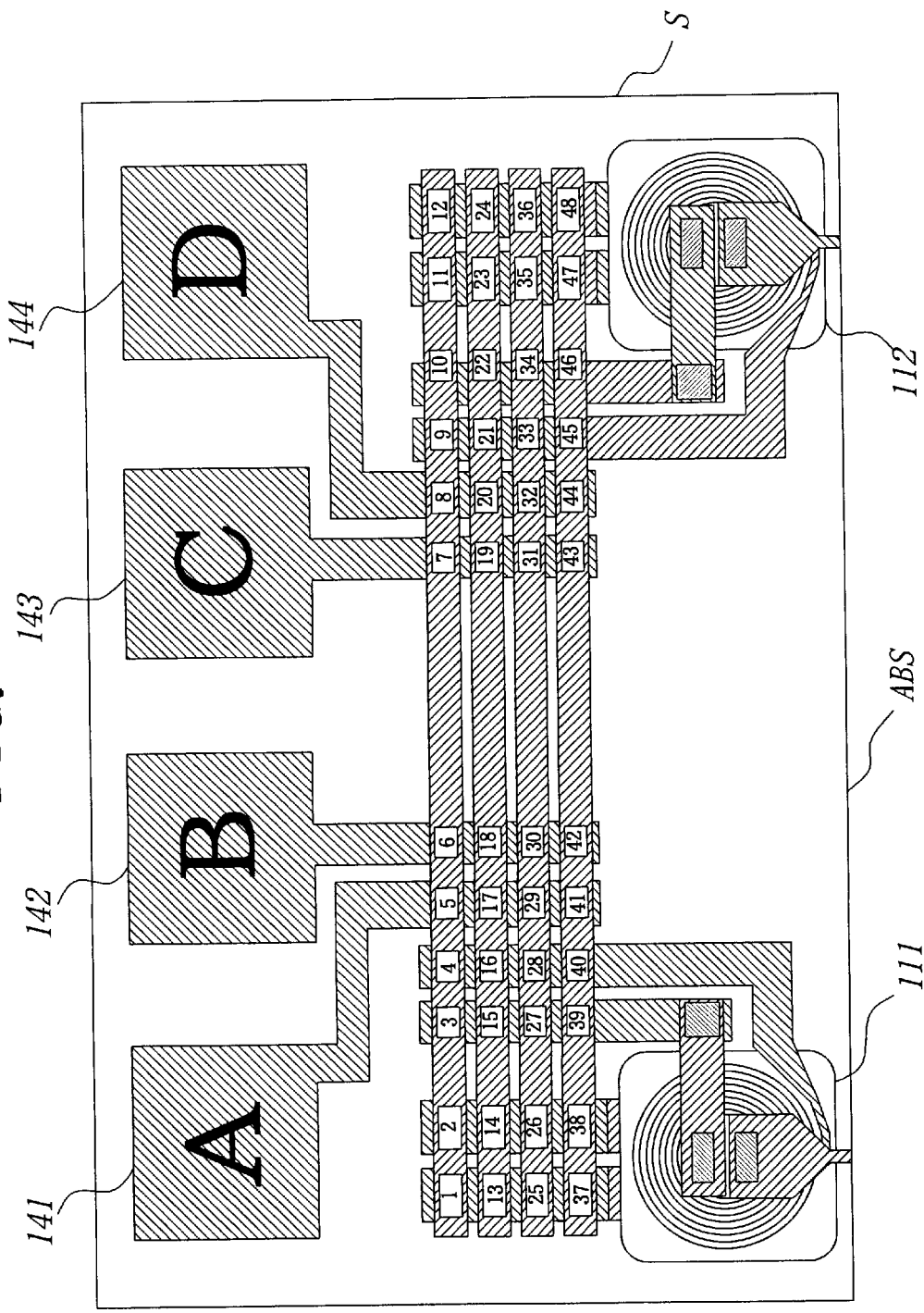
FIG. 44 is an end view for explaining all possible connections in a tenth embodiment of the thin film magnetic head having thin film magnetic head elements at both ends according to the invention.

FIG. 44 shows an inductive type thin film magnetic head of side element type according to the invention, and this magnetic head corresponds to the embodiment shown in FIGS. 22–24. The connection modes of the present embodiment is shown in a table 4. Also in this case, each of the normal-type and cross-type thin film magnetic heads of up-type has four connection modes, and each of the normal-type and cross-type thin film magnetic heads of down-type has also four connection modes.

TABLE 4

| Type | | Pad 141 | | 142 | | 143 | | 144 | |
|---|---|---|---|---|---|---|---|---|---|
| Up | normal | 1 | 5 | 14 | 18 | 27 | 31 | 40 | 44 |
| | | 13 | 17 | 2 | 6 | 39 | 43 | 28 | 32 |
| | | 25 | 29 | 38 | 42 | 3 | 7 | 16 | 20 |
| | | 37 | 41 | 26 | 30 | 15 | 19 | 4 | 8 |
| | cross | 1 | 5 | 14 | 18 | 27 | 32 | 40 | 44 |
| | | 13 | 17 | 2 | 6 | 39 | 44 | 28 | 31 |
| | | 25 | 29 | 38 | 42 | 3 | 8 | 16 | 19 |
| | | 37 | 41 | 26 | 30 | 15 | 20 | 4 | 7 |
| Down | normal | 5 | 9 | 18 | 22 | 31 | 35 | 44 | 48 |
| | | 17 | 21 | 30 | 34 | 43 | 47 | 8 | 12 |
| | | 29 | 33 | 42 | 46 | 7 | 11 | 20 | 24 |
| | | 41 | 45 | 6 | 10 | 19 | 23 | 32 | 36 |
| | cross | 5 | 10 | 18 | 21 | 31 | 35 | 44 | 48 |

TABLE 4-continued

| Type | | Pad 141 | | 142 | | 143 | | 144 | |
|---|---|---|---|---|---|---|---|---|---|
| | | 17 | 22 | 30 | 33 | 43 | 47 | 8 | 12 |
| | | 29 | 34 | 42 | 45 | 7 | 11 | 20 | 24 |
| | | 41 | 46 | 6 | 9 | 19 | 23 | 32 | 36 |

Figure 45:
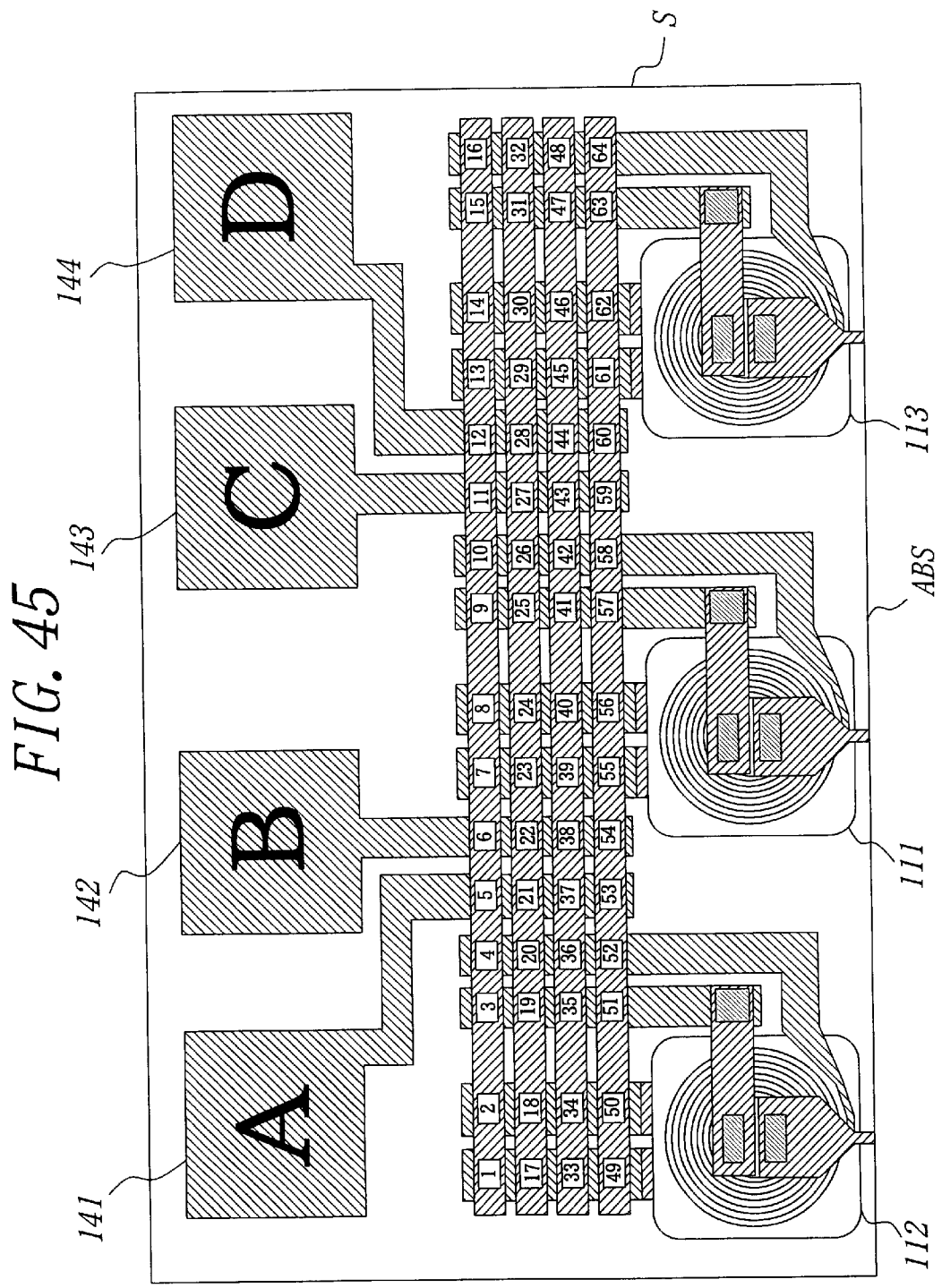
FIG. 45 is an end view for showing all possible connections in an eleventh embodiment of the thin film magnetic head having thin film magnetic head elements at a center as well as at both ends according to the invention.

FIG. 45 shows still another embodiment of the thin film magnetic head according to the invention. In the present embodiment, an inductive type thin film magnetic head element 111 of center element type is arranged at a center, and a pair of inductive type thin film magnetic head elements 112 and 113 of side element type are arranged on both sides of the center element symmetrically. Therefore, the thin film magnetic head of the present embodiment may be applied to all kinds of thin film magnetic heads, i.e. center element type heads of up-type and down-type and side element type heads of up-type and down-type. The connection modes of this embodiment is shown in a table 5. This table 5 may be interpreted in the same manner as that shown in the tables 3 and 4, and thus its detailed explanation is dispensed with. For instance, if a center element- and normal-type thin film magnetic head of up-type is to be manufactured, connecting conductors and intermediate conductors may be electrically connected to each other at cross points 5, 7, 9, 11, 22, 24, 26 and 28. Furthermore, if a side element- and cross-type thin film magnetic head of down-type is to be manufactured, the electrically conductive coupling may be performed at cross points 6, 15, 21, 32, 43, 45, 60 and 62.

TABLE 5

| | Type | | Pad 141 | | 142 | | 143 | | 144 | |
|---|---|---|---|---|---|---|---|---|---|---|
| Center element | up | normal | 5 | 7 | 22 | 24 | 43 | 41 | 60 | 58 |
| | | | 21 | 23 | 6 | 8 | 59 | 57 | 44 | 42 |
| | | | 37 | 39 | 54 | 56 | 11 | 9 | 28 | 26 |
| | | | 53 | 55 | 38 | 40 | 27 | 25 | 12 | 10 |
| | | cross | 5 | 7 | 22 | 24 | 43 | 42 | 60 | 57 |
| | | | 21 | 23 | 6 | 8 | 59 | 58 | 44 | 41 |
| | | | 37 | 39 | 54 | 56 | 11 | 10 | 28 | 25 |
| | | | 53 | 55 | 38 | 40 | 27 | 26 | 12 | 9 |
| | down | normal | 5 | 10 | 54 | 57 | 39 | 43 | 28 | 24 |
| | | | 21 | 26 | 6 | 9 | 55 | 59 | 44 | 40 |
| | | | 37 | 42 | 22 | 25 | 11 | 7 | 60 | 56 |
| | | | 53 | 58 | 38 | 41 | 23 | 27 | 12 | 8 |
| | | cross | 5 | 9 | 54 | 58 | 39 | 43 | 28 | 24 |
| | | | 21 | 25 | 6 | 10 | 55 | 59 | 44 | 40 |
| | | | 37 | 41 | 22 | 26 | 11 | 7 | 60 | 56 |
| | | | 53 | 57 | 38 | 42 | 23 | 27 | 12 | 8 |
| Side element | up | normal | 5 | 1 | 22 | 18 | 43 | 35 | 60 | 52 |
| | | | 21 | 17 | 6 | 2 | 59 | 51 | 44 | 36 |
| | | | 37 | 34 | 54 | 50 | 11 | 3 | 28 | 20 |
| | | | 53 | 49 | 38 | 34 | 27 | 19 | 12 | 4 |
| | | cross | 5 | 1 | 22 | 18 | 43 | 36 | 60 | 51 |
| | | | 21 | 17 | 6 | 2 | 59 | 52 | 44 | 35 |
| | | | 37 | 34 | 54 | 50 | 11 | 4 | 28 | 19 |
| | | | 53 | 49 | 38 | 34 | 27 | 20 | 12 | 3 |
| | down | normal | 5 | 16 | 22 | 31 | 43 | 45 | 60 | 62 |
| | | | 21 | 32 | 6 | 15 | 59 | 61 | 44 | 46 |
| | | | 37 | 48 | 54 | 63 | 11 | 13 | 28 | 30 |
| | | | 53 | 64 | 38 | 47 | 27 | 29 | 12 | 14 |
| | | cross | 5 | 15 | 22 | 32 | 43 | 45 | 60 | 62 |
| | | | 21 | 31 | 6 | 16 | 59 | 61 | 44 | 46 |
| | | | 37 | 47 | 54 | 64 | 11 | 13 | 28 | 30 |
| | | | 53 | 63 | 38 | 48 | 27 | 29 | 12 | 14 |

As stated above, when both center element type and side element type can be manufactured, character mark "CNT"

representing the center element type or a character mark "SID" denoting the side element type may be formed on a slider. Therefore, when a thin film magnetic head is of side element type and cross-type thin film magnetic head of up-type, a character mark "SID-DW-C" may be recorded on the magnetic head. A character mark "CNT-UP-N" may be formed on a thin film magnetic head of center element-normal- and up-type.

In the embodiments so far explained, in order to form the electrical coupling at cross points of the wiring pattern, after forming the lower conductive members, the insulating layer is formed, openings are formed in the insulating layer at desired cross points, and finally the upper conductive members are formed. According to the invention, the electrical coupling may be performed in a different way. At first, the lower and upper conductive members are formed, next the desired openings are formed in the insulating layer, and finally conductive members are formed in the openings. In this case, the thin film magnetic head intermediate unit in which almost all parts have been completely manufactured may be prepared.

Figure 46A:
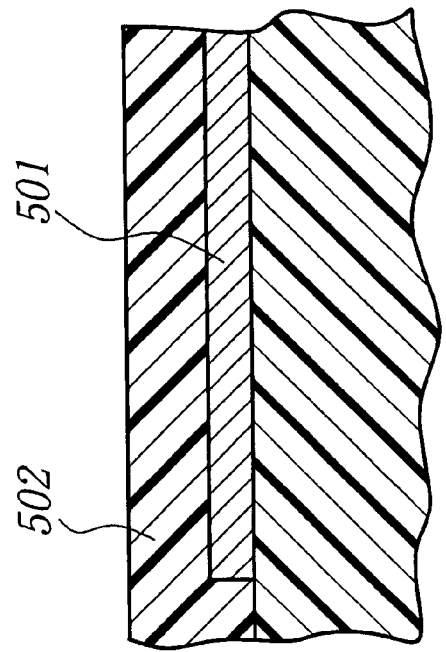
Figure 46B:
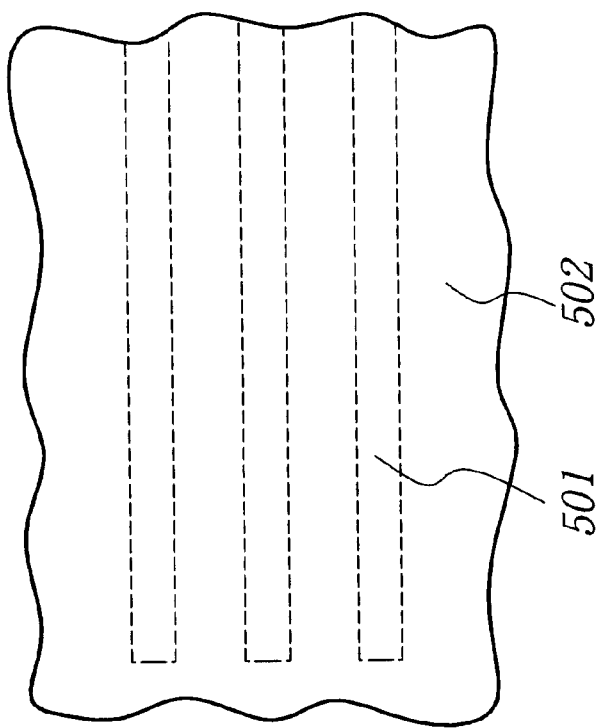

FIGS. 46A, 46B–51A, 51IB show successive steps of another embodiment of the method of forming the electrical coupling at cross points of the wiring pattern. At first, as illustrated in FIGS. 46A and 46B, lower conductors 501 are formed in accordance with a desired pattern. The lower conductors 501 may be the connecting conductors constituting the first conductive pattern of the wiring pattern shown in FIG. 20, and may be formed together with the bottom pole or thin film coil as explained above.

Next, as depicted in FIGS. 47A and 47B, after forming an insulating film 502, depressions 503 and openings 504 are formed in the insulating layer. The depressions 503 are formed to extend perpendicularly to the lower conductors 501, and the openings 504 are formed near cross points between the lower conductors and the depressions such that the openings are communicated with the lower conductors 501. A method of forming such depressions 503 and openings 504 having different depths and lengths has been well known in the art, and thus its explanation is omitted here.

Figure 48B:
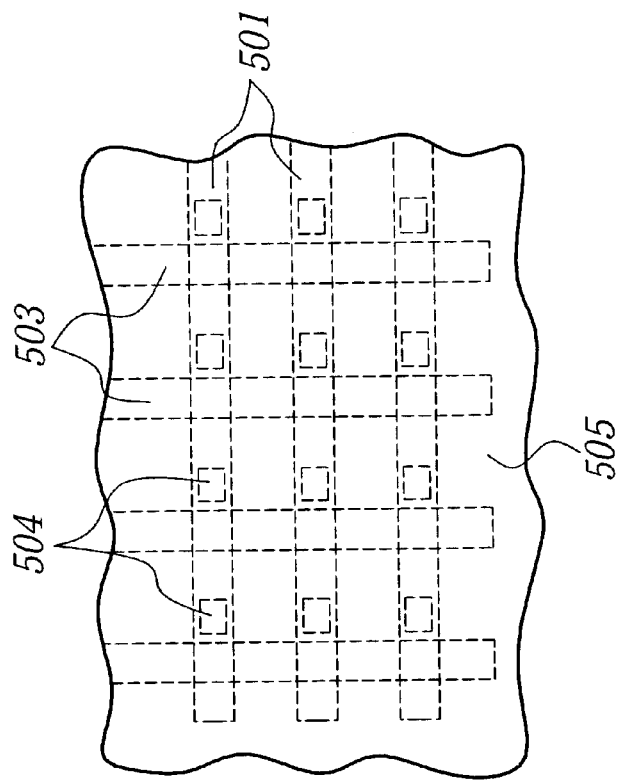
Figure 48A:
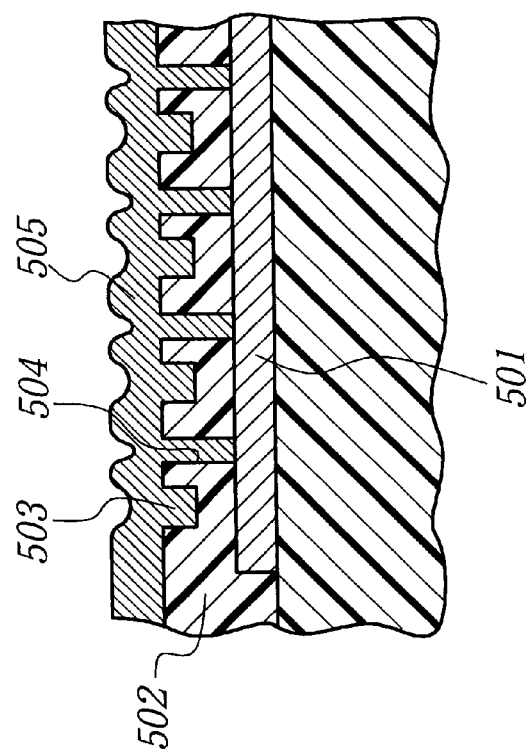
Figure 49A:
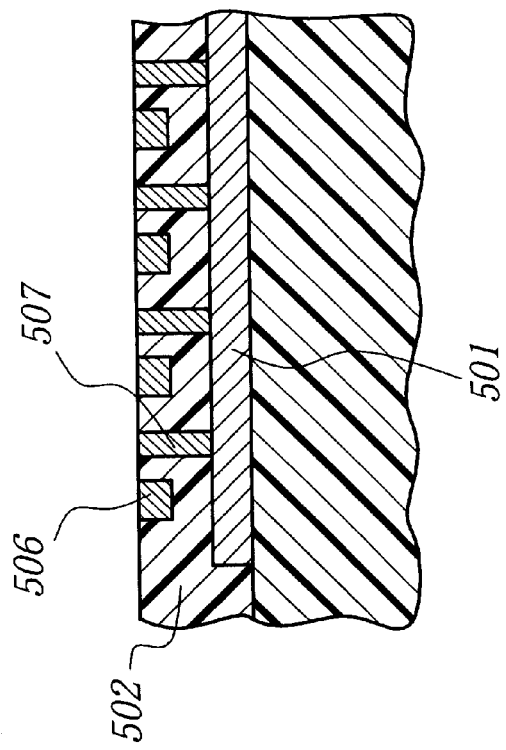
Figure 49B:
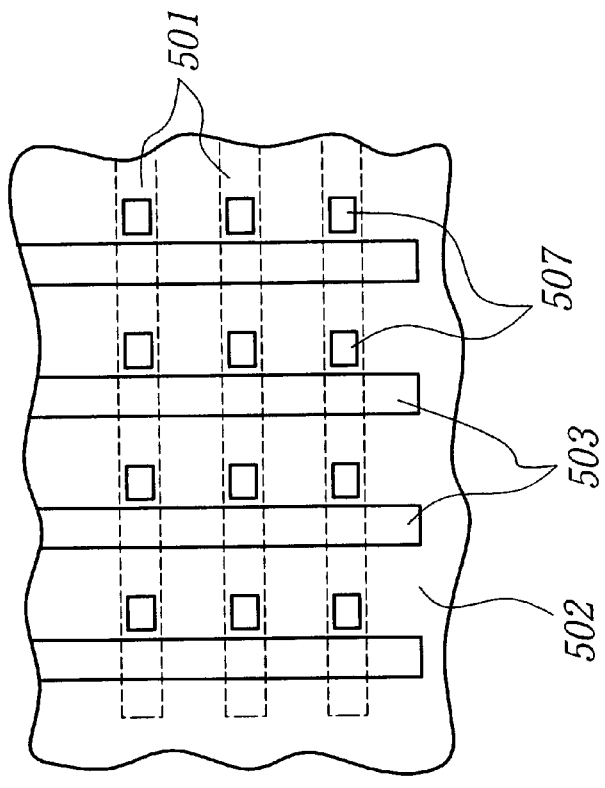

Next, as shown in FIGS. 48A and 48B, a thick conductive layer 505 is formed such that the depressions 503 and openings 504 are embedded with the conductive layer. This conductive layer 505 may be formed together with the thin film coil or top pole. Next, by performing a polishing process such as CMP, upper conductors 506 embedded in the depressions 503 and coupling plugs 507 embedded in the openings 504 are formed as illustrated in FIGS. 49A and 49B.

Figure 50B:
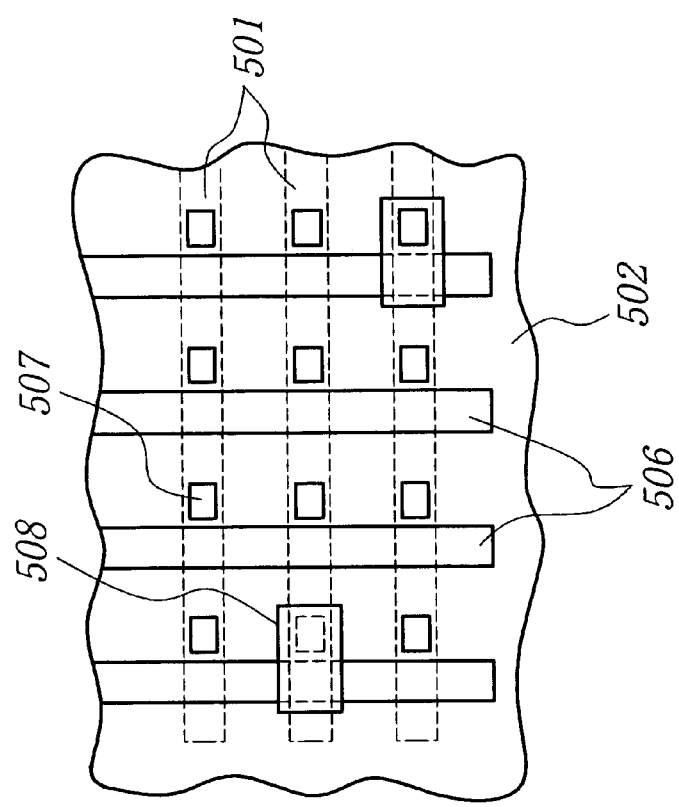
Figure 50A:
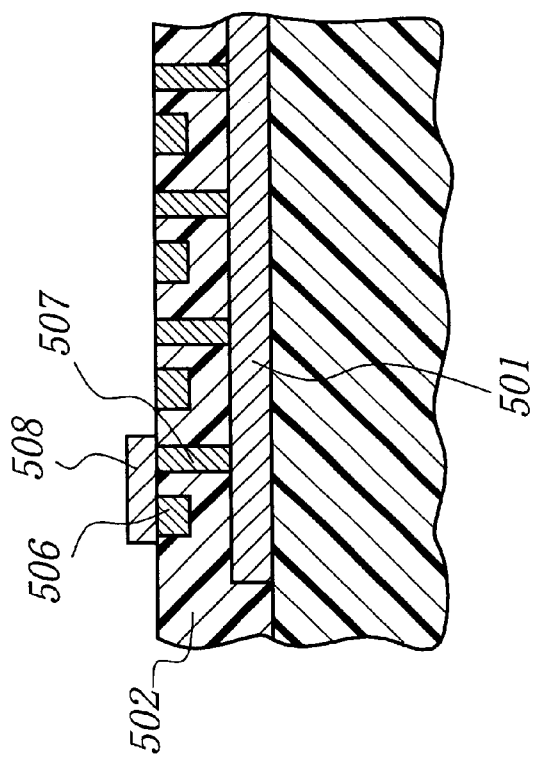

Finally, as depicted in FIGS. 50A and 50B, conductive patches 508 are selectively formed at cross points determined by given specifications of a thin film magnetic head to be manufactured to electrically connect the upper conductor 506 to the coupling plugs 507. In this manner, at desired cross points, the lower and upper conductors 501 and 506 can be electrically coupled with each other by means of the coupling plugs 507 and coupling patches 508. The coupling patches 508 may be formed together with the top pole or may be formed in a later step.

In a modified embodiment of the method of electrically connecting the lower and upper conductors at selected cross points, a thin film magnetic head intermediate unit in which openings are formed such that lower and upper conductors are communicated with each other via the openings at all cross points is prepared, and desired openings are embedded with a conductive material and the remaining openings are embedded with an insulating material of the overcoat layer. In this case, it is no more necessary to perform the etching process for forming the openings in the intermediate unit, a manufacturing process after the intermediate unit may be further simplified.

Figure 51:
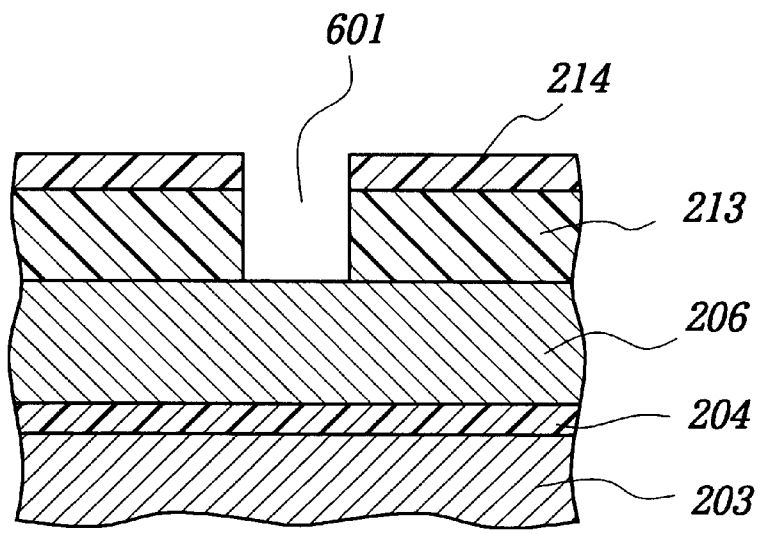
FIGS. 51 and 52 are cross sectional views illustrating successive steps for forming information denoting specifications of the thin film magnetic head according to the invention.

Next, a method of forming the information representing specifications of thin film magnetic heads will be explained. For instance, during the manufacturing processes shown in FIGS. 36–38, when the opening is formed in the insulating layer 238 for constructing the back gap, the openings 353 are formed in the insulating layer 352 covering the conductive members 351 at cross points determined in accordance with the specifications of the thin film magnetic head such that the openings are communicated with the underlying conductive members. During the formation of these openings, a recess 601 corresponding to a character mark is formed in the write gap layer 214 and insulating layer 213 as shown in FIG. 51. That is to say, a mask used for forming the opening for the back gap and for determining the specifications of the thin film magnetic head also has a pattern corresponding to the character mark. Therefore, when the opening for the back gap and the openings for determining the specifications are formed, the recess 601 corresponding to the character mark can be formed simultaneously. Then, the information recorded on the slider becomes always identical with the specifications of the thin film magnetic head, and there is no fear that an erroneous information might be recorded.

Figure 52:
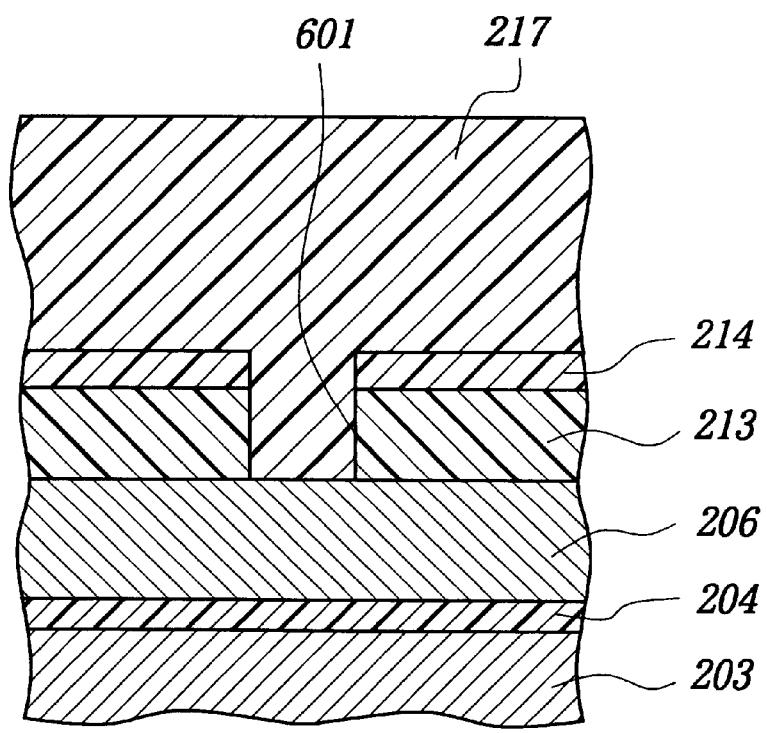

After conducting various steps for forming the thin film magnetic head, as illustrated in FIG. 52, the overcoat layer 217 is deposited such that the recess 601 is embedded with the insulating material of the overcoat layer. In a background area in which the recess 601 is not formed, the insulating layers 213, 214 can be seen through the overcoat layer 217 as a dark background. In the remaining area in which the recess 601 is formed, the bottom pole 206 is seen brightly. In this manner, the recess 601 can be seen with a high contrast and the information can be inspected optically.

As explained above, according to the invention, the information representing specifications of thin film magnetic heads may be constituted by characters or figures which can be directly recognized by the human beings through a microscope. According to the invention, the information may be recorded in a form of bar code which can be read out by an optically reader. Furthermore, in the above embodiment, the information is recorded on respective thin film magnetic beads, but according to the invention, the information may be recorded on a wafer or a bar at a position in which no thin film magnetic head is formed, for instance on a scribe line, because thin film magnetic heads of the same specifications are formed in a single wafer or bar. In such a case, the information may be formed after the completion of the manufacture of the thin film magnetic heads. However, it is preferable to form the information during the step in which the specifications of the thin film magnetic heads are determined from the view point of no error.

The present invention is not limited to the embodiments explained above, but many alternations and modifications may be conceived by those skilled in the art. For instance, in the above mentioned embodiments, the connecting conductors and intermediate conductors including the cross points which satisfy all the possible specifications of the thin film magnetic heads are formed into the two levels, but according to the invention, they may be formed into three levels. For instance, in case of manufacturing the thin film magnetic head having the structure shown in FIG. 20, the connecting conductors 121–124 of the first conductive pattern is formed on a first level together with the bottom pole, the intermediate conductors 161–164 of the second conductive pattern may be formed on a second level together with the thin film coil, and the connecting conductors 131–134 of the first conductive pattern and contact pads 141–144 or conductive members connected to the contact pads may be formed on a third level together with the top pole.

In this case, prior to the formation of the intermediate conductors 161–164 of the second level, contact holes are formed in an insulating layer covering the connecting conductors 121–124 of the first level at given cross points and the intermediate conductors are formed such that they are electrically connected to the underlying connecting conductors through the contact holes. A photomask for forming such contact holes is inherently required for forming lead portions connected to the thin film coil, and thus the number of photomasks is not increased.

Prior to the formation of the connecting conductors 131–134 of the third level, contact holes are formed in an insulating layer covering the intermediate conductors 161–164 of the second level at the given cross points and the connecting conductors 131–134 are formed such that they are electrically connected to the underlying intermediate conductors through the contact holes. A photomask for forming such contact holes may be a photomask which is used for forming the opening in the insulating layer for constructing the back gap remote from the air bearing surface, at said back gap the bottom pole and top pole being magnetically coupled with each other. Therefore, the photomask process is not increased.

Furthermore, in the above embodiments, the connecting conductors and intermediate conductors constituting the wiring pattern are made of same material as components of the magnetoresistive type and inductive type thin film magnetic heads during the same manufacturing processes as these components. Therefore, there is a merit that the photomask process is not increased in order to perform the selective connection in accordance with specifications of thin film magnetic heads. However, according to the invention, the uppermost conductive members of the wiring pattern may be constructed by forming a conductive layer after completion of the above mentioned various components of thin film magnetic head. In this case, the conductive layer may be made of a most suitable material which is not used in the thin film magnetic head.

Merits of the above explained thin film magnetic head and the method of manufacturing the same according to the invention will be summarized as follows.

In the prior art, since sliders having different specifications such as center element type sliders of up-type and down-type and side element type sliders of up-type and down-type are separately manufactured, the number of photomasks is large and the manufacturing cost is liable to be increased. However, according to the invention, the manufacturing steps up to the formation of the complete wiring pattern can be common irrespective of specifications of thin film magnetic heads, the number of required photomasks can be reduced, the manufacturing cost can be decreased and the through put can be improved.

In actual manufacturing sites, thin film magnetic heads are manufactured and stocked under prediction of requirements of users to a certain extent, there are many cases in which the prediction does not reflect actual requirements of users. In such a case, thin film magnetic heads have to be manufactured, and thus a delivery term is liable to be prolonged. According to the invention, since it is sufficient to form or complete only the wiring pattern in accordance with required specifications, a delivery term can be shortened.

Moreover, according to the present invention, the thin film magnetic head intermediate units are stocked, and thin film magnetic heads can be manufactured from such intermediate units in accordance with requirements of users, not only a delivery term can be shortened, but also urgent change in specifications required by users can be easily accepted. In case of stocking the thin film magnetic head intermediate units, the above stated merits can be further enhanced if the units require only a last few manufacturing steps.

In the embodiments in which a single thin film magnetic head element is formed at a center of a slider, the center element type thin film magnetic head of up-type and the center element type thin film magnetic head of down-type can be selectively manufactured. In the embodiments in which two thin film magnetic head elements are arranged at both ends of a slider, the side element type thin film magnetic heads of up-type and down-type can be selectively manufactured. Furthermore, in the embodiments in which three thin film magnetic head elements are arranged at a center and both ends of a slider, four kinds of thin film magnetic heads, i.e. the center element type thin film magnetic heads of up-type and down-type and the side element type thin film magnetic heads of up-type and down-type can be selectively manufactured.

What is claimed is:

1. A thin film magnetic head comprising:
   a substrate constituting a slider having an air bearing surface which is to be opposed to a surface of a record medium;
   at least one thin film magnetic head element supported by said substrate;
   at least two contact pads for connecting first and second connection terminals of said at least one thin film magnetic head element to an external circuit, said at least two contact pads being provided on one end surface of the substrate viewed in a direction in which the record medium travels; and
   a wiring pattern arranged to change the connection between said first and second connection terminals of said at least one thin film magnetic head element and said at least two contact pads in accordance with a desired positional relationship defined by specifications of the thin film magnetic head.

2. The thin film magnetic head according to claim 1, wherein said wiring patterns are made of same materials in same manufacturing steps as conductive members constituting the thin film magnetic head element.

3. The thin film magnetic head according to claim 1, wherein said wiring pattern comprises a first conductive pattern including a plurality of connecting conductors connected to said first and second connection terminals and said at least two contact pads, and a second conductive pattern including a plurality of connecting conductors which extend in a different level than said first conductive pattern viewed from the substrate with interposing therebetween an insulating layer and whose both ends are connected in an electrically conductive manner to said two connecting conductors of said first conductive pattern through openings formed in said insulating layer.

4. The thin film magnetic head according to claim 3, wherein said thin film magnetic head element includes at least an inductive type thin film magnetic head element, and said contact holes formed in said insulating layer for connecting said connecting conductors of the first and second conductive patterns are formed in a same step in which an opening for constructing a back gap in said insulating layer, at said back gap, bottom and top magnetic poles of the inductive type thin film magnetic head element are coupled with each other.

5. The thin film magnetic head according to claim 3, wherein contact holes formed in said insulating layer for connecting said connecting conductors and/or intermediate conductors of the first conductive pattern of the wiring pattern to the connecting conductors and/or intermediate conductors are formed in a same step in which an opening is formed in said insulating layer for constructing a back gap remote from the air bearing surface, at said back gap, bottom and top magnetic poles of said inductive type thin film magnetic head element being coupled with each other.

6. The thin film magnetic head according to claim 5, wherein among all cross points between the first conductive pattern and the second conductive pattern of the wiring pattern, at least two cross points determined by the specifications of the thin film magnetic head, the connecting conductors and/or intermediate conductors of the first and second conductive patterns are electrically connected to each other by means of coupling members provided in contact holes which are communicated with said connecting conductors and/or intermediate conductors.

7. The thin film magnetic head according to claim 5, wherein among all cross points between the first conductive pattern and the second conductive pattern of the wiring pattern, at least two cross points determined by the specifications of the thin film magnetic head, the connecting conductors and/or intermediate conductors of the second conductive pattern are formed to have coupling conductors which are connected to the connecting conductors and/or intermediate conductors of the first conductive pattern through contact holes formed to communicate with the connecting conductors and/or intermediate conductors of the first conductive pattern.

8. The thin film magnetic head according to claim 5, wherein at all cross points between the first conductive pattern and the second conductive pattern of the wiring pattern, contact holes are formed such that the contact holes are communicated with upper and lower connecting conductors and/or intermediate conductors, and at least two contact holes selected from the all contact holes in accordance with the specifications of the thin film magnetic head, upper and lower connecting conductors and/or intermediate conductors are electrically connected to each other by means of coupling members.

9. The thin film magnetic head according to claim 5, wherein at all cross points between the first conductive pattern and the second conductive pattern of the wiring pattern, coupling plugs are formed within contact holes which extend from upper surfaces of the connecting conductors and/or intermediate conductors of the first conductive pattern to upper surfaces of the connecting and/or intermediate conductors of the second conductive pattern, and at each of at least two cross points determined in accordance with the specifications of the thin film magnetic head, said coupling plugs and said connecting conductors and/or intermediate conductors of the second conductive pattern are electrically connected to each other by means of coupling patches.

10. The thin film magnetic head according to claim 1, wherein information representing the specifications of the thin film magnetic head is recorded at a position which is inspected from external.

11. The thin film magnetic head according to claim 10, wherein said information representing the specifications of the thin film magnetic head is formed during a manufacturing process for electrically connecting a plurality of connecting conductors on different levels at a plurality of cross points selected in accordance with the specifications of the thin film magnetic head.

12. The thin film magnetic head according to claim 10, wherein said information representing the specifications of the thin film magnetic head is recorded such that the information is automatically read out by a reader.

13. The thin film magnetic head according to claim 10, wherein said information representing the specifications of the thin film magnetic head is recorded such that the information is directly recognized by human beings.

14. The thin film magnetic head according to claim 10, wherein said information representing the specifications of the thin film magnetic head is recorded such that the information is inspected through a portion of an overcoat layer which does not cover said contact pads.

15. The thin film magnetic head according to claim 1, wherein said connecting conductors of the first conductive pattern of the wiring pattern are fixedly connected to first and second connection terminals of said at least one thin film magnetic head element, and said connecting conductors of the second conductive pattern are fixedly connected to said at least two contact pads.

16. The thin film magnetic head according to claim 15, wherein said connecting conductors of the first conductive pattern of the wiring pattern are directly connected to said first and second connection terminals of said at least one thin film magnetic head element, and said connecting conductors of the second conductive pattern are directly connected to said at least two contact pads.

17. The thin film magnetic head according to claim 15, wherein the connecting conductors of one of the first and second conductive patterns of the wiring pattern are directly connected to said first and second connection terminals of said at least one thin film magnetic head element, and the connecting conductors of the other conductive pattern are connected to another connecting conductors which extend in a different level than the first and second conductive patterns with interposing another insulating layer therebetween and are directly connected to said at least two contact pads through contact holes formed in said another insulating layer.

18. The thin film magnetic head according to claim 15, wherein the connecting conductors of one of the first and second conductive patterns of the wiring pattern are directly connected to said at least two contact pads, and the connecting conductors of the other conductive pattern are connected to another connecting conductors which extend in a different level than the first and second conductive patterns with interposing another insulating layer therebetween and are directly connected to said first and second connection terminals of said at least one thin film magnetic head element through contact holes formed in said another insulating layer.

19. The thin film magnetic head according to claim 15, wherein said plurality of connecting conductors and/or intermediate conductors constituting said first conductive pattern of the wiring pattern are extended substantially in parallel with each other, and said plurality of connecting conductors and/or intermediate conductors constituting said second conductive pattern of the wiring pattern are extended substantially in parallel with each other and cross said plurality of connecting conductors and/or intermediate conductors constituting said first conductive pattern.

20. The thin film magnetic head according to claim 1, wherein said thin film magnetic head element is formed by a combination type thin film magnetic head element including an inductive type thin film magnetic head element and a magnetoresistive type thin film magnetic head element formed to be supported by the substrate in a stacked fashion, and there are formed two connection terminals connected to both ends of a thin film coil of the inductive type thin film magnetic head element, two connection terminals connected to both ends of a magnetoresistive element of the magnetoresistive type thin film magnetic head element, and four contact pads, said first conductive pattern of the wiring pattern includes four connecting conductors which are fixedly connected to said four connection terminals of the thin film magnetic head element, and said second conductive pattern of the wiring pattern includes two connecting conductors which are fixedly connected to two contact pads among said four contact pads and two intermediate conductors having extended portions which cross two connecting conductors electrically connected to the remaining two contact pads.

21. The thin film magnetic head according to claim 1, wherein said thin film magnetic head element is formed by a combination type thin film magnetic head element including an inductive type thin film magnetic head element and a magneto-resistive type thin film magnetic head element formed to be supported by the substrate in a stacked fashion, there are formed two connection terminals connected to both ends of a thin film coil of the inductive type thin film magnetic head element, two connection terminals connected to both ends of a magnetoresistive element of the magnetoresistive type thin film magnetic head element, and four contact pads, said first conductive pattern of the wiring pattern includes two connecting conductors which are fixedly connected to two connection terminals among said four connection terminals of the thin film magnetic head element and two intermediate conductors having extended portions which cross two connecting conductors electrically connected to the remaining two connection terminals, and said second conductive pattern of the wiring pattern includes four connecting conductors which are fixedly connected to said four contact pads.

22. The thin film magnetic head according to claim 1, wherein said first conductive pattern of the wiring pattern includes at least four connecting conductors which are connected to first and second connection terminals of the thin film magnetic head element and said at least two contact pads, and said second conductive pattern includes intermediate conductors whose number is identical with that of the contact pads and which cross all connecting conductors of the first conductive pattern.

23. The thin film magnetic head according to claim 22, wherein said thin film magnetic head element is formed by an inductive type thin film magnetic head element, and both ends of a thin film coil of the inductive type thin film magnetic head element are connected to said at least two connection terminals.

24. The thin film magnetic head according to claim 22, wherein said thin film magnetic head element is formed by a magnetoresistive type thin film magnetic head element, and both ends of a magnetoresistive element of the magnetoresistive type thin film magnetic head element are connected to said at least two connection terminals.

25. The thin film magnetic head according to claim 22, wherein said thin film magnetic head element is formed by a combination type thin film magnetic head element including an inductive type thin film magnetic head element and a magnetoresistive type thin film magnetic head element formed to be supported by the substrate in a stacked fashion, both ends of a thin film coil of the inductive type thin film magnetic head element and both ends of a magnetoresistive element of the magnetoresistive type thin film magnetic head element are connected to four connection terminals, and these four connection terminals are connected to four contact pads by means of the wiring pattern which includes the first conductive pattern having four connecting conductors and the second conductive pattern having four intermediate conductors such that the thin film magnetic head is commonly used as center element type sliders of up-type and down-type, in which said combination type thin film magnetic head element is situated at a center of the air bearing surface viewed from a direction perpendicular to the end surface of the substrate on which said contact pads are formed.

26. The thin film magnetic head according to claim 22, wherein there are provided two combination type thin film magnetic head elements each of which includes an inductive type thin film magnetic head element and a magnetoresistive type thin film magnetic head element formed to be supported by the substrate in a stacked fashion, both ends of thin film coils of the two inductive type thin film magnetic head elements are connected to four connection terminals and both ends of magnetoresistive elements of the two magnetoresistive type thin film magnetic head elements are connected to four connection terminals, and these eight connection terminals are connected to four contact pads by means of the wiring pattern including the first conductive pattern having twelve connecting conductors and the second conductive pattern having four intermediate conductors such that the thin film magnetic head is commonly used as side element type sliders of up-type and down-type, in which the two thin film magnetic head elements are situated at symmetrical positions with respect to a center of the air bearing surface viewed from a direction perpendicular to the end surface of the substrate on which the contact pads are provided.

27. The thin film magnetic head according to claim 22, wherein there are provided three combination type thin film magnetic head elements each of which includes an inductive type thin film magnetic head element and a magnetoresistive type thin film magnetic head element formed to be supported by the substrate in a stacked fashion, both ends of thin film coils of the three inductive type thin film magnetic head elements are connected to six connection terminals, both ends of magnetoresistive elements of the three magnetoresistive type thin film magnetic head elements are connected to six connection terminals, and these twelve connection terminals are connected to four contact pads by means of the wiring pattern including the first conductive pattern having sixteen connecting conductors and the second conductive pattern having four intermediate conductors such that the thin film magnetic head is commonly used as side element type sliders of up-type and down-type as well as center element type sliders of up-type and down-type, in which one thin film magnetic head element is situated at a center of the air bearing surface and the remaining two thin film magnetic head elements are situated at side positions which are symmetrical with respect to the center of the air bearing surface viewed from a direction perpendicular to the end surface of the substrate on which the contact pads are provided.

28. A thin film magnet head comprising:
 a substrate constituting a slider having an air bearing surface which is to be opposed to a surface of a record medium;

at least one thin film magnetic head element supported by said substrate;

at least two contact pads for connecting first and second connection terminals of said at least one thin film magnetic head element to an external circuit, said at least two contact pads being provided on one end surface of the substrate viewed in a direction in which the record medium travels; and a wiring pattern arranged to change the connection between said first and second connection terminals of said at least one thin film magnetic head element and said at least two contact pads in accordance with a desired positional relationship defined by specifications of the thin film magnetic head, wherein said wiring pattern comprises:

first and second conductive patterns including a plurality of mutually crossing connecting conductors, which extend at a different level viewed from the substrate while interposing an insulating layer therebetween, and which are electrically connected to said at least two connection terminals and said at least two contact pads of the thin film magnetic head element, and coupling members which electrically connect connecting the conductors in different levels to each other through contact holes formed in said insulating layer at plural cross points which are selected from a plurality of cross points of the connecting conductors of said first and second conductive patterns in accordance with the specifications of the thin films magnetic head.

29. The thin film magnetic head according to claim 28, wherein said first and second conductive patterns of the wiring pattern are made of same materials as conductive members constituting the thin film magnetic head element and are formed simultaneously with said conductive members.

30. The thin film magnetic head according to claim 29, wherein said coupling members of the wiring pattern are made of a same material as a conductive member of the thin film magnetic head element and are formed simultaneously with said conductive members.

31. The thin film magnetic head according to claim 29, wherein said thin film magnetic head element is formed by an inductive type thin film magnetic head element, the first conductive pattern of said wiring pattern situated closer to the substrate is made of a same material as a lower magnetic pole of the inductive type thin film magnetic head element and is formed simultaneously with the lower magnetic pole, and the second conductive pattern remote from the substrate is made of a same material as coil windings of a thin film coil and is formed simultaneously with the thin film coil.

32. The thin film magnetic head according to claim 29, wherein said thin film magnetic head element is formed by an inductive type thin film magnetic head element, the first conductive pattern closer to the substrate is made of a same material in a same process as a lower magnetic pole of the inductive type thin film magnetic head element, and the second conductive pattern remote from the substrate is made of a same material in a same process as an upper magnetic pole of the inductive type thin film magnetic head element.

33. The thin film magnetic head according to claim 29, wherein said thin film magnetic head element is formed by an inductive type thin film magnetic head element, the first conductive pattern closer to the substrate is made of a same material in a same process as lower coil windings of a thin film coil of the inductive type thin film magnetic head element and the second conductive pattern is made of a same material in a same process as upper coil windings of the thin film coil of the inductive type thin film magnetic head element.

34. The thin film magnetic head according to claim 29, wherein said thin film magnetic head element is formed by an inductive type thin film magnetic head element, the first conductive pattern closer to the substrate is made of a same material in a same process as coil windings of a thin film coil of the inductive type thin film magnetic head element, and the second conductive pattern is made of a same material in a same process as an upper magnetic pole of the inductive type thin film magnetic head element.

35. The thin film magnetic head according to claim 28, wherein said thin film magnetic head element includes at least an inductive type thin film magnetic head element, and said contact holes formed in said insulating layer for connecting said connecting conductors of the first and second conductive patterns are formed in a same step in which an opening is formed in said insulating layer for constructing a back gap remote from the air bearing surface, at said back gap, bottom and top magnetic poles of the inductive type thin film magnetic head element being coupled with each other.

36. The thin film magnetic head according to claim 28, wherein said thin film magnetic head comprises an inductive type thin film magnetic head element having a thin film coil whose both ends are connected to first and second connecting terminals, respectively, said first conductive pattern of the wiring pattern comprises first and second connecting conductors fixedly connected to the first and second connection terminals, respectively, and third and fourth connecting conductors fixedly connected to said first and second contact pads, respectively, and said second conductive pattern of the wiring pattern comprises a first intermediate conductor crossing the first, second and third connecting conductors and a second intermediate conductor crossing said second, third and fourth connecting conductors, whereby said first intermediate conductor is electrically connected to one of said first and second connecting conductors via a first coupling member and is electrically connected to the third connecting conductor via a second coupling member, and said second intermediate conductor is electrically connected to the other of said first and second connecting conductors via a third coupling member and is electrically connected to the fourth connecting conductor via a fourth coupling member.

37. The thin film magnetic head according to claim 36, wherein said thin film magnetic head comprises a magnetoresistive type thin film magnetic head having a magnetoresistive element whose both ends are connected to third and fourth connecting terminals, respectively, said first conductive pattern of the wiring pattern comprises fifth and sixth connecting conductors fixedly connected to the third and fourth connection terminals, respectively, and seventh and eighth connecting conductors fixedly connected to third and fourth contact pads, respectively, and said second conductive pattern of the wiring pattern comprises a third intermediate conductor crossing the fifth, sixth and seventh connecting conductors and a fourth intermediate conductor crossing said sixth, seventh and eighth connecting conductors, whereby said third intermediate conductor is electrically connected to one of said fifth and sixth connecting conductors via a fifth coupling member and is electrically connected to the sixth connecting conductor via a sixth coupling member, and said fourth intermediate conductor is electrically connected to the other of said fifth and sixth connecting conductors via a seventh coupling member and is electrically connected to the eighth connecting conductor via an eighth coupling member.

38. An intermediate unit of a thin film magnetic head commonly used for thin film magnetic heads having different specifications comprising:
a substrate constituting a slider having an air bearing surface which is to be opposed to a surface of a record medium;
at least one thin film magnetic head element supported by said substrate; and
a wiring pattern arranged to change a connection between a plurality of connection terminals of the at least one thin film magnetic head element and a plurality of contact pads in accordance with a desired positional relationship defined by specifications of the thin film magnetic head, said contact pads being provided on an end surface of the substrate viewed in a traveling direction of the record medium for connecting said plurality of connection terminals of said at least one thin film magnetic head element to an external circuit.

39. The intermediate unit for the thin film magnetic head according to claim 38, wherein said wiring pattern comprises first and second conductive patterns including a plurality of connecting conductors which extend in different levels viewed from the substrate with interposing therebetween an insulating layer and are connected in an electrically conductive manner to at least two connection terminals of said thin film magnetic head element as well as to at least two contact pads directly or via another conductive pattern.

40. The intermediate unit for thin film magnetic head according to claim 39, wherein said connecting conductors of the first conductive pattern of the wiring pattern are fixedly connected to first and second connection terminals of said at least one thin film magnetic head element, and the connecting conductors of the second conductive pattern are fixedly connected to said at least two contact pads.

41. The intermediate unit for thin film magnetic head according to claim 39, wherein said thin film magnetic head element is formed by a combination type thin film magnetic head element including an inductive type thin film magnetic head element and a magnetoresistive type thin film magnetic head element formed to be supported by the substrate in a stacked fashion, there are formed two connection terminals connected to both ends of a thin film coil of the inductive type thin film magnetic head element, two connection terminals connected to both ends of a magnetoresistive element of the magnetoresistive type thin film magnetic head element, and four contact pads, said first conductive pattern of the wiring pattern includes four connecting conductors which are fixedly connected to said four connection terminals of the thin film magnetic head element, and said second conductive pattern includes two connecting conductors which are fixedly connected to two contact pads among said four contact pads and two intermediate conductors having extended portions which cross two connecting conductors electrically connected to the remaining two contact pads.

42. The intermediate unit for thin film magnetic head according to claim 39, wherein said thin film magnetic head element is formed by a combination type thin film magnetic head element including an inductive type thin film magnetic head element and a magnetoresistive type thin film magnetic head element formed to be supported by the substrate in a stacked fashion, there are formed two connection terminals connected to both ends of a thin film coil of the inductive type thin film magnetic head element, two connection terminals connected to both ends of a magnetoresistive element of the magnetoresistive type thin film magnetic head element, and four contact pads, said first conductive pattern of the wiring pattern includes two connecting conductors which are fixedly connected to two connection terminals among said four connection terminals of the thin film magnetic head element and two intermediate conductors having extended portions which cross two connecting conductors electrically connected to the remaining two connection terminals, and said second conductive pattern of the wiring pattern includes four connecting conductors which are fixedly connected to said four contact pads.

43. The intermediate unit for thin film magnetic head according to claim 39, wherein said thin film magnetic head element is formed by a combination type thin film magnetic head element including an inductive type thin film magnetic head element and a magnetoresistive type thin film magnetic head element formed to be supported by the substrate in a stacked fashion, both ends of a thin film coil of the inductive type thin film magnetic head element and both ends of a magnetoresistive element of the magnetoresistive type thin film magnetic head element are connected to four connection terminals, the wiring pattern is formed such that said four connection terminals are connected to four contact pads by means of the wiring pattern which includes the first conductive pattern having four connecting conductors and the second conductive pattern having four intermediate conductors, whereby said combination type thin film magnetic head element is commonly used as center element type sliders of up-type and down-type, in which said combination type thin film magnetic head element is situated at a center of the air bearing surface viewed from a direction perpendicular to the end surface of the substrate on which said contact pads are formed.

44. The intermediate unit for thin film magnetic head according to claim 39, wherein there are provided two combination type thin film magnetic head elements each of which includes an inductive type thin film magnetic head element and a magnetoresistive type thin film magnetic head element formed to be supported by the substrate in a stacked fashion, both ends of thin film coils of the two inductive type thin film magnetic head elements are connected to four connection terminals and both ends of magnetoresistive elements of the two magnetoresistive type thin film magnetic head elements are connected to four connection terminals, and said wiring pattern is formed such that said eight connection terminals are connected to the four contact pads by means of the wiring pattern including the first conductive pattern having twelve connecting conductors and the second conductive pattern having four intermediate conductors whereby said two combination type the thin film magnetic head elements are commonly used as side element type sliders of up-type and down-type, in which the two thin film magnetic head elements are situated at positions which are symmetrical with respect to a center of the air bearing surface viewed from a direction perpendicular to the end surface of the substrate on which the contact pads are provided.

45. The intermediate unit for thin film magnetic head according to claim 39, wherein there are provided three combination type thin film magnetic head elements each of which includes an inductive type thin film magnetic head element and a magnetoresistive type thin film magnetic head element formed to be supported by the substrate in a stacked fashion, both ends of thin film coils of the three inductive type thin film magnetic head elements are connected to six connection terminals and both ends of magnetoresistive elements of the three magnetoresistive type thin film magnetic head elements are connected to six connection terminals, and the wiring pattern is formed such that said twelve connection terminals are connected to four contact pads by means of the wiring pattern including the first conductive pattern having sixteen connecting conductors and the second conductive pattern having four intermediate conductors, whereby said three combination type thin film magnetic head elements are commonly used as side element type sliders of up-type and down-type as well as center element type sliders of up-type and down-type, in which one thin film magnetic head element is situated at a center of the air bearing surface and the remaining two thin film magnetic head elements are situated at side positions which are symmetrical with respect to the center of the air bearing surface viewed from a direction perpendicular to the end surface of the substrate on which the contact pads are provided.

46. The intermediate unit for thin film magnetic head according to claim 38, wherein said wiring pattern is made of a same material as conductive members constituting the thin film magnetic head element together with the conductive members.

* * * * *

UNITED STATES PATENT AND TRADEMARK OFFICE
CERTIFICATE OF CORRECTION

PATENT NO. : 6,671,134 B1
DATED : December 30, 2003
INVENTOR(S) : Yoshitaka Sasaki It is certified that error appears in the above-identified patent and that said Letters Patent is hereby corrected as shown below:

<u>Title page,</u>
Item [22], please change the Filing Date from "Filed: Jan. 22, 2001" to
-- Filed: July 6, 2000 --.

Signed and Sealed this

Twenty-seventh Day of April, 2004

JON W. DUDAS
*Acting Director of the United States Patent and Trademark Office*